(12) United States Patent
Addington et al.

(10) Patent No.: US 7,757,261 B2
(45) Date of Patent: Jul. 13, 2010

(54) SYSTEMS AND METHODS FOR PROVIDING FLEXIBLE PROVISIONING ARCHITECTURES FOR A HOST IN A CABLE SYSTEM

(75) Inventors: Timothy Addington, Roswell, GA (US); Ira Lehrman, Littleton, CO (US)

(73) Assignee: N2 Broadband, Inc., Duluth, GA (US)

( * ) Notice: Subject to any disclaimer, the term of this patent is extended or adjusted under 35 U.S.C. 154(b) by 1335 days.

(21) Appl. No.: 10/712,832

(22) Filed: Nov. 12, 2003

(65) Prior Publication Data

US 2004/0261114 A1  Dec. 23, 2004

Related U.S. Application Data

(60) Provisional application No. 60/480,391, filed on Jun. 20, 2003, provisional application No. 60/511,398, filed on Oct. 15, 2003.

(51) Int. Cl.
*H04N 7/173* (2006.01)
*H04N 7/16* (2006.01)
*G06F 15/177* (2006.01)

(52) U.S. Cl. ............... 725/114; 725/91; 725/93; 725/116; 725/117; 725/119; 725/120; 725/138; 725/144; 725/146; 709/221; 709/222

(58) Field of Classification Search ........... 725/91, 725/93, 114, 116, 117, 119, 120, 138, 144, 725/146; 709/221, 222
See application file for complete search history.

(56) References Cited

U.S. PATENT DOCUMENTS

| | | | |
|---|---|---|---|
| 5,600,364 A | 2/1997 | Hendricks et al. |
| 5,661,516 A | 8/1997 | Carles |
| 5,870,539 A | 2/1999 | Schaffer |
| 6,058,383 A | 5/2000 | Narasimhalu et al. |
| 6,148,401 A | 11/2000 | Devanbu et al. |
| 6,151,643 A | 11/2000 | Cheng et al. |
| 6,256,378 B1 | 7/2001 | Iggulden et al. |
| 6,546,094 B1 | 4/2003 | Turner et al. |

(Continued)

OTHER PUBLICATIONS

International Search Report from International Application No. PCT/US04/19455 dated Jun. 1, 2005.

(Continued)

*Primary Examiner*—John W Miller
*Assistant Examiner*—John Schnurr
(74) *Attorney, Agent, or Firm*—Alston & Bird LLP

(57) ABSTRACT

Flexible systems and methods are disclosed that may be used for provisioning, configuring, and controlling a host embodied in a cable set top box or other digital device attached to a digital communication network, such as cable distribution network. An enhanced services system maintains various host files for various types of hosts that a cable subscriber may purchase and connect to the cable network. The Enhanced Services Server interacts with the host using the host files. The host files may be downloaded from the host manufacturer into a database that distributes the modules as required to the various enhanced services systems. The host may be purchased by the cable subscriber and provisioning may be initiated by the retailer at the time of purchase using a provisioning network interacting with the appropriate cable system serving the subscriber. This abstract is not intended to limit or construe the scope of the claims.

9 Claims, 31 Drawing Sheets

U.S. PATENT DOCUMENTS

| | | |
|---|---|---|
| 6,564,321 B2 | 5/2003 | Bobo, II |
| 6,687,486 B2 * | 2/2004 | Grzeczkowski ............ 455/3.05 |
| 6,772,443 B2 | 8/2004 | Soerens et al. |
| 6,915,531 B2 | 7/2005 | Yun |
| 6,948,168 B1 | 9/2005 | Kuprionas |
| 7,007,049 B2 | 2/2006 | Peng |
| 7,013,461 B2 | 3/2006 | Hellerstein et al. |
| 7,092,397 B1 | 8/2006 | Chandran et al. |
| 7,096,464 B1 | 8/2006 | Weinmann |
| 7,155,512 B2 | 12/2006 | Lean et al. |
| 2001/0013121 A1 | 8/2001 | Kimball et al. |
| 2002/0083441 A1 | 6/2002 | Flickinger et al. |
| 2002/0112175 A1 | 8/2002 | Makofka et al. |
| 2002/0178455 A1 | 11/2002 | Poli et al. |
| 2002/0194594 A1 | 12/2002 | Poli |
| 2003/0048380 A1 * | 3/2003 | Tamura ...................... 348/552 |
| 2003/0212991 A1 | 11/2003 | Mahajan |
| 2003/0217166 A1 | 11/2003 | Dal Canto et al. |
| 2004/0054786 A1 | 3/2004 | Kjellberg et al. |
| 2004/0088734 A1 | 5/2004 | Donlan et al. |
| 2004/0088737 A1 | 5/2004 | Donlan et al. |
| 2004/0107451 A1 | 6/2004 | Khandelwal et al. |
| 2004/0163102 A1 | 8/2004 | Fowler et al. |
| 2004/0210941 A1 | 10/2004 | Poli et al. |
| 2004/0261116 A1 | 12/2004 | Mckeown et al. |
| 2005/0091699 A1 | 4/2005 | Poli et al. |
| 2005/0122976 A1 | 6/2005 | Poli et al. |
| 2006/0020525 A1 * | 1/2006 | Borelli et al. ................. 705/34 |

OTHER PUBLICATIONS

File Histroy for U.S. Appl. No. 10/769,382.
File History for U.S. Appl. No. 10/712,890.
File History U.S. for U.S. Appl. No. 10/712,870, which is now Patent No. 7,194,756.
Office Action dated Apr. 23, 2009 for U.S. Appl. No. 10/712,890.
Ma et al., Framework for Third Party Testing of Component Software, 2001, pp. 431-434, IEEE.
Office Action from U.S. Appl. No. 10/712,822 dated Mar. 3, 2010.

* cited by examiner

| Ref No. | Primary Tag | Function | Secondary Tag | Examples/Parameters |
|---|---|---|---|---|
| 1 | Tuner No. | Defines each tuner in Host | Tuner Type | FAT, DOCSIS, OOB |
| 2 | Video Display | Indicates presences of embedded display | Format, Resolution | 16:9 or 4:3 aspect ratio; 480I, 720P, 720I, 1080I |
| 3 | Video Format | Indicates supported formats | Format | 16:9, 4:3, ML, MP |
| 4 | Software Code Object | Defines type of software object | | Boot code, base platform, middleware, manufacturer specific |
| 5 | Conditional Access Type | Indicates type of CA schemes supported | Digicipher; Powerkey; Cablecard; Other | |
| 6 | IR Receiver | Indicates infra-red remote control codes supported | | |
| 7 | WiFi | Indicate type of 802.11 wireless access protocols supported | 802.11a 802.11b 802.11g | |
| 8 | Hard Disk | Defines parameters of Hard Disk | Size | 60 GB, 100 GB, etc. |

Figure 27

SYSTEMS AND METHODS FOR PROVIDING FLEXIBLE PROVISIONING ARCHITECTURES FOR A HOST IN A CABLE SYSTEM

CROSS-REFERENCE TO RELATED APPLICATIONS

This application claims the benefit of U.S. Provisional Application No. 60/480,391 filed on Jun. 20, 2003 and U.S. Provisional Application No. 60/511,398 filed on Oct. 15, 2003. This application is related to Systems And Methods For Distributing Software For A Host Device In A Cable System, U.S. patent application Ser. No. 12/607,621, Systems And Methods For Provisioning A Host Device For Enhanced Services In A Cable System, U.S. patent application Ser. No. 11/560,046, Systems And Methods For Selling A Consumer Electronics Host Device And Enhanced Services Associated With A Cable System, U.S. patent application Ser. No. 10/712,822, all filed concurrently herewith this application. The contents of each of the applications referenced in this paragraph are hereby incorporated by reference in their entirety.

FIELD OF THE INVENTION

This invention is directed generally to the field of provisioning services in a network, such as a cable television system. Systems and methods are disclosed for configuring enhanced service related capabilities in a cable set top box. Further disclosed are systems and methods for distributing and downloading host-specific files to cable systems wherein the host-specific files contain protocol messages as well as descriptive information that can be used to interact with a specific model of set top box, the interaction including configuring enhanced services involving the particular type of set top box. Additionally, the host-specific files may contain software that is downloaded to the set top box to replace or augment resident application software. Systems and methods are disclosed pertaining to third-party service provisioning, the third parties including retailers who also distribute and/or sell the cable set top box to a customer. A method is disclosed of selling set top boxes by a third-party, typically by a retailer in conjunction with provisioning network services for the customer.

BACKGROUND OF THE INVENTION

Cable television systems are widely deployed for the distribution of television signals, and typically provide greater selection and quality of channel reception than can be received using traditional over-the-air broadcast antennas at the point-of-reception. The deployment of new cable technology, such as digital cable, provides more robust transmission and increased channel capacity, and allows services to be offered such as selective subscription to premium channels and pay-per-view events. The offering of such services typically requires a set top box to decode and decrypt the digital signals, which are typically encoded using the MPEG-2 digital encoding standard. The cable operator typically provides the set top box to the cable subscriber for a monthly leasing fee.

The basic architecture for a cable system is illustrated in FIG. 1, which depicts the prior art and involves a cable headend 5 emanating multiplexed signals over a cable distribution network 6. The cable distribution network has evolved over time and was originally primarily a bifurcated tree architecture using coaxial cable (not shown). The cable distribution network has become more sophisticated in recent years, both in its architecture and technology, typically incorporating optical fiber transmission and multiplexing equipment based on an architecture involving interconnected 'rings' (not shown). Regardless of the architecture, the network can be logically depicted as providing connectivity between the cable headend where the signals originate and the cable set top box 7 where the signals are received.

The cable headend 5 contains various equipment, including receivers, transmitters, optical terminations, multiplexing equipment, and transmission devices. It also contains functions for encrypting signals, which will be discussed further. The cable headend is typically tightly 'coupled' with the provisioning/conditional access system 1b as represented by the dotted line 2. The provisioning/conditional access system functions closely with the cable headend in regard to enabling a particular subscriber to decode authorized channels. Thus, channel authorization for a subscriber requires coordination between the provisioning/conditional access system and the cable headend, specifically the integrated receiver transcoders (IRT) contained in the headend (not shown). The IRT is a component of the conditional access scheme and used to control dissemination of entitlement control messages (ECMs) which is a message conveying a key that authorizes access to a program. In some contexts, industry usage of the term "headend" encompasses both elements the provisioning/conditional access system 1b, and the cable headend 5, but some distinction of functionality is maintained herein.

The cable set top box ("set top box" or "STB") provides additional flexibility for the cable system operator to provide basic and premium services. For analog services, the STB may authorize access to, and descramble the video signals. For basic and premium digital services, the STB decodes and decrypts the digital MPEG program signals that include encoded video and audio signals. The STB also provides a mechanism for the cable operator to selectively authorize reception of an individual channel (e.g., premium service) or a group of channels (e.g., basic service). The STB is used by the cable operator to selectively authorize other services, such as enabling the purchase of pay-per-view events or enabling an input/output port to connect to an external device. The STB typically incorporates specialized hardware and software employed for decrypting digital program data. The special hardware and software is typically embedded into the STB, but may be implemented on a removable circuit card. Once the program data is decrypted and decoded, it is then converted to a standard television signal that is typically transmitted over a coaxial cable 9 to a traditional analog television set 10 for viewing. With the advent of digital televisions, the decrypted data may be digitally transmitted, either in the clear or further encrypted, to the digital television or display monitor. The decryption techniques are typically based on sending periodic ECMs from the cable headend (specifically from the IRT) to the STB for decrypting digital program data. The keys are typically sent using another encryption key. As programs are broadcasted on channels over the cable distribution network 6, the STB can theoretically tune to any channel. However, by sending the entitlement management messages (EMMs) to a particular STB, the STB is able to decrypt the data only as authorized. Typically, a particular key authorizes viewing of only one channel. Other messages, containing channel maps, indicate how to locate a particular channel in the multiplexed data. Thus, without having the channel map or decryption key, a STB cannot effectively provide a program to the viewer's television. This is one embodiment of a common security scheme (a.k.a. "conditional access scheme") that is designed to thwart theft of cable services (either basic or premium services) by the use of illegal set top boxes to receive services.

A cable subscriber may indicate their request to add service, such as a premium channel by telephoning a customer service representative ("agent") 522 and verbally indicating their subscription request. The agent is in a call center and operates a computer 523 for provisioning the service. After obtaining the necessary information from the user, the agent 522 indicates the desired services 523 using a computer operatively connected to a billing system 1a and provisioning/conditional access system 1b. The billing system contains a database of 'house records', so called, as the records are associated with a house or residential serving location. Each record includes the address, and information as to what services can be provided to that location. Typically, the cable network may have different service capabilities in different portions of the cable network, and thus not every serving location is able to receive the same services. For example, the cable network may serve several subdivisions of homes with a portion of the cable network that has been upgraded that provides a greater number of channels and services than another subdivision that is served with another portion of the cable network that has not been upgraded. If the house record indicates the location is currently receiving service, then the subscriber's name and service related information is provided. The records further indicate 'outlet' information that includes information as to how many and which type of set top boxes is present. Thus, any form of subscriber information or service related information is typically maintained by the billing system. This includes a subscriber's current service selections, past selections, payment related information, etc. Further, the billing system maintains information regarding various groupings of service offering ("service packages") that are mapped to "billing codes." The groupings of services associated with a service package are defined by various business rules by the cable operator. The business rules not only define which channels are associated with a service package, but information such as equipment requirements (e.g., required STB type or model number), billing aspects, and ancillary service aspects (e.g., use of a remote control, enabling a switched power outlet on the STB, enabling pay-per-view capabilities, etc.).

Each cable service package is mapped to a billing code (a.k.a. 'billing handle') and then further mapped by the provisioning/conditional access system to one or more service tiers. A service tier is typically associated with authorizing a STB to decode a particular channel. Thus, 'basic digital cable' may have a single billing code that corresponds to a plurality of service tiers, where each service tier results in sending the STB the appropriate EMMs authorizing the STB to decrypt the channels comprising basic digital cable. The provisioning/conditional access system receives the billing code along with the host address. The provisioning/conditional access system maps the billing code to one or more service tiers and communicates the appropriate EMMs to the STB, which in turn, enables the STB to decrypt the program. Thus, the provisioning/conditional access system has limited knowledge of service related information and typically does not have any subscriber level information.

Provisioning a service frequently involves adding a channel to an existing subscriber's services and uses a similar scheme as described above. Adding a premium channel can be accomplished by instructing the billing system 1a to add a billing code to the subscriber's service profile, which updates the billing associated with the subscriber. The billing system communicates the billing code and STB address to the provisioning/conditional access system 1b. The provisioning/conditional access system then communicates the service tier by sending the appropriate decryption keys via an EMM to the STB.

In some cases, provisioning a service may result in authorizing a subscriber's STB to decode and decrypt multiple channels. A billing code corresponding to 'basic cable service' may comprise, for example, 40 channels. The billing system contains business rules that define the channels associated with the basic service package with the billing code, which in turn is mapped to 40 service tiers by the provisioning/conditional access system.

However, provisioning a service may also involve authorizing or configuring other capabilities as part of the overall service that is not associated with a STB decoding and decrypting a program. For example, cable system operators typically provide the STB access to program guide information. This can be accomplished by using the same scheme of communicating a service tier to the STB using the above mentioned process or sending a specific command message processed by the STB. In the case of the use of a service tier, the service tier is associated with an application in the STB that enables access to programming guide information. In this example, there are no ECM messages sent, as there is no programming data to decrypt. In another example, the cable system operator may enable the use of a remote controller with the STB. The STB can be configured to recognize a controller by sending the STB a service tier or a specific command message. Thus, in some instances, when a billing code is conveyed for a service, (e.g., 'basic cable service'), the provisioning/conditional access system may map this billing code to several service tiers. For example, the 'basic cable service' billing code not only typically authorizes various channels, but also may configure the STB for using a remote controller and configure the STB for receiving program guide information. In other circumstances, a billing code may be mapped to only a single service tier (e.g., adding a premium channel).

In addition the billing system 1a can instruct the provisioning/conditional access system to perform other actions involving the STB. The billing system can send commands or billing codes to the provisioning/conditional access system to effect various functions. Some common commands include installing a particular STB, resetting a particular STB, downloading software, or polling a particular STB. Installation of a STB involves the provisioning/conditional access system storing information about a newly deployed (or soon to be deployed) STB. Typically, the STB is identified by an address, such as a MAC level address used in conjunction with the serial number of the conditional access module. Resetting a target STB instructs the provisioning/conditional access system to re-initialize parameters in a particular STB and potentially re-send decryption keys to the STB to authorize decoding of the appropriate channels. Downloading software to a host can be accomplished by sending a service code to the host, where the service tier indicates the host should monitor a channel for updated software, and download it if the software is a newer version than contained in the host. Finally, polling a STB is used to periodically collect information from the target STB, such as pay-per-view viewing data maintained in the memory of the conditional access module.

However, each of these commands or service tiers must be recognized by the conditional access module and either acted upon by the conditional access module or passed by the conditional access module to the host.

In summary, provisioning existing cable services ('legacy' services) typically involves an agent interacting with the billing system to create or modify a subscriber's record to add or delete a billing code associated with an existing subscriber's service profile. The billing system maintains subscriber and service related information and sends a series of billing codes as appropriate along with the subscriber's host address to the provisioning/conditional access system. The provisioning/conditional access system is aware of whether a billing code is associated with authorizing a STB to receive a channel. The provisioning/conditional access system sends the service tier contained in an EMM to the STB via the cable headend. In this manner, the subscriber is provisioned for a service. Other service related provisioning aspects may also require sending potentially proprietary commands to the STB, which may be proprietary in nature. Thus, provisioning a cable subscriber in a legacy system typically involves sending a combination of proprietary messages to authorize, configure, and command the host.

In the previous example, the cable distribution network 6 provides a method for communicating messages to the STB, but not necessarily in the reverse direction. If there is no reverse channel communication, then this type of cable distribution network is called a one-way network. Users desiring to communicate with the network (e.g., requesting a service to be added) typically initiate communication with the network via a telephone call to a network agent. Alternatively, the STB may automatically initiate a call and interact with an automated system. The agent then performs the appropriate provisioning actions. In other networks, a reverse communication path is provided for communicating information from the STB to the headend. Such two-way cable networks allow data conveyed from the STB to the cable headend, such as acknowledging receipt of data. Since the STB can signal to the cable headend using the cable distribution plant 6, two-way networks also allow greater flexibility in service offering. For example, early deployments of pay-per-view services on one-way networks relied on the telephone network for reporting subscriber usage data to the cable network in order to calculate the subscriber's billing charges. With deployment of two-way networks, pay-per-view subscribers with a configured STB can use the reverse path on the cable system to report monthly viewing data.

A STB that can signal in the reverse path on a two-way cable network is different than a STB designed for one-way communication. FIG. 2 illustrates one embodiment of the functional components in a prior art one-way STB 7. A tuner 20 receives the signal from the cable distribution network 3 and then a demodulator 22 provides the multiplexed digital video information. The signal is also processed by receiver 23 isolating out-of-band information, such as control messages or decryption keys. Both the out-of-band messages and the video information are sent to a Point of Deployment ("POD") module 27 that may be implemented on a removable circuit board for processing incoming data. The POD module also performs decryption of the data. Alternatively, the POD functionality is implemented on circuitry embedded with other functionality in the STB. This is sometimes referred to as 'embedded security.' After decryption, the video information is demultiplexed by the demultiplexor 25, decoded, and then provided as an output signal to a television. This could be in a PAL format (common in Europe), NTSC format (common in the U.S.), or in a digital format (suitable for newer digital televisions or display monitors), either encrypted or not.

The POD 27 functionality interworks with the Host 8, and the two sets of functions together embody a typical STB 7. The POD-to-Host interface 21 is defined by an industry standard published by the Society of Cable Telecommunications Engineers in a document referenced as SCTE 28 2003 (formerly referenced as "DVS 295"). A standard POD-to-Host interface facilitates different host manufacturers developing host units. Heretofore, the STB has been referred broadly, but it is necessary to reference the host functionality distinct from the POD functionality.

The POD module contains security (encryption) related algorithms and decryption keys. Its distribution is carefully controlled by the manufacturer and cable system operator. These security techniques are called 'conditional access' schemes and are designed to deter theft of cable services as well as use of unauthorized STB units. Thus, the POD functionality is generically referred to as a 'conditional access module' herein. Other common industry terms for the POD include "CableCARD™" or "removable security module." The host is typically considered the remaining functionality in the STB including the CPU, but excluding the conditional access module. Other possible implementations integrate the host functionality into a consumer electronics device (e.g., digital television) and use a removable conditional access module. A removable conditional access module is typically inserted into a slot on the consumer electronics device or STB.

FIG. 3 illustrates the prior art of a STB capable of two-way communication and is largely distinguishable from the one-way STB in that the two-way STB incorporates a transmitter 28 for sending information back to the headend. In both FIGS. 2 and 3, the STB comprises a host 7 and a conditional access module 27. In both figures, the messages may be filtered by the conditional access module. The conditional access module determines whether the message is passed to the host CPU 26 or processed by the conditional access module. This is true regardless of whether the messages are sent inband (involving the tuner 20 or the demodulator 22) or whether the messages are sent out-of-band (involving receiver 23). Consequently, in the current existing architecture, the provisioning of new or enhanced services may require passing new messages in the existing architecture between the cable headend and the host. This typically requires reprogramming or replacing conditional access modules in the deployed STB, or replacing the STB. Further, this requires coordination and cooperation of the conditional access module manufacturer, host manufacturer, as well as the headend equipment provider, to recognize and process the new messages. In all cases, the authorization and command messages emanate from the cable headend and are directed to a specific conditional access module, which then processes or forwards the message over the POD-host interface.

Because of the compatibility required between the cable headend and the STB, cable operators typically carefully control the connection and use of STBs to the network. Typically, different conditional access schemes are not compatible with each other. For example, two main vendors of cable network equipment include Motorola® and Scientific-Atlanta®. The conditional access schemes and messaging for each vendor are typically not compatible with each other. Thus, a STB with an embedded conditional access module functioning on one network will not operate on the other network. To minimize interoperability problems and maintain customer satisfaction, the cable operator typically provides the STB to the cable subscriber, often on a leased basis. Hence, the cable subscriber typically is limited in their choice of STB brands and models. For a variety of reasons, many host manufacturers do not introduce innovative service capabilities in the host application software because the new capabilities would have to be supported by potentially the cable headend, conditional access module and billing and provisioning/conditional access system. If the vendor of the conditional access module does not recognize or pass information to a host CPU, or does not pass it in a defined manner, then that host capability cannot be configured by the cable network. Further, the coordination of development and deployment of new capabilities in these various legacy systems is difficult and competing business interests limit any coordination and cooperation. As evident, the development of a new host application executed by the CPU in the current architecture requires coordination of the development and deployment of a defined capability in the host with the conditional access module. Since current cable networks maintain only a limited ability to discriminate between different host capabilities and cannot accommodate different conditional access implementations, any deviation in the host's legacy based signaling capabilities results in host incompatibility. It is neither economically feasible, nor practical, for a cable system operator to replace a conditional access module every time an upgrade is required due to a new messaging capability.

BRIEF SUMMARY OF THE INVENTION

Various methods for provisioning a host in a cable network are disclosed, involving various input methods such as accessing a telephone response system, accessing a web site, or talking with an agent. Various types of information may be provided by the service initiator, including service related data, location related data, subscriber related data, and host related data. Further, different user-interfaces are disclosed and each user interface may support different user interactions, based in part on the nature of the service and the capabilities defined by the system provider. In one embodiment, a user may receive a display on a computer of service related options associated with a cable provider based on the user's serving location. The user may also be presented with different features associated with one or more host devices for use with the cable provider. The user may be presented with compatibility information regarding selected services from the cable provider and features associated with a selected host. The user may then provision a service for a selected host with the selected cable service provider. Numerous other methods are disclosed involving various input systems and user interactions that typically involve provisioning a service associated with a user for a selected host on a selected cable service provider.

In another embodiment of the present invention, various input provisioning systems are disclosed for provisioning a host in a cable system. The input system may utilize various computers, gateways, interactive voice response systems, communication links providing various user-interfaces and capabilities for different types of service initiators, including end users, cable provider agents, and third party retailers. In one embodiment a computer accesses a provisioning gateway using the Internet, and the provisioning gateway determines one of several enhanced services systems to provision based in part on location data provided by the user of the computer. The provisioning gateway in turn generates a provisioning message indicating service selection information and user identification that is provided to the appropriate enhanced services system in a compatible protocol format.

The summary is not comprehensive and does not detail all the variations of the invention. Nor is this summary intended to limit the invention in any way as defined by the claims.

BRIEF DESCRIPTION OF THE SEVERAL VIEWS OF THE DRAWING(S)

Having thus described the invention in general terms, reference will now be made to the accompanying drawings, which are not necessarily drawn to scale.

Figure 20A:
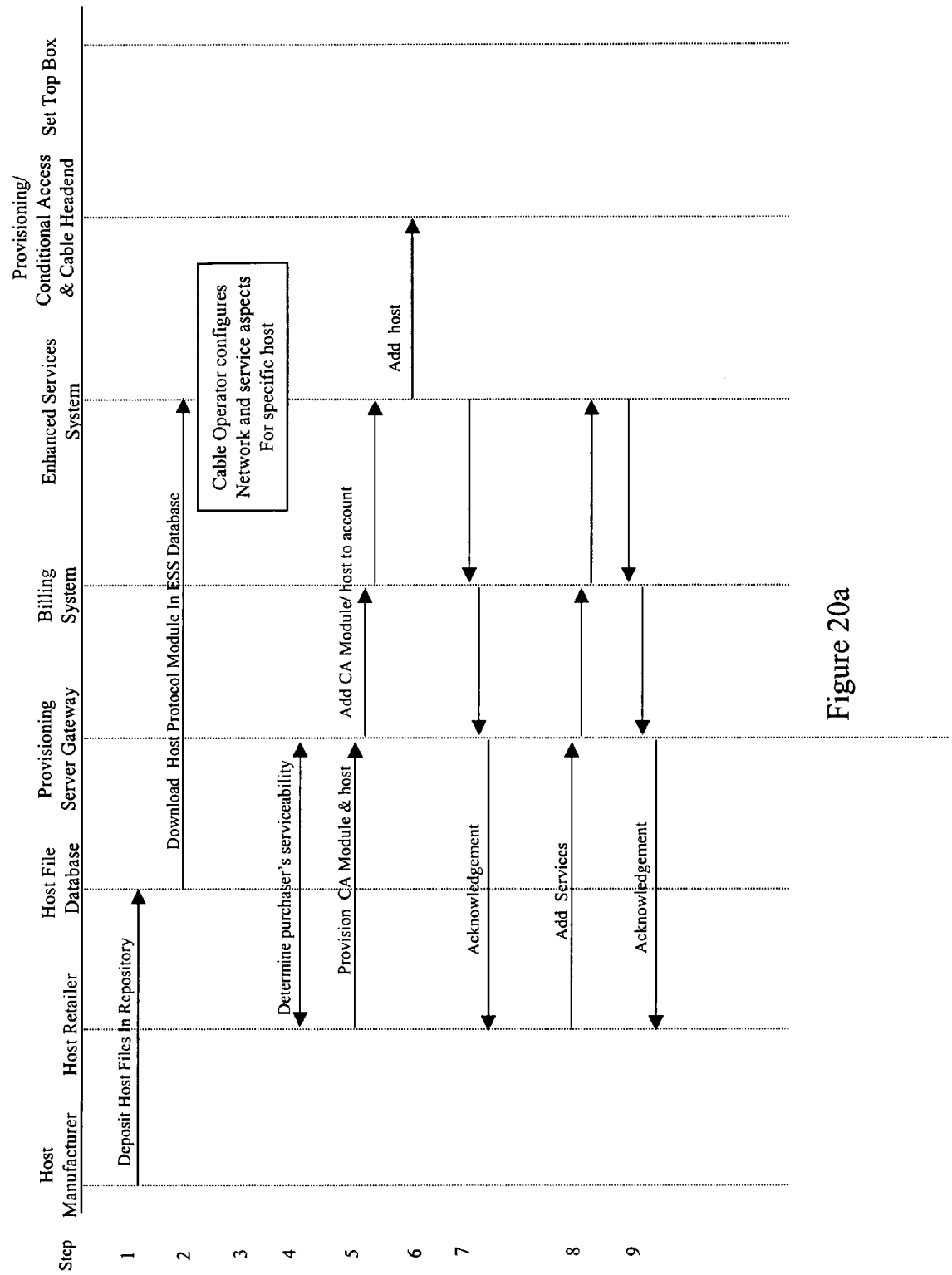
Figure 20B:
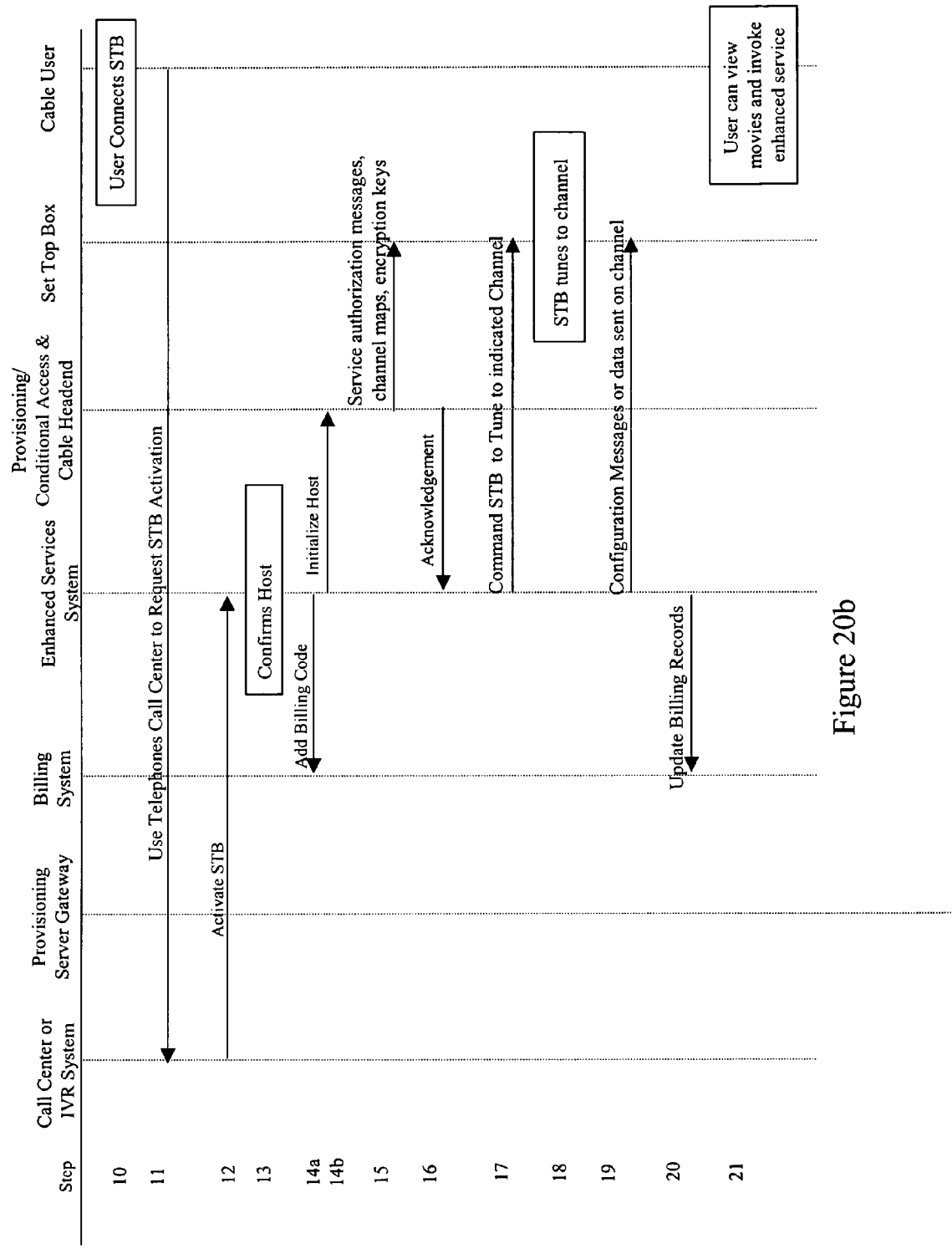

FIGS. 20a-b illustrate one embodiment of provisioning a host on a one-way cable network in accordance with the principles of the present invention.

Figure 21A:
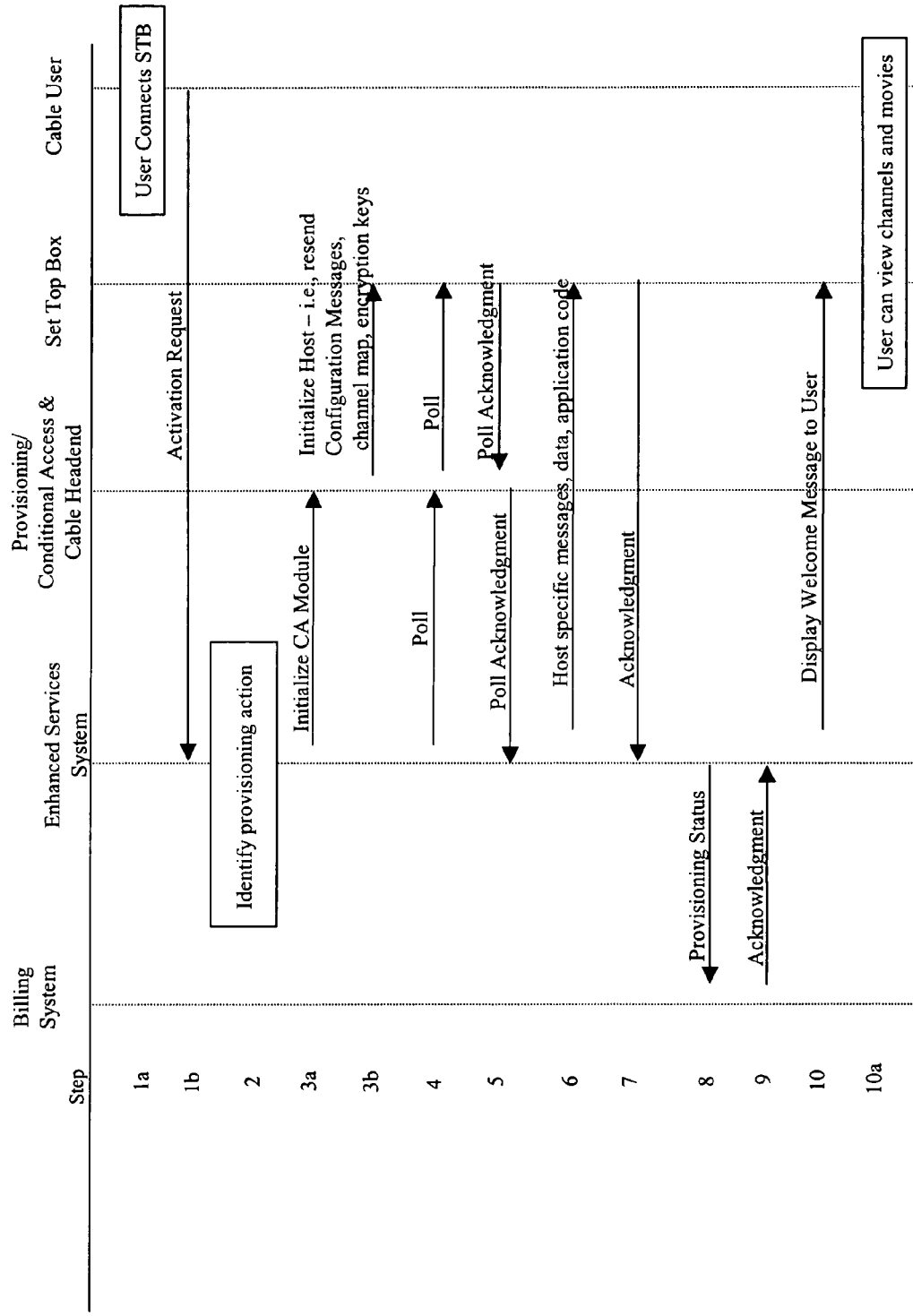
Figure 21B:
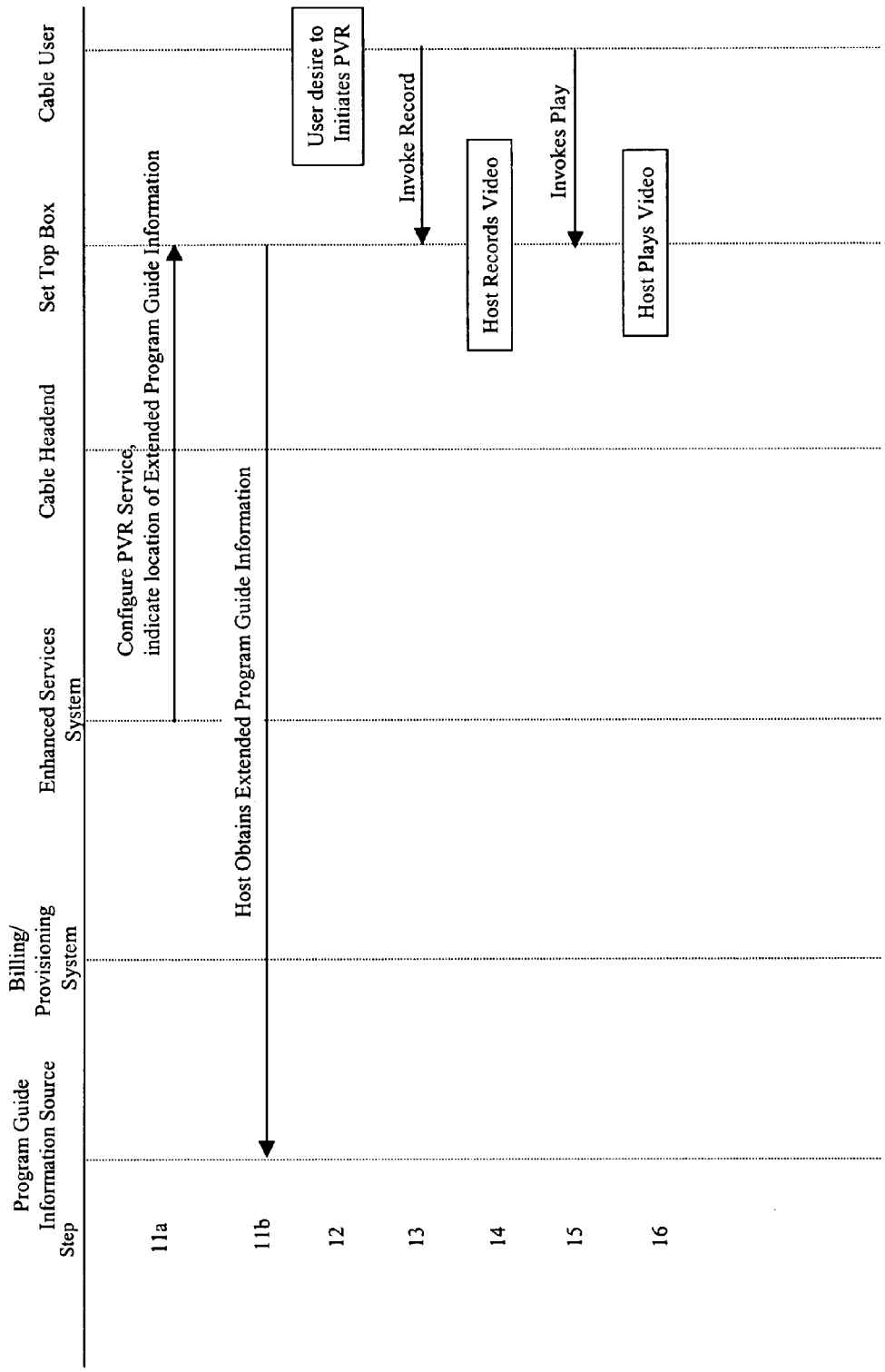

FIGS. 21a-b illustrate one embodiment of provisioning a host on a two-way cable network in accordance with the principles of the present invention.

Figure 22:
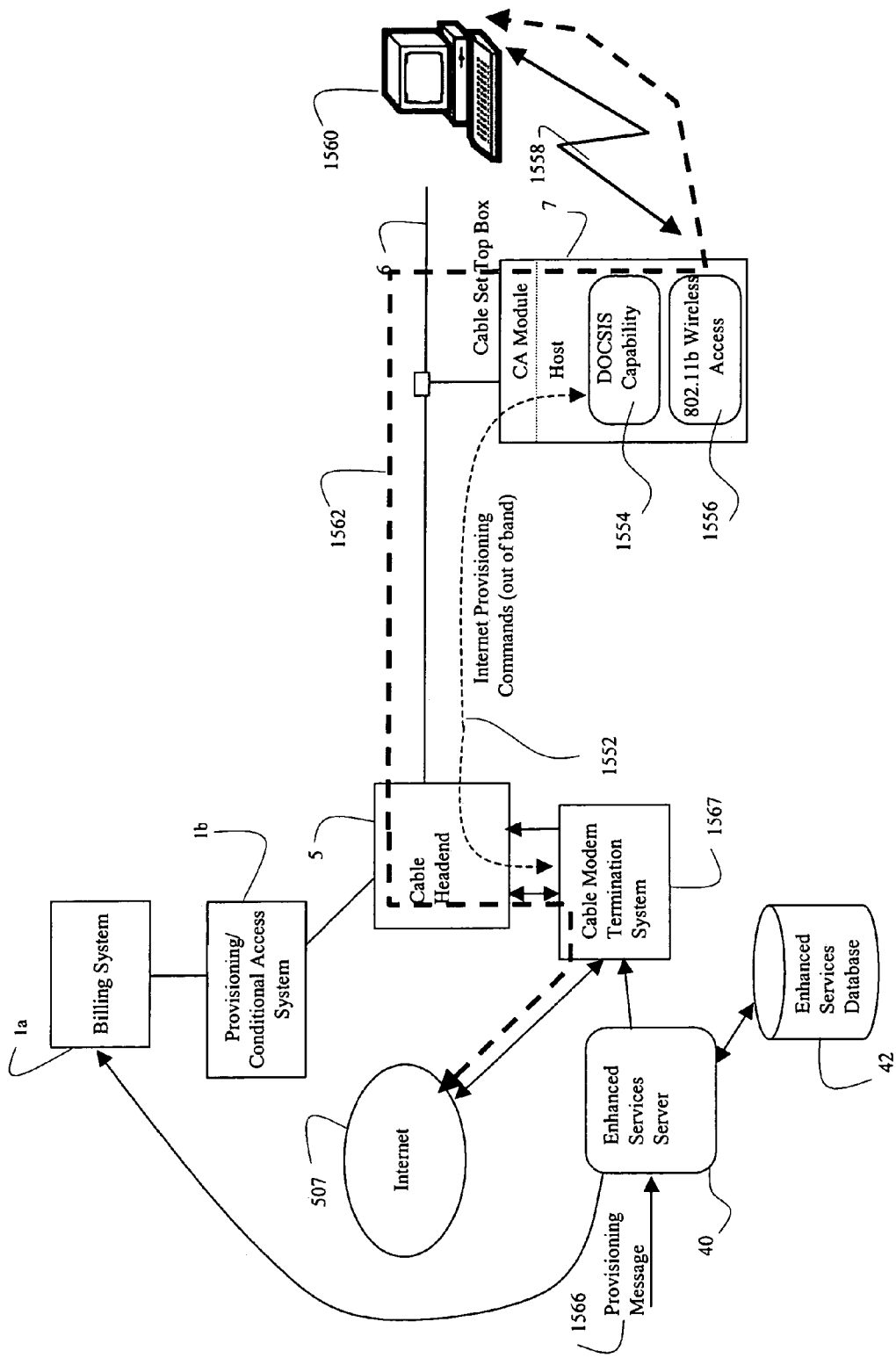

FIG. 22 illustrates one embodiment of the architecture for provisioning a high-speed data service involving IEEE 802.11 wireless access in accordance with the principles of the present invention.

Figure 23:
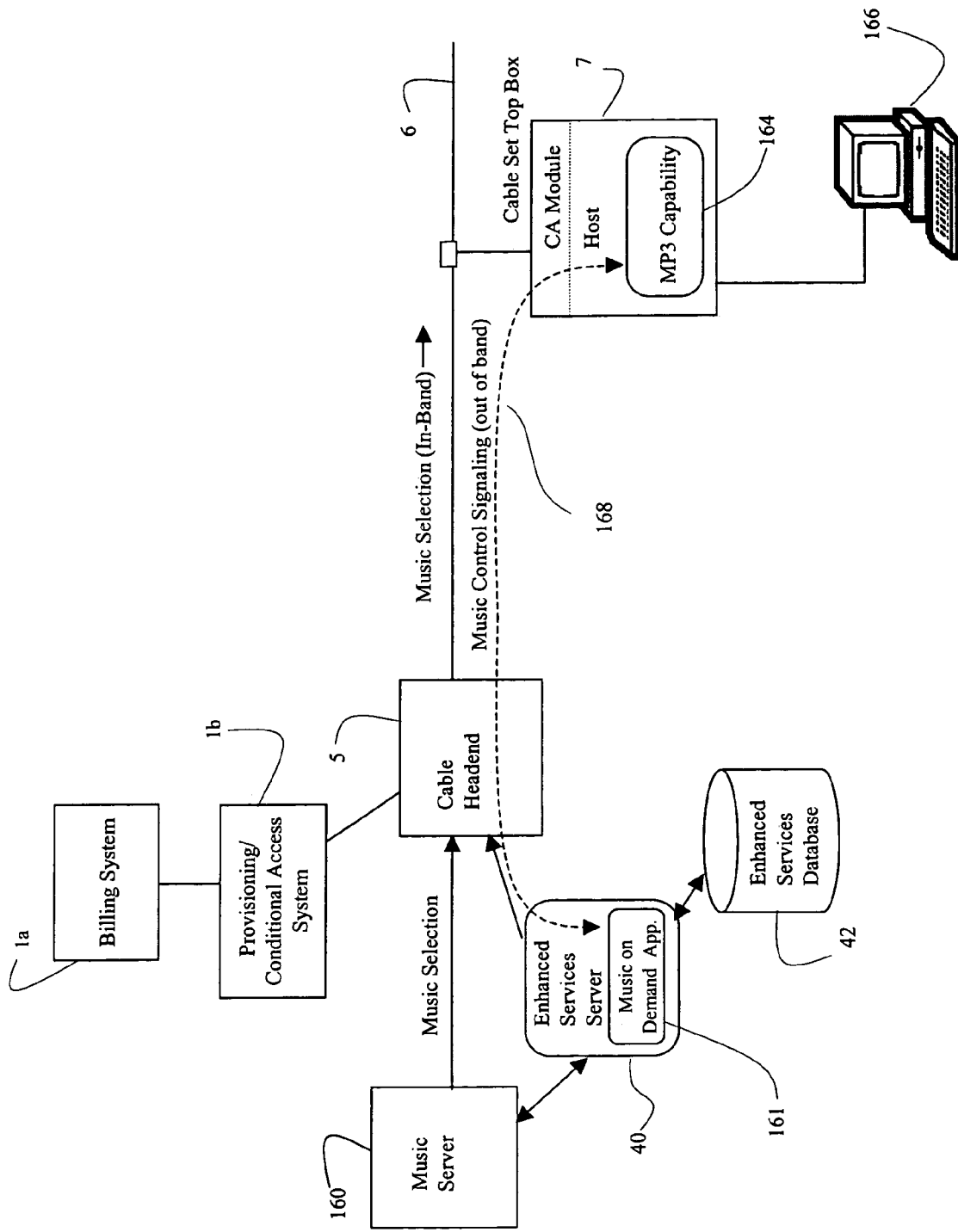

FIG. 23 illustrates one embodiment of the architecture for provisioning a music-on-demand service on a two-way cable network in accordance with the principles of the present invention.

Figure 24:
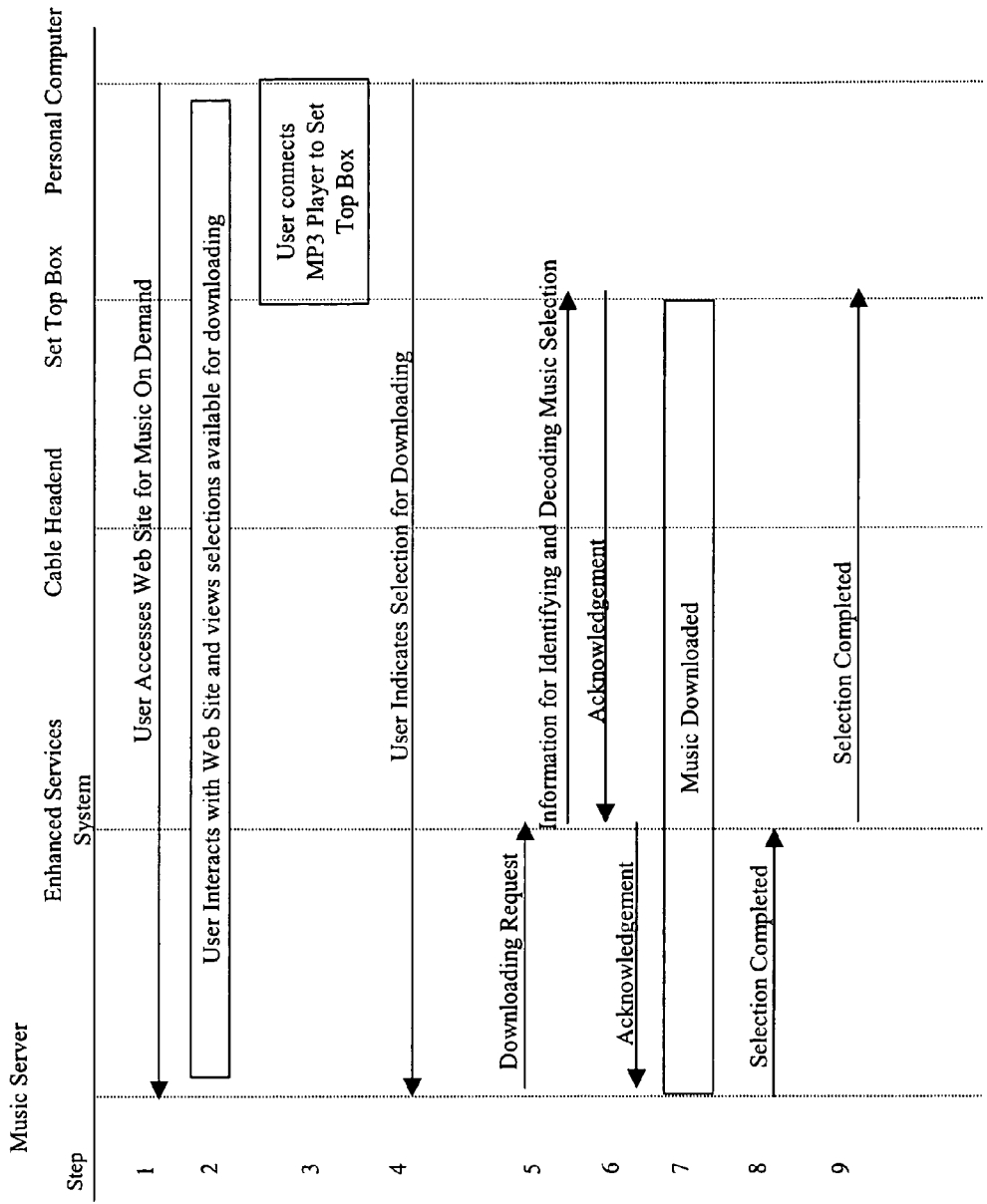

FIG. 24 illustrates one embodiment of the provisioning message flow for a music-on-demand service on a two-way cable network in accordance with the principles of the present invention.

Figure 25:
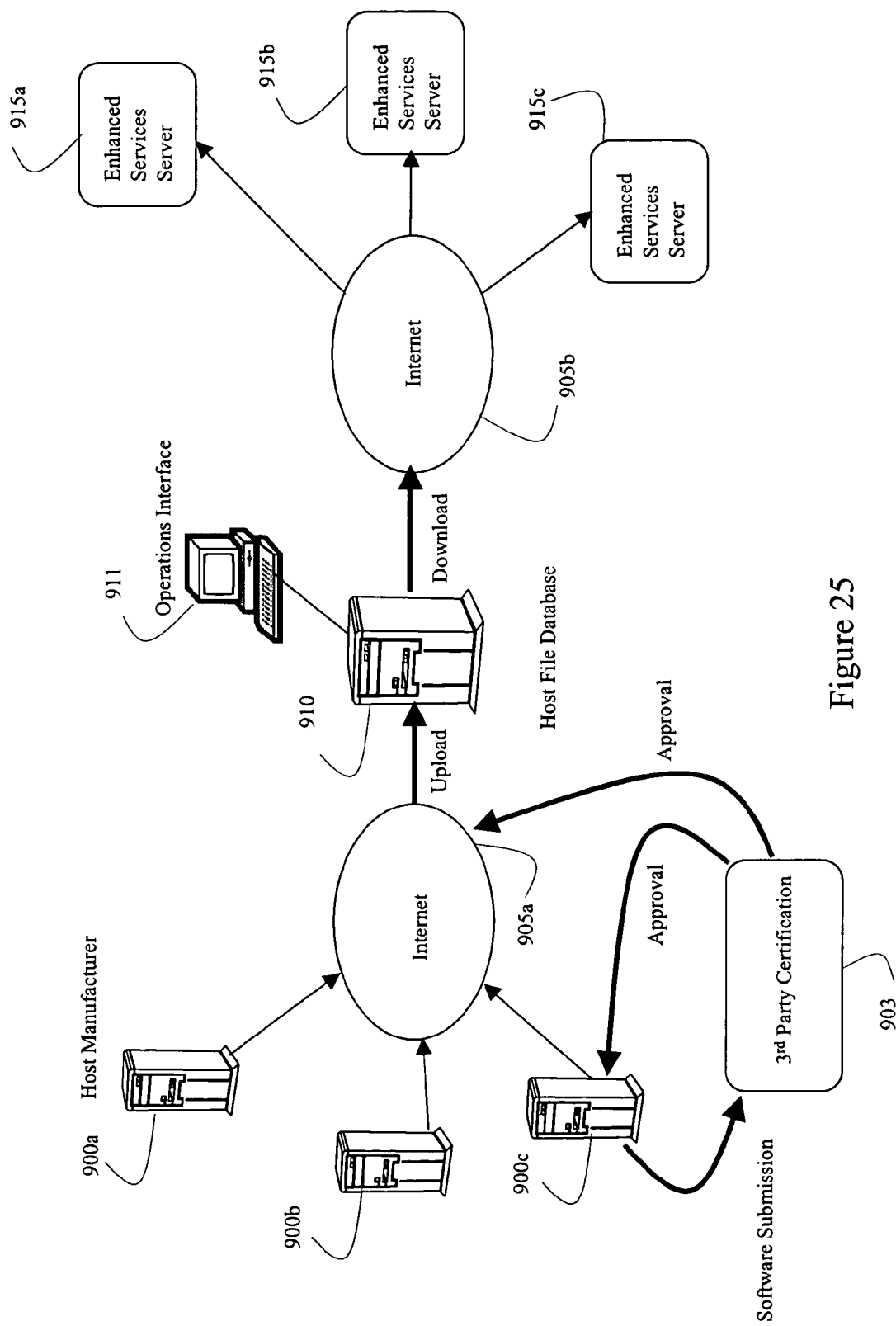

FIG. 25 illustrates one embodiment of the Host Files Database repository in accordance with the principles of the present invention.

Figure 26:
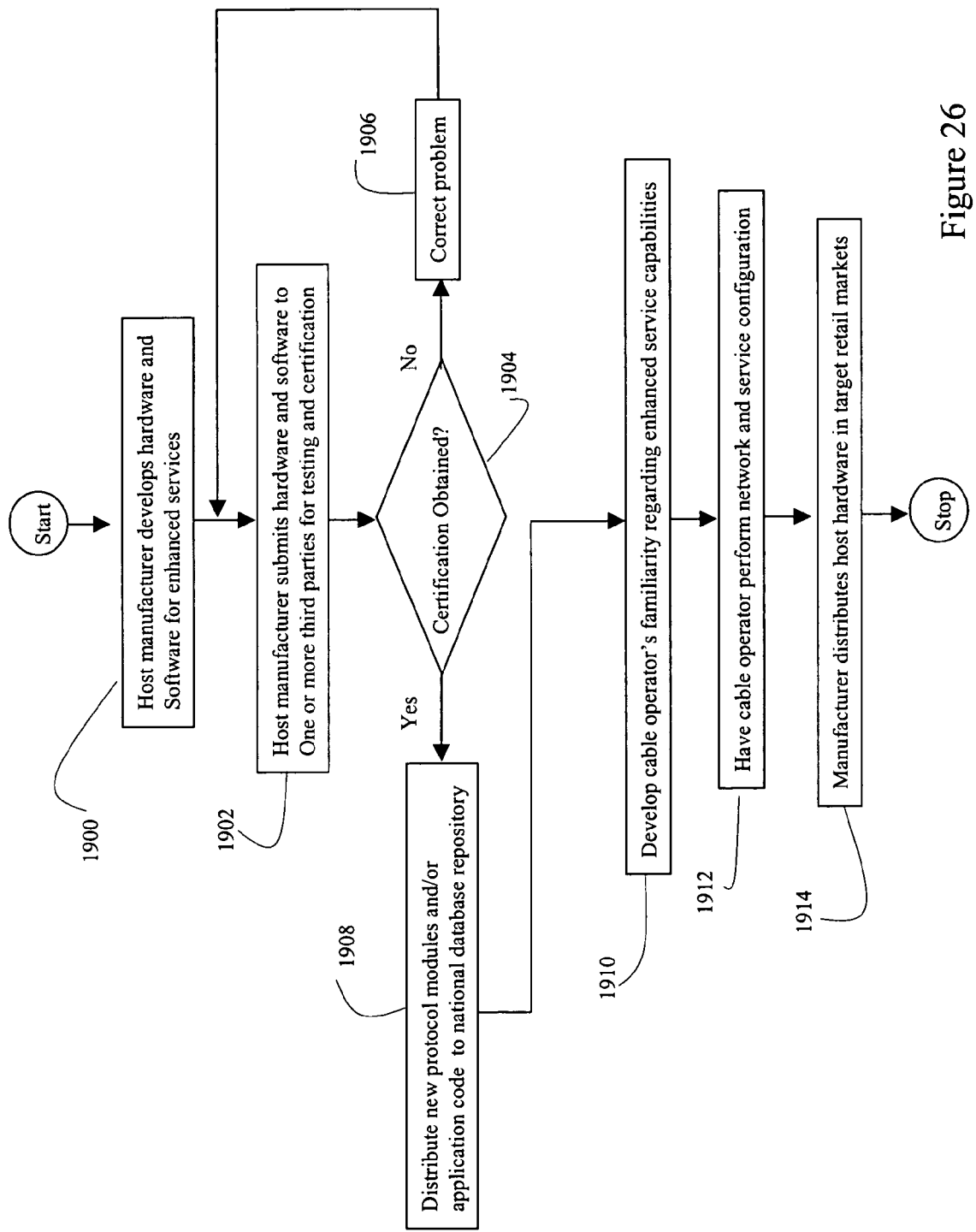

FIG. 26 illustrates one embodiment of the host manufacturer's procedures for introducing a host into the supply chain in accordance with the principles of the present invention.

FIG. 27 illustrates one embodiment of a host profile file in accordance with the principles of the present invention.

Figure 28:
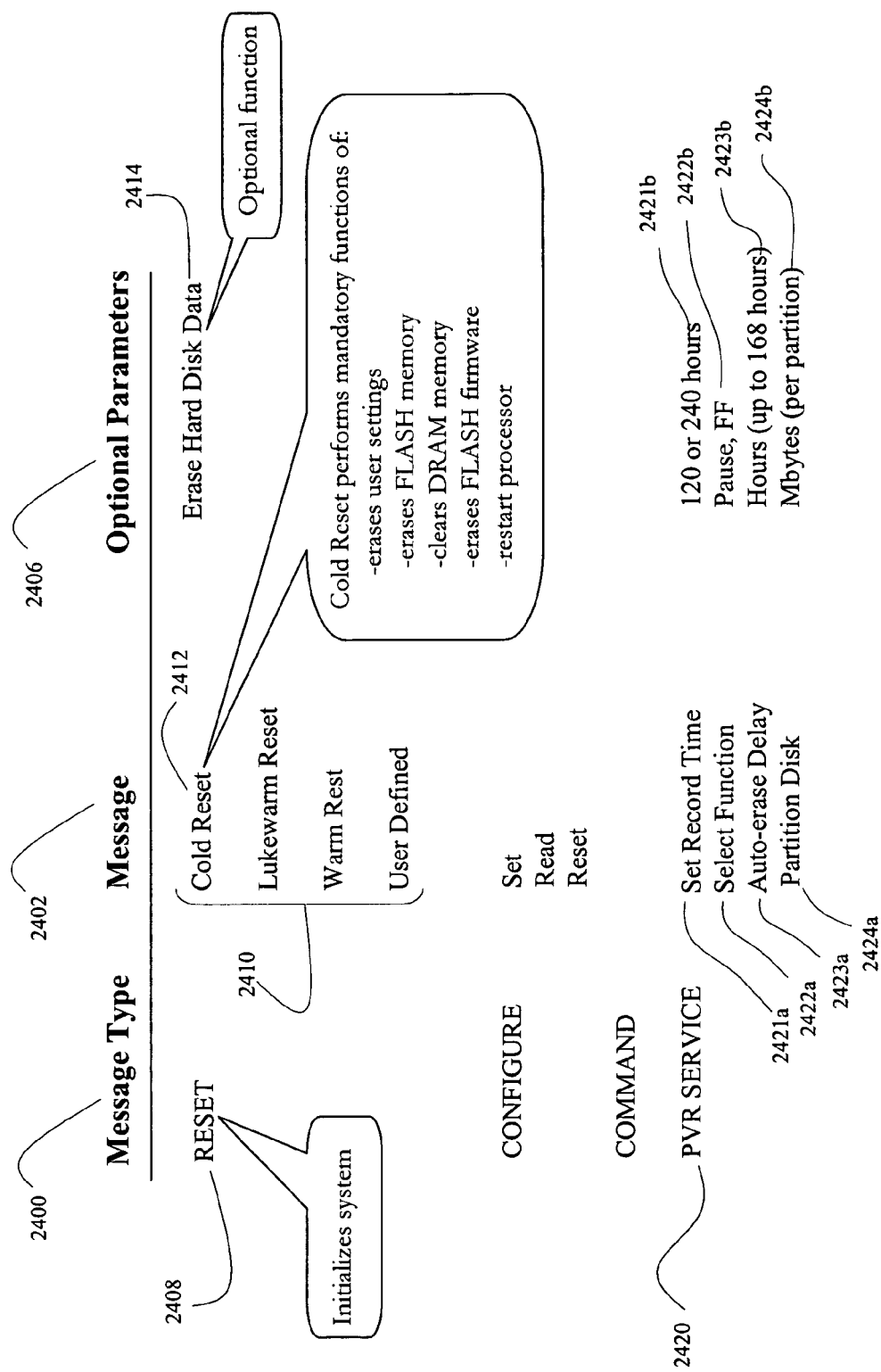

FIG. 28 illustrates one embodiment of a host protocol file in accordance with the principles of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Overview

It is desirable that systems and methods be designed to allow various host manufacturers the ability to implement new service capabilities using new messages and minimize the coordinated development of new capabilities in the conditional access module and cable headend. Rather than require coordinated development in these legacy systems for each new capability introduced by a host, it would be desirable to utilize existing capabilities to work around limitations in the legacy system. By minimizing developing new functionality in legacy systems for each new host, greater flexibility would be provided to host manufacturers for developing new host capabilities. A scheme for enabling new services should allow use of existing conditional access modules for existing ('legacy') capabilities, such as authorizing premium channel viewing and pay-per-movie viewing. Thus, existing mechanisms used for message decoding, decryption, and authentication should be retained for controlling existing digital video, premium, and pay-per-view services. Further, these existing mechanisms should be allowed, if desired, as a step or component in configuring an enhanced service. Enhanced (non-legacy) capabilities and services may be offered using the principles of the present invention. It is expected that hosts implementing new capabilities will typically incorporate existing conditional access schemes and capabilities, but new capabilities typically will require use of new messages and parameters for controlling and configuring these new capabilities. Since the new messages for a given host may not be common among all host manufacturers, it is desirable that host-specific messages be accommodated for a plurality of hosts connected to a cable network without requiring modification of the existing infrastructure. This requires the cable system to be able to identify and use the appropriate and possibly unique messaging protocol for configuring an enhanced service capability in a specific host.

Further, while the current video encoding and security schemes are retained as a 'minimal subset' to ensure compatibility of new hosts with legacy systems, it is anticipated that future video coding and alternative security schemes may be developed. For example, hosts may be developed with more advanced video codecs, such as those based on the newer MPEG 4 standard or Windows Media 9®. Alternatively, newer or different conditional access schemes may be developed. A mechanism to allow introduction and evolution to these new capabilities in cable networks should be developed. Thus, a mechanism for allowing 'legacy' capabilities to be augmented should be accommodated as well. This allows, for example, new conditional access schemes and video coding technologies to augment existing schemes.

Further, the implementation of new cable network services operating in conjunction with new capabilities in the host may require appropriate changes to the cable network billing and provisioning/conditional access systems. It is desirable that changes to these legacy systems be minimized as well. It is further desirable that more flexible and accessible service provisioning capabilities are afforded to subscribers as well as third parties. Thus, a flexible provisioning architecture is required.

The ability to accommodate different host capabilities provides the opportunity for the host manufacturer to market new hosts in innovative ways. Host manufacturers will typically offer differing host functionality to meet customer needs not yet determined. Thus, support systems must be created to minimize customer dissatisfaction that may occur when a customer purchases a host that may be incompatible with their service needs or cable operator service offerings.

Further, a variety of brands and models of set top boxes may be made available to the cable subscriber through a variety of distribution channels, and a cable subscriber's choice should not be limited to those solely offered by the cable system operator. Each of the various brands and models of STBs should interwork with the cable headend, and should be easily configurable. Further, the conditional access module and host may be embodied in different forms with consumer electronics devices and should not be limited to a separate physical electronics device (e.g., 'box') connected to a television.

Various systems and methods are disclosed allowing cable subscribers to purchase set top boxes at a retailer for use in receiving cable services. Cable subscribers may purchase their set top boxes (STB) from a variety of distribution channels, including consumer electronics retail store, retail, mail order, and Internet based retailers. In addition to selling STBs, retailers may also provision services for the cable subscriber. Retailers provisioning the service on behalf of the cable STB purchaser accomplish this by accessing a provisioning network. Alternatively, the cable subscriber themselves may provision their services by accessing the provisioning network, albeit with a different level of functionality and user interface. In still another alternative, the cable subscriber may interact with a cable system representative ("agent") to provision services. The provisioning network then interacts with various elements to configure the host as appropriate, including new systems such as an enhanced services system as well as legacy systems, such as the billing and/or provision/conditional access system.

Traditionally, the set top box has been a separate device provided by the cable system provider and is typically co-located adjacent to the television it is connected with. However, as used herein, a "set top box" may be embodied in various forms, and is not constrained to the traditional embodiment of a separate electronics box comprising conditional access module and host functionality where the box is connected to a television. The functionality of the conditional access module and/or host may be integrated into various embodiments of consumer electronics devices, including digital televisions, monitors, or projection devices. The functionality may be embodied in a circuit board interfacing with a personal computer. Alternatively, it may be integrated into a home theater sound system or other video consumer electronics equipment, such as videocassette recorders, personal digital video recorders, media gateways, video game devices, and other types of digital video and/or audio devices. The set top box may incorporate functions typically not incorporated in current set top boxes, including personal video recording capabilities, audio and data capabilities, and telephony based capabilities. A cable subscriber may have several such embodiments in their home with different capabilities and receiving different services from the cable system provider. All these and other embodiments are within the scope of "set top box" as used herein. Further, all the aforementioned services offered on a cable network could be services available to a 'cable subscriber'. No limitations on the embodiment of the functions associated with the set top box are intended based on current or past embodiments of the STB, host, conditional access module, or current cable service offerings. Further, it is not even required that the host devices manipulate video. As it will be seen, the principles of the present invention may apply to non-video applications, including telephony, MP3-based music recording and playback, and high-speed data services (e.g. Internet access) or other capabilities. These and other capabilities may be marketed or implemented in different consumer electronics device combinations.

Further, although a STB has traditionally comprised a host and embedded conditional access module, there is nothing limiting application of the present principles of the present invention only to devices having a physically separable conditional access module. For example, consumer electronic devices, such as digital televisions, may incorporate integrated host functionality allowing connection of a physically separate conditional access card. Further, other embodiments may utilize downloadable software in lieu of a conditional access card, where downloadable software configures the consumer electronics device for the particular conditional access method. The functionality of the conditional access module may be integrated into the host. Thus, a manufacturer may implement a STB that functions only with a particular conditional access scheme, or that stores a library of conditional access schemes allowing selection and enablement of the appropriate scheme for a particular cable system provider. The activation of a particular conditional access module may be enabled by payment of an appropriate fee, for example. Alternatively, compatible software for operating a particular conditional access scheme may be loaded and stored in non-volatile memory of the device at the time of sale using a variety of technologies and media. Thus, the functionality of a host and conditional access scheme may be integrated into various forms of consumer electronics devices without the consumer requiring a physically separate STB. In summary, the functionality of the host conditional access module, and consumer electronics device may be combined and implemented in various physical forms and combinations. Thus, any consumer electronics device interfacing with a service provider, for the purposes of providing services and associated functions in conjunction with a network, including a cable network, falls within the scope of the present invention.

In illustrating the concepts of the present invention, typical embodiments of the STB are illustrated in conjunction with a cable network, though such embodiments do not limit the application of the principles of the present invention only to cable services. It is typical that current set top boxes comprise a host (which usually includes a processor, software, and related components), a conditional access module, and various interfaces for external devices. The conditional access module is used to decrypt and decode not only basic digital cable selections, but also various premium services, including premium channels (e.g., Showtime® and HBO®) and pay-per-view services. The principles of the present invention facilitate providing new services by the cable operator without having to upgrade the conditional access module functionality or other legacy systems or elements. Thus, the present invention is not dependent on a particular conditional access scheme. However, nothing prohibits using the principles of the present invention to invoke legacy services by providing capabilities mimicking current capabilities, such as enabling more flexible premium or pay-per-view services or using a yet to be defined conditional access scheme. Thus, the present scheme could be used to configure and control legacy type services using a yet-to-be-defined conditional access scheme. In such instances, the conditional access functions could be viewed as residing in the host, as opposed to the conditional access module. Further, the present scheme allows use of legacy capabilities as a component in the steps of configuring a new capability. Thus, a new service may be accomplished by a combination of configuring new host capabilities along with using legacy based host capabilities.

The host may incorporate a variety of new capabilities and each capability may require host-specific messaging. Some capabilities may be unique to a service, while others may be used as components in several services. Cable system operators interact with a specific brand and model of a host by using host-specific files. The host-specific files may be provided to a cable system operator by a Host File Database downloading the appropriate host files. The HFD could automatically send the host files to the cable system operator, or the operator could request the host file. Each set top box manufacturer deposits the appropriate host file(s) in the Host File Database to facilitate distribution of the hosts' files to cable system operators. Alternatively, other distribution channels may be used to convey the host file directly from the set top box manufacturer to the cable operator. However, the ability to access host files for a specific type of host at a central location facilitates the rapid development of new service offering on cable networks as well as support for new hosts.

Once downloaded, the host protocol files are used by the cable system operator to create a "configuration message set" used to configure and enable a specific set top box for the desired service. The configuration message set is one of several types of host-specific files. One type (called the host profile file) describes the functionality of a host and another type (called the host protocol file) provides protocol messages for configuring the host. The profile files are used in part to drive a user-interface on a application running on a workstation used to create a configuration message set. The configuration message set incorporates the protocol messages in the host protocol file in conjunction with service related parameters to define a host-specific message to configure a specific type of host for a specific service. The configuration message set is typically a series of commands configuring the appropriate parameters in a host or instructing the host to performs certain functions in order to accomplish the desired service operation.

When a set top box is initially configured for a specific service, a check is typically made contemporaneously to determine that the host brand and model is supported by the cable operator for the desired service. If not supported, the cable system operator can obtain the desired host file, define the appropriate configuration message set, and then offer the service in conjunction with that type of host.

The use of host-specific files allows host manufacturers to create and deploy different host capabilities without being constrained by cable operators waiting for industry consensus among various entities for standard messages to be agreed upon. Thus, host vendors are not required, nor expected, to implement an identical set of capabilities or the same messaging protocols for configuring or enabling these new capabilities. Host manufacturers can build, market, and distribute hosts without being constrained to the lowest common denominator of compatible cable network services. Further, cable operators can support new services and hosts without being constrained to the lowest common denominator of support in the legacy cable system for messaging compatibility across STBs. It is assumed that STBs incorporating these new capabilities will support legacy type capabilities allowing a existing services to be provided.

Although the cable network services are described as operating in the context of a traditional coaxial-based physical distribution network, the principles of the present invention are not limited any particular form of network distribution technology or architecture. For example, the principles of the present invention may apply to a cable network comprising metallic coaxial transmission facilities, optical fiber transmission facilities, or even wireless transmission technologies. Various architectures, including rings, star or tree architectures can be used. The wireless transmission technologies could incorporate satellite or terrestrial based technologies, such as Local Multipoint Distribution Services (LMDS) and Multichannel Multipoint Distribution Services (MMDS) operating at various frequency ranges. Various distribution architectures can be used with the various transmission technologies, including broadcast, hierarchical tree, rings, interconnected sub-nets, etc. Thus, "cable system operator" or "cable system" or "cable network" does not limit application of the principles of the present invention to any particular transmission technology or distribution architecture. Further, the principles of the present invention are not limited to the delivery of video services over a cable distribution network, but could apply to delivery of other types of single or multimedia services over other networks. For example, high-speed data services (a.k.a. broadband services) using an IP (Internet Protocol) based network, including s Video-Over-IP, Voice-Over-IP, or other types of broadband services can benefit from the principles of the present invention. Delivery of enhanced voice and data services over cellular networks, including services utilizing 3G technology, graphical or video communication services, EDGE, CDPD, or other forms of wireless data transmission.

Subscriber Set Top Box Acquisition

Figure 1:
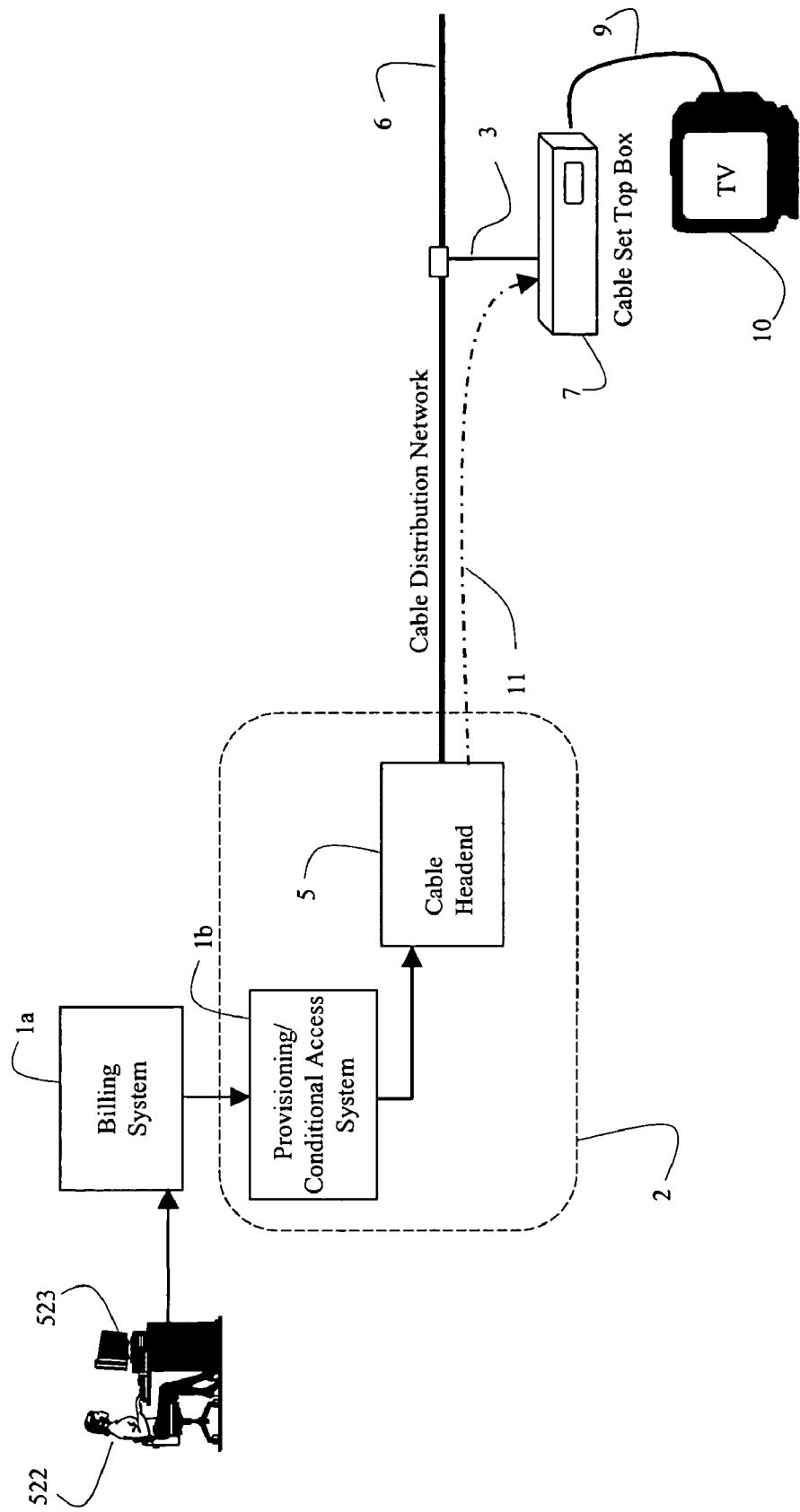
FIG. 1 depicts the prior art of a cable network including a billing and provisioning/conditional access system and a set top box connected to the cable network.
Figure 2:
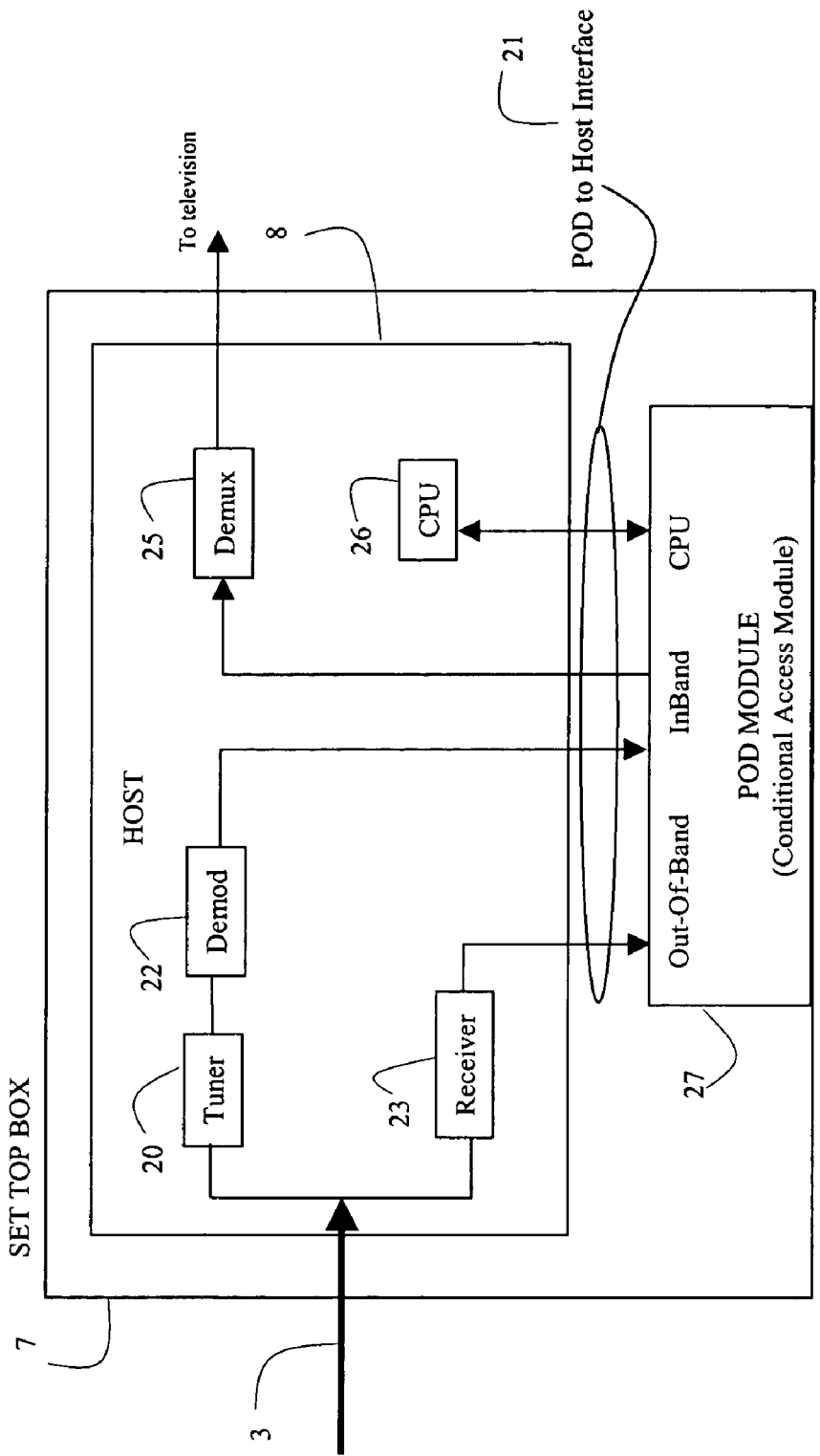
FIG. 2 depicts the prior art of various functions associated with a one-way set top box.
Figure 3:
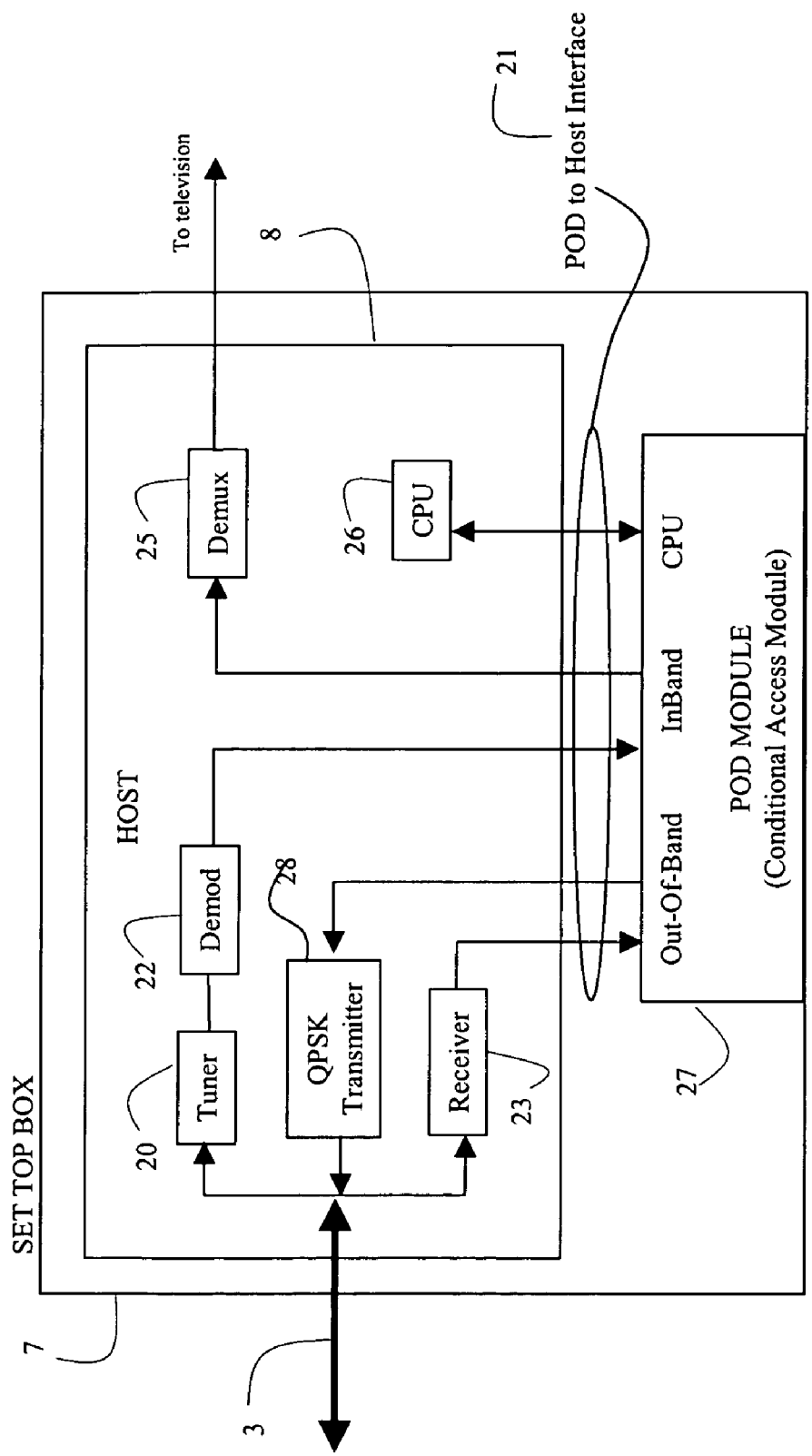
FIG. 3 depicts the prior art of various functions associated with a two-way set top box.
Figure 4:
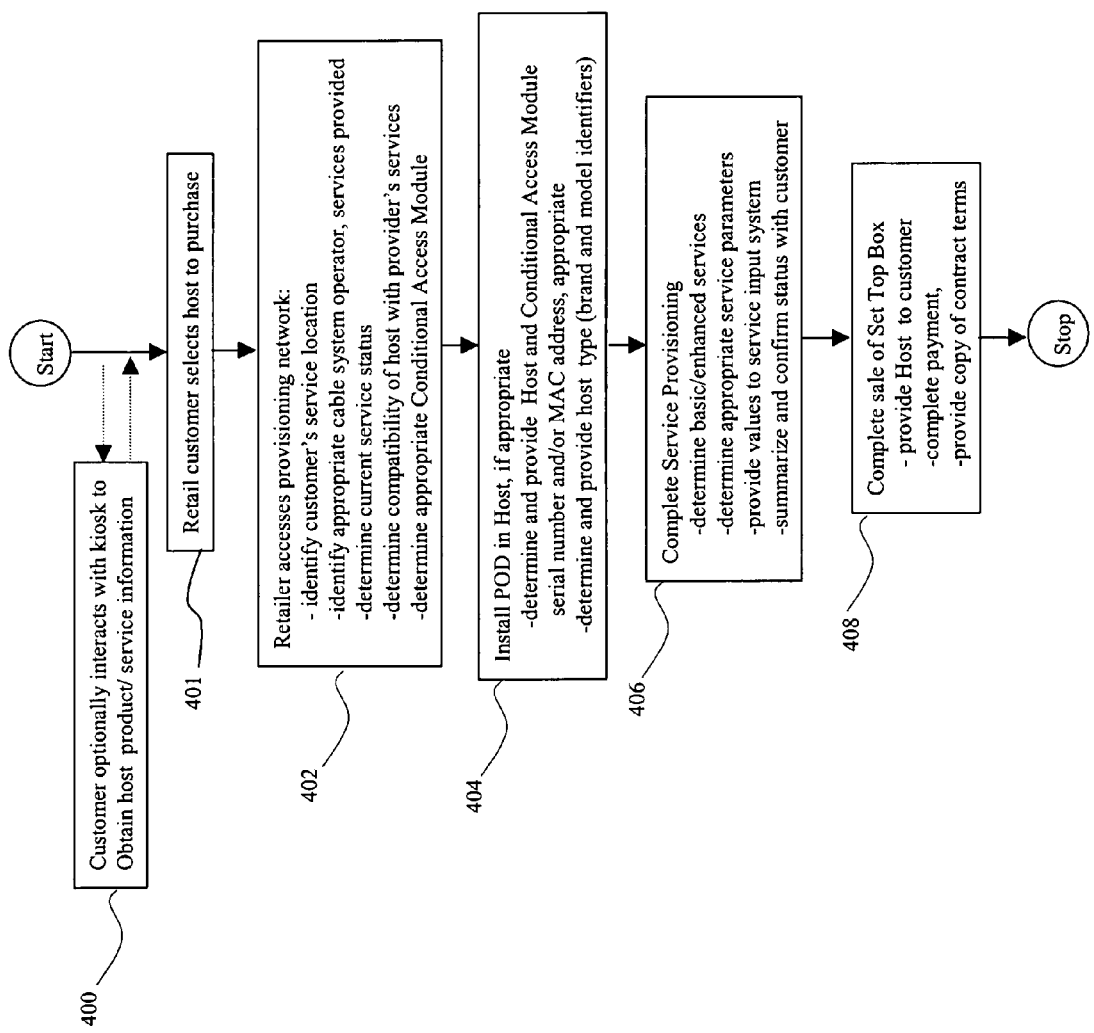
FIG. 4 illustrates one embodiment of functions associated with a third-party retailer provisioning a service for a customer in accordance with the principles of the present invention.

The cable subscriber can obtain the set top box or host in a variety of ways using different marketing/distribution channels. One embodiment of this process is illustrated in FIG. 4. The cable subscriber can obtain the set top box through any distribution channel, including mail order, telephone or Internet access, retail stores, specialty electronics, chain stores, or general merchandise stores. The embodiment illustrated by FIG. 4 is based on the user purchasing the set top box at a retail store, such as an electronics specialty store or remotely from a mail order based specialty distributor. As a wide variety of manufacturers and features are possible, the customer may require further product information and assistance in the selection of a host. In step 400, the customer may access a self-serve kiosk providing description of the features and/or a comparison of various models. The kiosk may comprise a touch-screen monitor interacting and educating the customer about host features, various cable operator services, and compatibility between the two. The kiosk may access a third-party web site providing such serviceability and compatibility data. Alternatively, the customer may obtain this information via other sources such as directly from the third-party website offering user-interface comparing features and compatibility.

Next, in step 401 the customer selects the particular host to purchase. The retailer may assist the customer in determining if the set top box is compatible with the customer's selected cable service provider. In some cases, the customer may already know the exact host brand and model, and the retailer need not verify compatibility, but typically customers will require some assistance. Thus, in step 402 the retailer accesses a cable service provisioning network. The provisioning network may be accessed with the aforementioned kiosk, or a dedicated PC terminal having Internet access to an informational website or a third-party offering an informational website. The retail sales personnel uses the service provisioning network to select the appropriate cable system operator for the customer. In many cases, there may be more than one potential service provider serving the customer's service location. The service location is typically indicated by mapping the customer's address or telephone number to a geographic location, which is then compared to the various service providers' serving areas. The 'location data' provided by a customer can be their name, address, telephone number, zip-code, neighborhood name, etc. other information than can be used to derive the service location desired by the customer. The mapping can be accomplished by using geographic information systems as is well known in the art. In other instances, the customer may already have an established business relationship with a service provider. In this case, the customer may provide their account number pertaining to their current cable provider or other related service provider specific information. If the customer is an existing cable service subscriber, the provisioning network allows the customer's current service status be verified, namely to determine their status and currently subscribed services. Frequently, existing customers may upgrade or alter their services. Once the appropriate current or proposed cable service provider is selected, the retailer can compare the compatibility of the host capabilities with the network services. The customer may be presented with information of which services are offered by the cable system operator and which of those services can be supported by the particular host. Not all hosts will incorporate the same level of functionality for supporting enhanced services. It is expected that as certain capabilities prove popular, more and more host manufacturers will incorporate those capabilities in their host products with a similar subset of core features.

When purchasing a set top box, the purchaser may be required to obtain the appropriate conditional access module, if the host requires an externally connected conditional access module. Alternatively, the aforementioned techniques of downloading or enabling the appropriate conditional access module may be used. The type of conditional access module is dependent on the conditional access scheme used in the particular cable network servicing the subscriber. Thus, if the retailer provides the conditional access module, then the retailer must select the corresponding type of conditional access module that is compatible with the conditional access scheme and enable it. Typically, in such cases the retailer will install or otherwise enable the conditional access module in the host. This is illustrated in step 404. In other cases, the retailer may not be providing the conditional access module and the customer may need to obtain the conditional access module from their cable provider and install it. Installation may involve simply installing a card (e.g., similar to a PCM-CIA card) into a slot that mates with a connector. Whether the conditional access functionality is embedded with the host circuitry or embodied by a separate card, the conditional access module typically is associated with identifying numbers, such as a serial number and/or a MAC address that is provided to the cable network for use in communicating with the device. These number(s) may be affixed to the module, affixed to the package containing the conditional access module, or indicated in some other manner, whether in machine readable form or human readable form. Alternatively, the conditional access module may not be provided by the retailer with the host, and the retailer only provides host related information. The retailer typically provides the identifying information to the provisioning system as well as information pertaining to the host type, typically as identified by the host manufacturer and model identifiers, although other identifying means can be used, such as code abbreviations, industry agreed to identifiers, etc. In some cases, a bar code reader is used to read a bar code on the unit indicating this information. It is possible in certain situation that a customer's existing conditional access module can be used in another host should the cable subscriber decide to upgrade their set top box. In such situations, the customer may physically hand over a conditional access module to the retailer for installation, or alternatively install the module themselves. In either case, the information associated with the conditional access module is typically provided as part of the provisioning process. In other situations, when a subscriber upgrades their host, a new module may be required. It is likely the new host along with the previously obtained module will have to be re-initialized. Typically, it is not possible to swap conditional access modules from one host to another host without having the cable operator re-initialize the conditional access module/host. The conditional access schemes are designed to prevent theft of cable services and simply installing an unauthorized conditional access module into another host will not allow reception of cable services.

The retailer completes the provisioning process in step 406 by selecting the services desired by the customer. In some cases, the cable system operator may market two services that are very similar or they may choose to market a single service with multiple options. For example, a basic version of a personal video recoding service and a deluxe version could be marketed as one service with an optional upgrade or as two separate services. The only difference in configuring may correspond to setting a specific parameter(s) with different values. As it will be seen, the choice of marketing by a cable system operator of services does not typically determine how the configuration messaging occurs in the host.

As part of the purchase of the device or services, the retailer will typically summarize the services, parameters, and charges, and provide the customer with a paper-based printed summary as part of finalizing the service contract. Alternatively, the information may be provided to the customer in an electronic form, such as via an email message or loading the data into a solid-state memory chip. The retailer will typically also provide the customer with a transaction reference number that may be used to identify the transaction to the cable system operator. In some ways as will be discussed subsequently, the transaction may be viewed as a pending transaction that has not been yet fully acted upon. Lastly, in step 408 the retail sale of the set top box and associated services is completed and payment is received using traditional forms of payment, including credit cards. The customer typically pays for at least the physical device purchased. Depending on the business relationship between the retailer and the cable service provider, the customer may also pay in advance for the provisioned cable services.

While the previous example illustrates the customer purchasing a new STB in conjunction with cable services, this is not a requirement. The customer may be only purchasing a new host for use with their existing cable services and conditional access module. For example, the set top box purchased may have other capabilities desired by the customer (e.g., smaller size or a more stylish case) or the new STB may replace a non-functioning model. Further, a STB may be purchased by a customer in anticipation of future activation of services. In this situation, it follows that there may be instances where the customer subsequently only purchases the enhanced service at the retailer without purchasing the set top box. Alternatively, only a basic service may have been purchased. Further, there is no requirement that the STB and service must be purchased at the same retailer. In instances where the customer has an existing STB, the provisioning network may be able to access information from the customer's cable system provider regarding the STB currently used by the customer and complete service provisioning.

Another system accessed by the retailer may assist in comparing service offerings of various cable system operators with the various hosts being considered for purchase by the customer (this may be integrated with the provisioning network or accessible as a separate system). As indicated, hosts typically provide different capabilities and if a customer desires a specific service, the host should be compatible with the service offering. The comparison of cable system services and host capabilities is illustrated in FIG. 5 for this embodiment.

Figure 5:
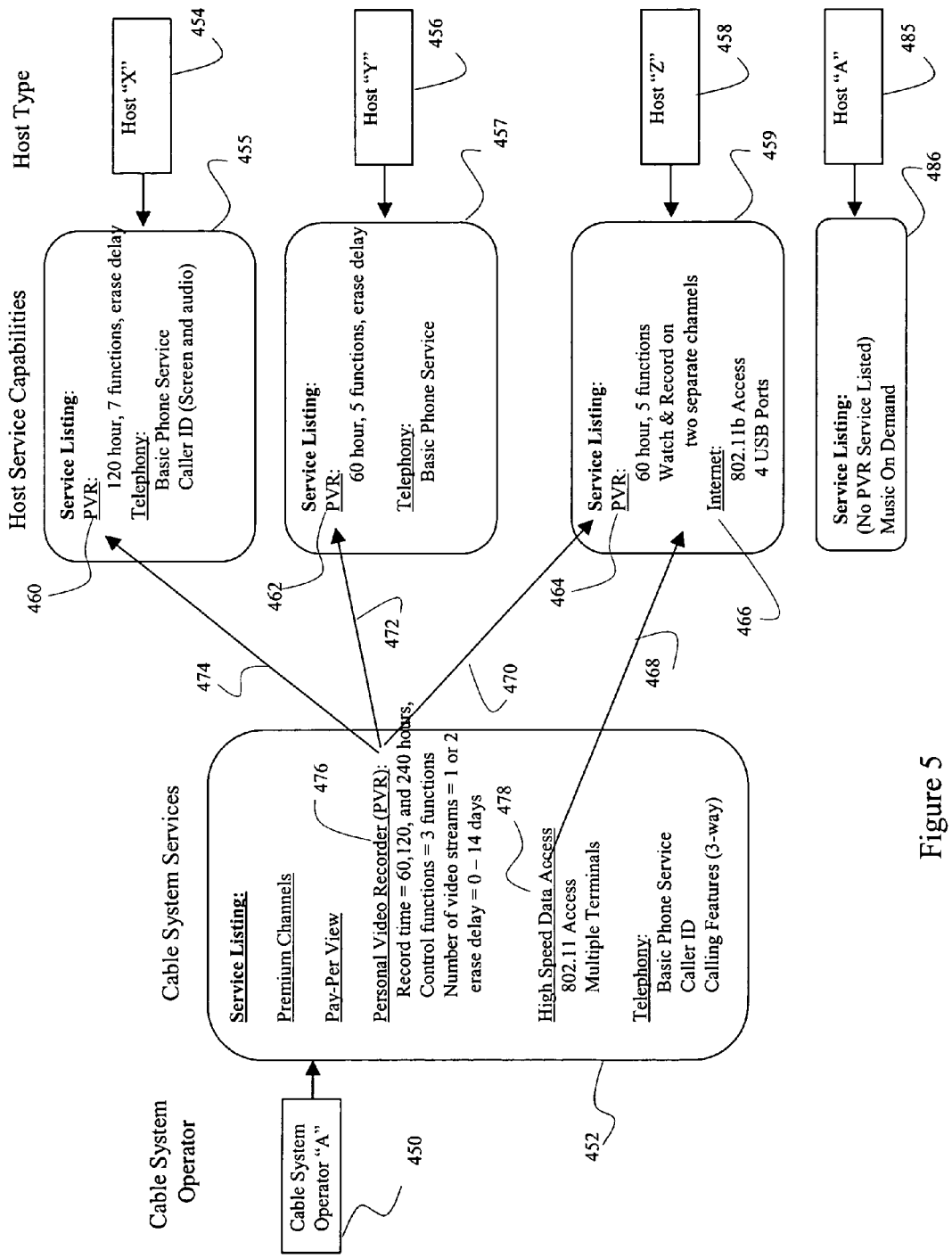
FIG. 5 illustrates one embodiment of functions associated with comparing services provided by a cable system operator with selected host products in a retail provisioning system in accordance with the principles of the present invention.

FIG. 5 illustrates one cable system operator 450 being considered by a hypothetical customer. It is not unusual for a customer to have only one cable system operator providing service in a given area, consequently only one cable system provider 450 is illustrated in FIG. 5. A list of service offerings 452 associated with the cable system provider is illustrated, and this usually includes basic service packages (e.g., typically pre-defined 'bundles' of channels) as well also premium channels, and pay-per-view services. The list of offered services is exemplary, and other service providers may offer more or different services, such as Interactive Television (ITV), interactive video games, information services, etc. The list represents legacy services currently available to cable subscribers, (e.g. "legacy services") and new services ("enhanced services"). In this embodiment, three enhanced services are listed: Personal Video Recording (PVR), high-speed data access (Internet access), and telephony service. All of these are potential services that can be provided over the cable network. The use of an enhanced service typically requires corresponding host functionality.

The host functionality is illustrated as well in FIG. 5. In this embodiment, the customer has selected four Hosts: Host "X" 454, Host "Y" 456, Host "Z" 458 and Host "A" 485. These may correspond to four different manufacturers (brands) of hosts, four different models by one manufacturer, or various combinations. It is possible that the same model of the same brand to have different software releases. This may be the case where different protocol releases exist, or when an internal upgrade to the host architecture requires an updated host file. In this embodiment, each host corresponds to a different brand providing different capabilities. Host "X" 454 for example, is shown as providing a list of services 455 including PVR 460 and telephony services. The PVR service 460 capability allows a maximum recording time of 120 hours, use of 7 control functions, and an erase delay (program retention time) capability. The recording time may be dictated by the hardware components, such as hard disk storage capacity. The telephony capabilities allow a telephone to be connected, and this host is listed as providing basic telephony service and caller ID capabilities. In this embodiment, the caller ID can be provided both by displaying the number on the television and by audio speech synthesis. Similarly, Host "Y" 456 has associated services listed 457 that also incorporate PVR 462 and telephony capabilities. In this instance, the PVR service 462 only has 60 hours of recording time reflecting the storage capacity of that particular host. Host "Z" 458 has services listed 459 including both PVR 464 and high-speed data (Internet) 466 capabilities. However, Host "Z" incorporates two tuners allowing the ability to simultaneously watch and record two separate channels.

Finally, Host "A" 485 has a service listing 486 that provides music-on-demand capabilities, but does not provide PVR capabilities. Thus, this Host does not have the capability to provide PVR service. Further, the cable system operator does not provide a music-on-demand service. Thus, a subscriber desiring PVR service would not likely select this host, since the cable system network operator would not be able to enable the host for that service. Nor would a subscriber desiring music-on-demand service be able to use this host to obtain the corresponding service since the service is not available from the cable system operator.

The compatibility of the cable system services 452 and the various host service listings 455, 457, 458, 459 are represented by the various arrows 474, 472, 470, 468. Specifically, the PVR service 476 offered by the cable operator is compatible with the PVR capability 460, 462, 464 in the hosts. This is indicated by various mapping lines 474, 472, 470 respectively. However, the high speed data access 478 service offered by the cable system operator is only supported by the Service list 459 of Host "Z." As indicated by the line 468, the corresponding Internet 466 access is only shown in the service listing 459 for Host "Z". The telephony service is not illustrated as mapped in FIG. 5, but it becomes evident that the telephony capability is supported by Host "X" and Host "Y," but not Host "Z." As previously indicated, Host "A" is not compatible with any of the enhanced services offered by the cable system provider. However, Host "A" typically is compatible with the legacy (e.g., basic, premium, and pay-per-view) services offered by the cable system provider and may be purchased by the customer for use with those services.

FIG. 5 illustrates one embodiment of comparing cable system services with host capabilities. This could be embodied in a kiosk-type arrangement where information is presented to the user in a graphical form and allows the user to interactively select, review, and compare various hosts. Alternative embodiments include sales displays, brochures, graphical charts, etc. Further, variations are possible as to how the information can be presented. For example, all the features of the host could be displayed using graphical icons, with those capabilities compatible with the selected cable system highlighted on the screen. In addition, the services supported by the cable system operator that are not supported by the host could be highlighted in other ways. Numerous methods of presenting information to the user can be defined using various colors, shapes, and menu options. Those skilled in the art in web design can readily construct various user-interfaces to facilitate identification, comparison, and selection of compatible services.

Figure 6B:
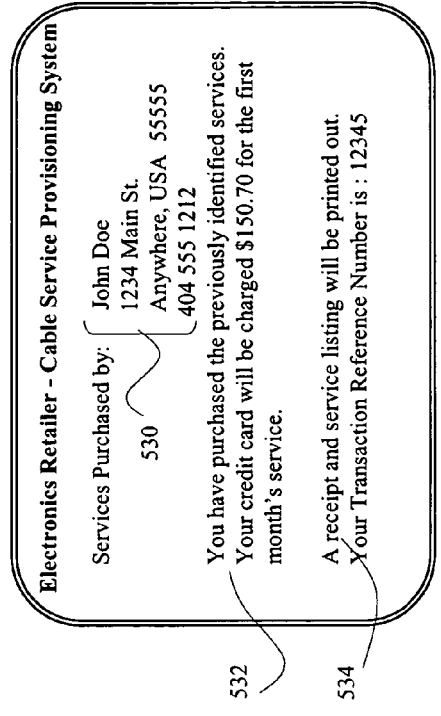
FIGS. 6a-6d illustrate one embodiment of provisioning screens associated with a third-party retailer provisioning a service in accordance with the principles of the present invention.
Figure 6D:
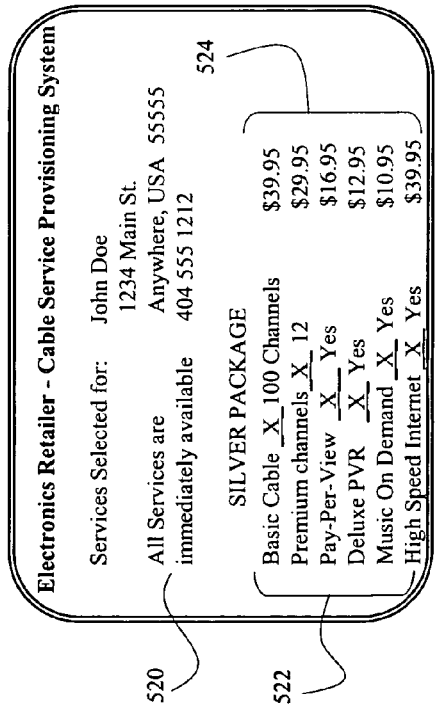
Figure 6A:
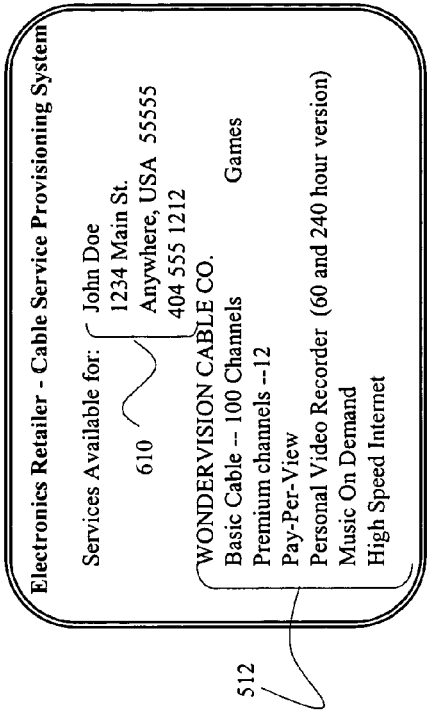

The retailer typically provisions services associated with the STB by accessing a provisioning network, typically implemented using a dedicated PC connected to the Internet. The retail sales personnel accesses a secure website typically dedicated to, and only accessible by, authorized retailers for provisioning service capabilities for the purchaser. Although the use of web servers on the Internet is one embodiment, other data communication facilities and networks can be used, including virtual private networks, Wide Area Networks, X.25, dial-up access, et cetera. FIGS. 6*a*-6*d* illustrate one embodiment of the human-machine interface that may be presented to retail sales personnel and potentially the customer for ordering services. This embodiment may be predicated on a previous determination of the compatibility of the host and cable system provider. In FIG. 6*a*, a display soliciting input is presented and the retailer provides information regarding the potential subscriber. This information typically comprises at least the name, address, and telephone number 500 of the subscriber. It is presumed the serving location is coincident with the address of the subscriber. Further information is typically obtained from the subscriber, such as whether they are an existing cable subscriber 502 and payment terms 503.

Once the system ascertains the subscriber's personal information, it is confirmed. This is illustrated in FIG. 6*b* where the name and address is confirmed 510 and the local cable provider is identified and the services offered are listed 512. This may incorporate a geographical information database to use the customer location information to identify a potential cable service provider(s). In some embodiments further information describing the service aspects, cost, and terms maybe provided. The purpose of this screen menu is to confirm the services available via a potential cable system provider and to provide information so that the customer can select the desired services to purchase.

Figure 6C:
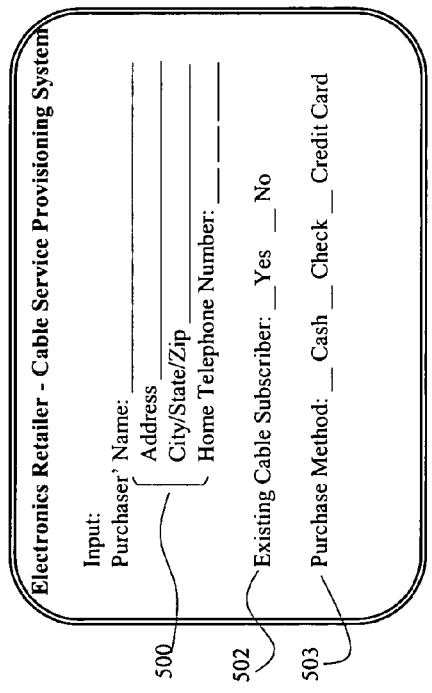

In FIG. 6*c*, the services available by the selected cable service provider are confirmed 520 and are illustrated as selections desired by the customer 522 along with their monthly charges 524. A variety of menus or computer display windows may be provided for other selection options, parameters, and service attributes. In one embodiment, the services selected may be grouped into a bundle to facilitate selection, such as in this embodiment where the services are part of a 'Silver Package.' Other embodiments may allow individual service selection, or have other types of packages identified with other names. Once all the information is collected and processed for submission, the provisioning network confirms the services provisioned as shown in FIG. 6*d*. In FIG. 6*d*, the name 530, charges 532 and services 534 are confirmed and summarized so that the purchaser has a record of the transaction details. In this embodiment, all the relevant details are printed out on paper and provided to the customer as a physical copy of the transaction. The summary typically includes a transaction reference number that identifies the provisioning transaction. As will be seen, the transaction reference number may be used by the customer when activating their host, particularly if the cable network is a one-way network.

The preceding represents one embodiment for purchasing services. The purchasing of services is not required to occur with the purchasing of the set top box. For example, in this embodiment, the user selected their STB and the desired services, which the STB was determined to support. Alternatively, the customer may have previously purchased a STB that supports all of the services, and is just now purchasing and provisioning the indicated services. While variations on the user menus and content are readily discernable, the embodiments of FIGS. 6a-6d illustrate some of the steps that may be required for a retailer provisioning a STB and related cable services. Further, some aspects of the provisioning system may be proprietary to the retailer. For example, the retailer may implement a self-serve kiosk informational host marketing system listing the brands of hosts stocked by the retailer and providing comparative information or they may access a third-party serviceability database. Once the customer selects the host, a separate provisioning system may be accessed by the store personnel. The provisioning system can still check whether the host is compatible with cable system operator. Alternatively, the provisioning system may access a third-party serviceability database that maintains this information. Alternatively, the information host marketing system and the provisioning system may be integrated. Further, either embodiment of the provisioning system could be integrated with the retailer's point of sale system and/or inventory control system, as well as support multiple retail stores.

Once all the information is obtained and the purchase of the STB and/or services is completed, the purchaser typically then returns to their residence, installs the set top box (if one was purchased), and activates power to the unit. Typically the purchaser is anxious to try the newly purchased service(s) and then invokes the provisioned service(s).

Service Provisioning—Overview

There are various systems and phases associated with reaching the end result of enabling a service for a subscriber. "Service Provisioning" or "provisioning" can broadly describe any of the related steps or processes involved in enabling a service. This may involve various types of processes, actions, messages, as well as system including input systems, legacy systems, and the enhanced services system. Provisioning involves sending authorization messages, configuration messages, and potentially command messages to a STB. Further, various billing systems and service records need to be updated and as noted, in some services such as pay-per-view, the network may collect usage measurements periodically (e.g., monthly) in order to calculate the subscriber's bill. Thus, "provisioning" encompasses a wide variety of actions and any such service related actions are within the scope of "provisioning." Consequently, any of the actions and events for provisioning an enhanced service are within the principles of the present invention even if some of the steps associated with provisioning an enhanced service involve legacy based commands or configuration messages.

Figure 7:
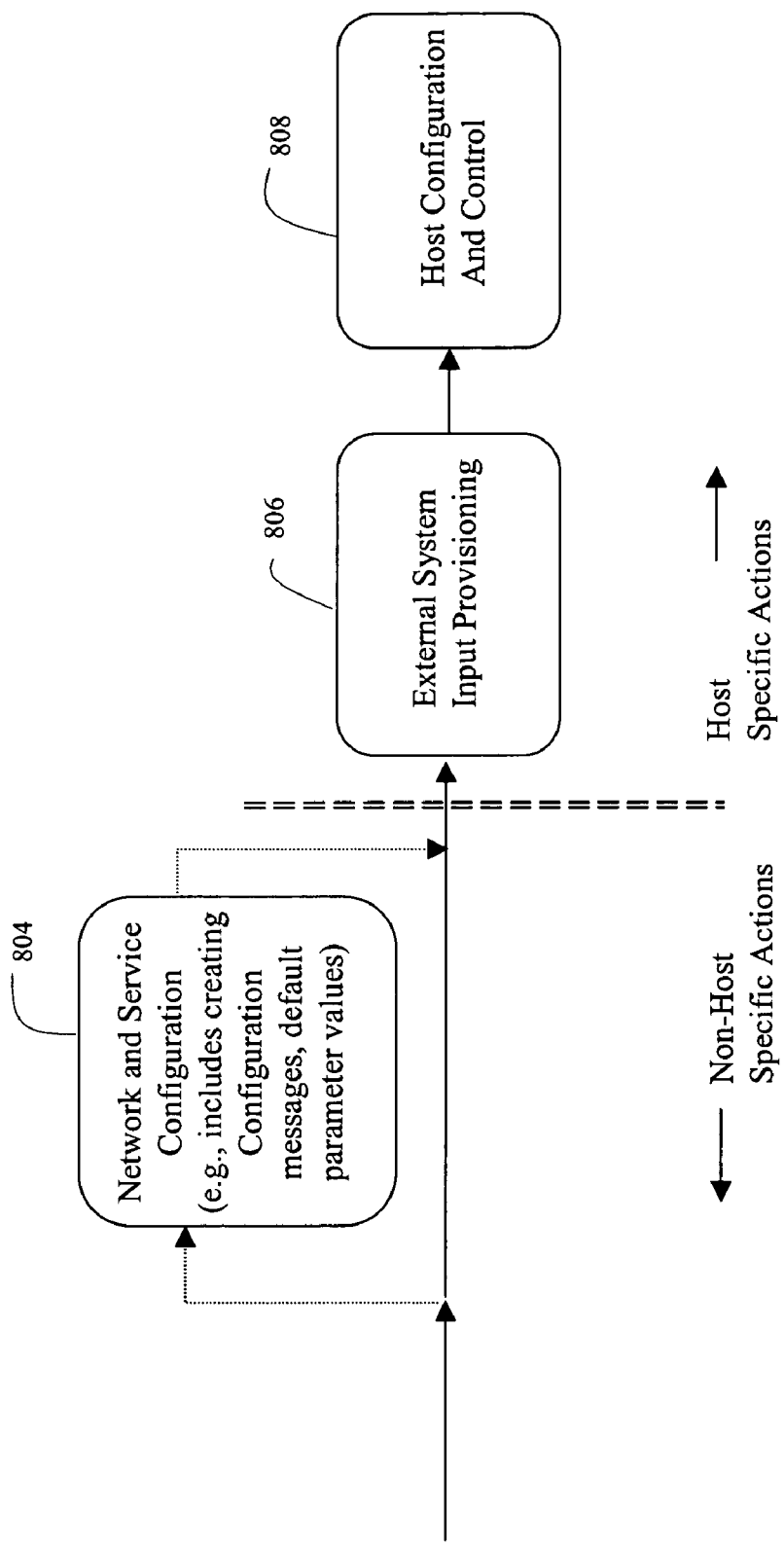
FIG. 7 illustrates one embodiment of a high level overview of the provisioning process according to the principles of the present invention.

In order to facilitate presentation of the concepts, the provisioning process is divided into three categories. As shown in FIG. 7, actions can be divided into network-specific 801 and host-specific actions 802. The network-specific actions typically occur only once and prior to configuring a specific host. These actions can be characterized as network and servicing configuration actions 804. The host-specific actions are associated with configuring and commanding a specific host in association with a specific service.

The network and service configuration process 804 establishes service related data in the various network elements that are required to provision a specific host with a service and creates the configuration message sets used to configure a specific type of host. The network configuration actions typically involve defining service related data, such as billing codes, in various cable network elements and systems, including the billing system and enhanced services system. Associated with the service configuration is defining how the service operates in general, as well as for a specific host. This involves creating a host-specific configuration message set using the host protocol file. The cable system operator defines the configuration message set mindful of the host capabilities and the defined service aspects. The desired service operation is obtained by configuring certain parameters of the service that characterize the service's operation. Some of these may be considered network default parameters. For example, in the U.S., National Television System Committee (NTSC) based video signals are common for providing video signals from a STB to a television. In Europe, the Phase Alteration Line (PAL) is a different, widely adopted standard used by televisions. Thus, U.S. cable system operators would likely default to NTSC in configuring an enhanced services, unless service reasons motivated otherwise. Other parameters may be configured on a service specific basis, such as how long a personal video recording service may allow recording of programming.

Once network and service configuration is completed for a service, customers can subscribe to the service and have their specific hosts configured for the service. Configuring a specific host can be is divided into two parts: external system input of service related data 806 and host specific configuration and control 808. The first part, input of service related data 806, typically involves an input system interacting with the cable subscriber in some manner to collect service related data. The system is typically external to the cable network, and may be operated by a third-party. The subscriber's interaction with the input system may be direct or indirect (e.g. involving another person aiding the subscriber with service selection). Typical function of the input system is to collect basic service related information and communicate the information in a compatible format to the appropriate cable system. Various types of provisioning input systems can be used in parallel to provide flexibility of the user interface, and these system are typically 'loosely' coupled from the cable network elements.

The external systems pass information to 'tightly coupled' elements that perform the host-specific configuration and control actions 808. Configuration and control actions use a host-specific configuration message set to directly communicate with a specific host associated with the subscriber to configure the specific service. The host-specific configuration and control typically involves various cable system elements. This involves new network elements, collectively called the Enhanced Services System, interacting with the the legacy elements, such as the cable headend, billing system, and provisioning/conditional access system.

Enhanced Services System

Figure 8:
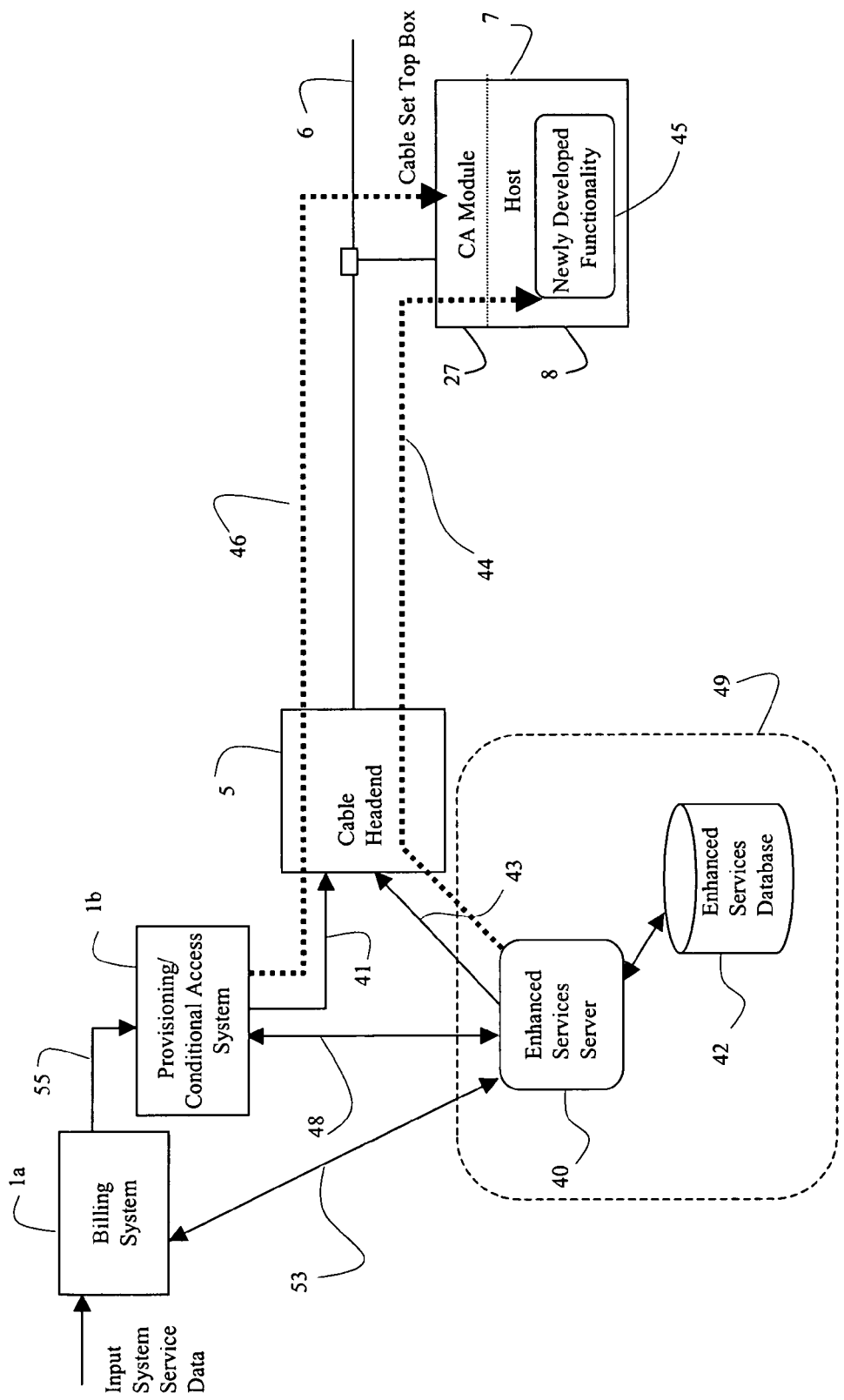
FIG. 8 illustrates one embodiment of Enhanced Services System according to the principles of the present invention.

In FIG. 8, the legacy elements include the billing 1a and provisioning/conditional access 1b systems, the cable headend 5, and the set top box 7. As previously indicated, the provisioning of legacy services involves the communication of information 46 from the billing system to the provisioning/conditional access system, then to the cable headend, and then to the set top box 7. This information includes providing channel maps, authorizing STB by conveying EMMs, configuring capabilities in the STB, etc., as is well known in the art.

For provisioning enhanced services, the Enhanced Services System 49 may interact with the legacy elements. The Enhanced Services System 49 comprises an Enhanced Services Server (ESS) 40 and the Enhanced Services Database (ESD) 42. The ESS 40 typically comprises a processor, memory, and associated interfaces, while the ESD 42 comprises a database and associated software applications, such as a database management application. Although the ESS and ESD are depicted as two functional components, those skilled in the art of computer systems will readily appreciate that these may be embodied as a single physical computing system. The ESS augments the existing legacy system and serves as a 'service overlay' in that new capabilities may be offered using the ESS while existing capabilities may be retained.

Other embodiments are possible. For example, generally herein the ESS is shown as a single system dedicated to one and only one cable system. In other embodiments, a system operator may have multiple cable systems served by a single ESS system. Other embodiments may utilize more than one ESS serving one or more cable systems. Still other embodiments may have the cable system operator relying on a third party service bureau providing the ESS functionality. In this last embodiment, the ESS could be a single large ESS that is logically partitioned into virtual systems allocated to a given cable system operator. These and other variations are within the scope of the present invention. Further, the advent of high speed communication networks means that the ESS may be remotely located from the cable system. Thus, even thought the ESS is 'tightly' coupled with the cable system, this does not require any particular physical placement or ownership of the ESS relative to the cable system.

The ESS 40 may obtain information from the ESD that is required by the ESS to complete an enhanced service provisioning action. For example, the ESD maintains a library of previously created host-specific configuration message sets and their association to a specific host. The ESS is able to retrieve the current host configuration message set file for a specific manufacturer's brand and type (model) of host and use the messages to configure specific brand and type of host for a specific service. The ESD further may maintain a file indicating the host(s) used by a subscriber. Thus, the ESS is able to determine that a specific cable subscriber is using Host "Brand A." This may include information regarding a particular software version, software inventory, or capability associated with Host "Brand A." It is possible that a subscriber may have multiple hosts (which is often the case with multiple STBs present in a residence), so that subscriber information may be linked to a plurality of hosts.

In general, the data required to configure a host for an enhanced services request is maintained in the enhanced services system rather than the billing system or provisioning/conditional access system. In many embodiments, it is desirable to minimize development in the billing or provisioning/conditional access system to accommodate provisioning enhanced services. Thus, while a new billing code may be defined in the billing system for an enhanced service, the billing code may not be inherently distinguishable by the billing system from the other legacy billing codes. Similarly, while the provisioning/conditional access system may be able to communicate a new service tier to a target host, the service tier is typically not distinguishable by the provisioning/conditional access system from other service tiers except to the extent that an authorization key is required. However, the host is aware of the enhanced service capability as it contains application software programmed to perform the associated capability. Frequently, to complete the provisioning of an enhanced service, the ESS may combine several steps involving existing legacy capabilities with steps involving configuring new capabilities. In this manner, the existing capabilities of the legacy systems and elements are utilized in the provisioning of an enhanced service with little or no modification.

A typical action taken by the host upon receipt of a configuration message may be for the host to tune to an indicated channel and receive further application software or other software objects. Thus, the configuration message can be used to load host-specific code. This could be application level code, middleware code, or firmware code.

In other instances, the configuration command may instruct the host to obtain service data required for service operation. For example, some services may require access to extended program guide information. Currently, a STB is provided only limited program guide data (e.g., a few days). A step of the enhanced service operation may indicate to the host where extended program data can be obtained (e.g., the next two weeks of scheduled programming). While all hosts enabled for the service receive the same extended program guide information, how each host is instructed to receive the extended program guide information may be different. For example, the program guide data could be downloaded to the host using the out-of-band channel. Alternatively, the data could be sent by the ESS (or some other source) on a broadcast channel in conjunction with a configuration message indicating where the channel can be located. Alternatively, the host may be provided a URL which it can use to download the data on a DOCSIS channel. Still further, a data carousel can be used in conjunction with the configuration message indicating how to access the carousel data.

The configuration commands may not only tell a host where to locate the data, but when to locate that data. For example, a host that has just been configured for personal video recording service may be further commanded to get the extended program guide data immediately if the host uses the DOCSIS channel. Alternatively, the host may be commanded to obtain the guide data by tuning to a broadcast channel only if the user is not currently viewing a program (i.e., the tuner is not already tuned to a channel), otherwise the host may be instructed to obtain the data at a time unlikely to interfere with the user's viewing (e.g., 3:00 a.m.). If the host has two tuners, then it may be appropriate to command the host to tune immediately to the broadcast channel to obtain the guide data.

The ESS services system may configure the host not only when the service is enabled, but if the host requires re-initialization. For example, the host may have lost power and request re-initialization. Or, the ESS may instruct the host to obtain updated extended program guide data because the cable operator or networks have altered the channel lineup or programming. This would require all hosts associated with the enhanced service to re-acquire the extended program guide data.

As shown in FIG. 8, the ESS 40 communicates with both the legacy billing system and the provisioning/conditional access system. The ESS may interact with the legacy systems for various reasons. On the first instance, the ESS may invoke existing legacy service capabilities for a specific host separately from an enhanced service. For example, as it will be shown, the user may purchase a new host and have the retailer provision the new host for legacy services (e.g., basic cable and premium channels). In the second instance, the ESS may also use the existing legacy system capabilities for provisioning enhanced services. The existing legacy capabilities may be one component or step in providing an enhanced service.

In the first instance, the ESS can be used to provide flexibility in provisioning legacy services. For example, the ESS can send a request to the billing system 1*a* 'mimicking' input from a service initiator. Specifically, the ESS can control activation of a legacy service by commanding the billing system to provide a premium channel using the existing legacy based procedures. In other cases, the ESS can 'mimic' the billing system functionality by sending a command to the provisioning/conditional access system. For example, recall that the billing system could request the provisioning/conditional access system to reinitialize a STB. The ESS can provide this command to the provisioning/conditional access system, and the provisioning/conditional access system acts upon the request as if it came from the billing system. As it will be seen, this can be used in conjunction with activating the host when the host is placed on the cable plant. Thus, the provisioning architecture used to provision enhanced services can also be used to provide flexibility in provisioning legacy based services.

In the second instance, the legacy capabilities may be used in conjunction with an enhanced service. For example, after provisioning an enhanced service, proper operation may require reinitializing the STB. The ESS can issue a re-initialization or reset command to the provisioning/conditional access system to accomplish this last step. As it will be seen, in some instances, host "A" may be reinitialized or reset by the ESS using a legacy capability, while host "B" may be reinitialized using a new, enhanced service capability. In the latter case, the ESS does not use the provisioning/conditional access system, but issues a host-specific command message. This situation reflects the fact that different legacy capabilities exist in different cable systems, and hosts may develop new capabilities at different times. Alternatively, this situation may reflect that issuing a command to invoke the 'newer' re-initialization capability in host "B" is more desirable (for whatever reason) by the cable system operator, but since the only capability available in host "A" is to use the legacy re-initialization capability, that may have to be used in lieu of not initializing the host at all. In yet another alternative, the cable system operator may choose not to support the service in host "A" until the host manufacture supports an enhanced re-initialization capability. In provisioning other enhanced services, the ESS may configure an enhanced service in the host by sending a service tier to the provisioning/conditional access system to authorize viewing of a channel. The ESS in essence mimics the billing system to the provisioning/conditional access system, which in turn sends the service tier to the host along with the necessary EMMs. The ESS may then stream replacement application software or video on the indicated channel for the host, which is decrypted. In this manner, the existing legacy infrastructure can be used with minimal modification to invoke, control, and configure enhanced services in the host.

Figure 9A:
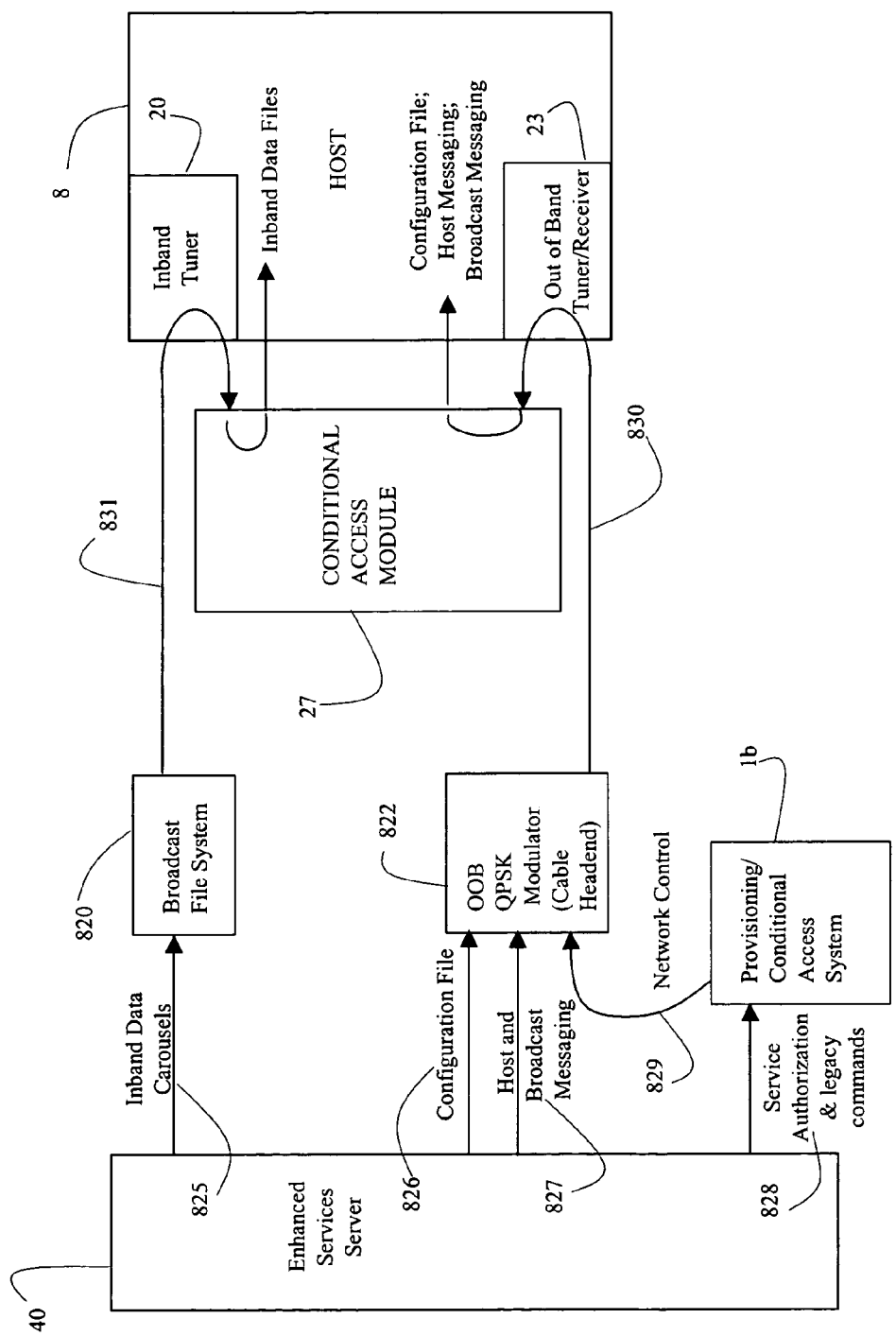
FIGS. 9a and 9b illustrate embodiments of communication between the Enhanced Services System and the Host according to the principles of the present invention.

One embodiment of the communication between the Enhanced Services Server 40 and the host 8 is further illustrated in FIG. 9*a*. The communication architecture may vary based on the cable headend vendor and other factors. As previously indicated, different vendors may have slightly different communication architectures. FIG. 9*a* corresponds to an architecture used by Scientific-Atlanta® based cable systems. In general, data can be conveyed to the host 8 using inband tuners 20 or out-of-band tuners/receivers 23. Out-of-band messages are communicated using the MAC address of the host or conditional access module. Both tuners are typically considered as host functionality. In either method of sending data, the tuners in the host receive data and forward the data to the conditional access module 27. Since the data is not intended for the conditional access module, it is forwarded back to the host. The ESS is required to send addressed messages in the proper manner. The messages may be conveyed as a unicast message, which is targeted to a specific host; multicast, which is targeted to a defined group of hosts; or broadcast, which is targeted to all hosts. The messages are conveyed as payload information over the cable distribution network. No special encoding is required.

Inband messages are multiplexed into the broadcast transport streams. Inband data is typically sent when a large amount of data is involved. Examples include transferring replacement extended program guide data, core operating systems of the host, navigator applications, etc. Thus, data 825 from the ESS 40 is conveyed to the broadcast file system 820 that distributes the data on a channel 831. Typically, the channel 831 is time multiplexed with other data. This process is called a 'carousel' as various files are broadcasted on a periodic round-robin basis by the cable system on the channel. Thus, when the ESS transmits data for a particular host, there may be a minimal time delay before the host receives the data as other files in the queue are transmitted. Further, in some cases, the file broadcasted to a host may be repeated several times on the channel 831 by the carousel to ensure proper reception of the data.

Data sent using the out-of-band (OOB) channel 831 typically has a lower overall bandwidth. The ESS 40 can send files 826 and messaging 827 by transmitting the data to the OOB modulator 822. This embodiment illustrates a QPSK modulator, but other modulators could be used consistent with the principles of the present invention. The OOB channel 830 has limited bandwidth, so the cable operator may choose to limit the types of messages using this channel. For example, the host continuously monitors the control channel, and the ESS may use this channel to send a command indicating to the host where to tune to get its provisioning data. If the host and cable network support two-way communication, a return path (not shown) allows the host to communicate to the ESS. The ESS can also authorize a STB for legacy type capabilities by communicating an authorization request 828 via the legacy provisioning/conditional access system 1*b*. Any other legacy command or configuration message implemented by the provisioning/conditional access system 1*b* can be signaled by the ESS.

Figure 9B:
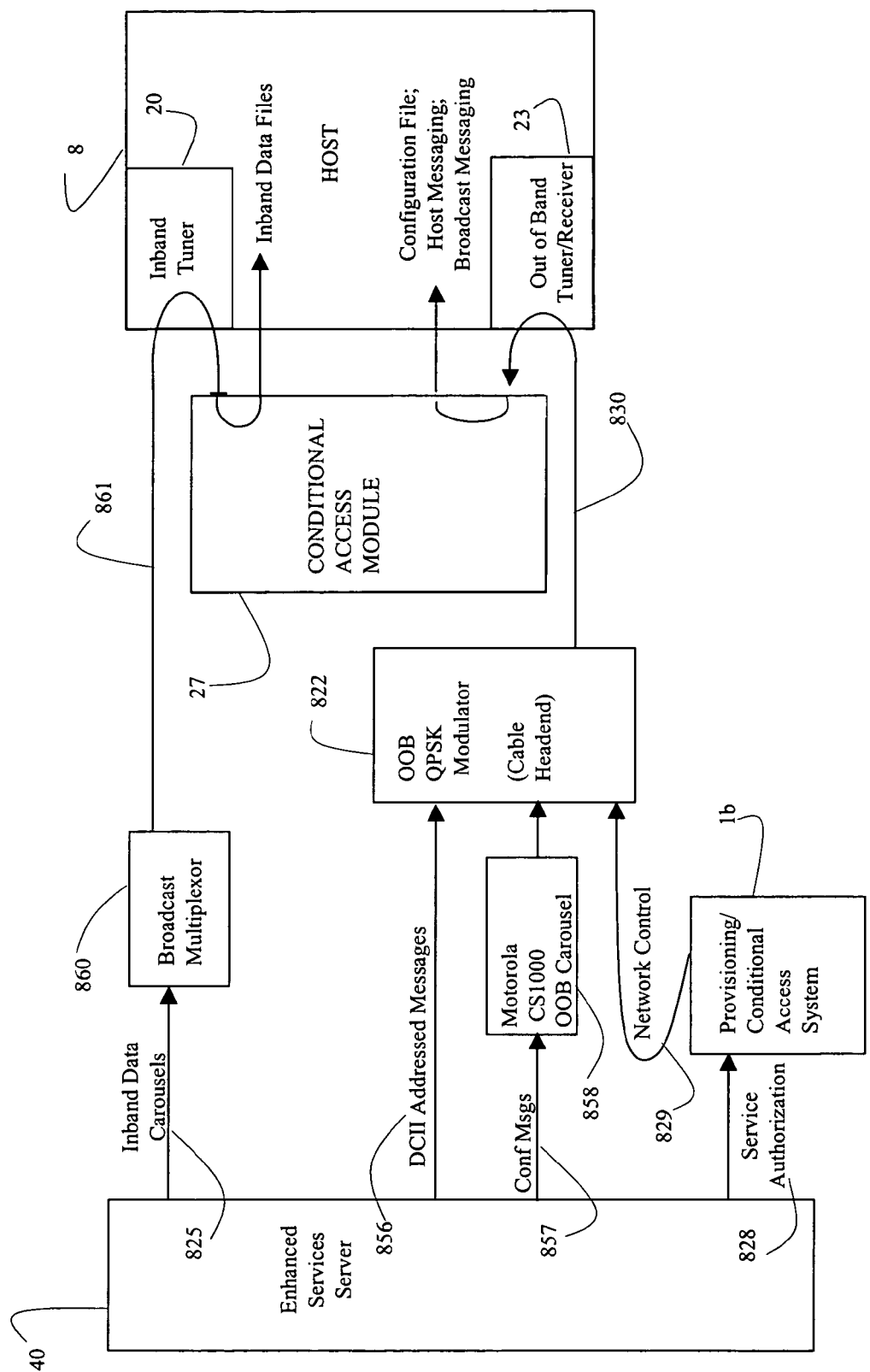

FIG. 9*b* illustrates communication between the ESS and host using a Motorola® based cable distribution network. In this embodiment, all messages are encoded using the proprietary DCII message formats. These messages are carried in MPEG-2 private sections that are delivered via MPEG-2 transport streams. The conditional access module and host addressing is embedded in the DCII message format and the ESS is required to not only address the message, but also create the message in the proper format. The DCII message format is used for sending messages inband as well as out-of-band. For inband messages, the DCII sections are multiplexed into the broadcast transport streams. However, typically inband enhanced service communication is used for transferring larger files, such as the aforementioned operating system code and extended program guide data. DCII messages received by the conditional access module addressed to the host have the DCII proprietary encapsulation stripped off with the payload prior to conveyance to the host.

Similarly, a carousel 858 may be involved to convey messages on the out-of-band path. Typically, this again is used with configuration commands to indicate to the host, which channel to tune to in order to receive further configuration data. Alternatively, the configuration messages can bypass the carousel and be sent directly via the out-of-band modulator 822 using the DCII addressed messages 856.

The previous two figures illustrate embodiments for achieving ESS to host communication using existing communication architectures and capabilities. These are used to configure a specific host. Now that the architecture and high-level operation of the ESS and ESD has been presented, the various elements involved in pre-provisioning and how they relate to the ESS are further examined.

Network and Service Configuration

As previously stated, network and service configuration activities involve establishing service related parameters in various network elements before any single, specific subscriber can be provisioned. Network configuration can be characterized as configuring network elements for billing, service tiers, and establishing the various configuration and command messages. Service configuration can be characterized as defining configuration message sets for a specific service and host type. Because these are closely related, these are frequently discussed as a single group of related events. The distinction is not always clear, nor critical to understanding the inventive concepts. Once network and service configuration is complete, the cable network is 'aware' of a service and able to accommodate at least one type of host for configuration. After network and service configuration, a specific host can be attached to the cable plant and configured for the specific service.

An example illustrating network and service provisioning is based on extending the aforementioned personal video recording (PVR) service. This embodiment illustrates a host-based service because it is the host that records and plays back video by storing streaming data onto a hard disk or into memory. It is presumed that some host manufacturers have incorporated the capability of recording digital data onto a hard disk drive or other type of memory for the purpose of playback at a later time. Further it is assumed that when the user requests the PVR service, the host requires authorization from the cable system network to invoke the PVR capability. This is in distinction from traditional VCR operation that is solely controlled by the user and does not require any network authorization. Thus, the cable network operator enables the capability in the host for the PVR service. Further, it is assumed the cable network operator offers two types of PVR service, which can be referenced by two billing handles known as Tier 1 ("PVR T1") and Tier 2 ("PVR T2"). As previously mentioned, the cable system operator can market this as one service with two variations (e.g., 'basic' and 'deluxe'), or as two separate services. PVR T1 allows 60 hours of video recording and enables the user to invoke the "pause", "stop", and "start," related control functions. In Tier 1, once a program is viewed, it is erased immediately and cannot be viewed again. The cable operator offers Tier 1 at $6.95/month. In distinction, Tier 2 allows 240 hours of video recording and enables the user to invoke the full set of control function capabilities, including "pause," "start," "stop," "fast forward," and "rewind." In addition, the user can retain the programming for multiple viewings, up to 7 days before it is automatically erased. The cable subscriber is charged $12.95/month. Again, the cable system operator could market the service as a having a $6.95 base charge with an optional additional $6.00/month charge for the enhanced version. In both services, the network allows simultaneous viewing and recording of two programs by the host. This requires the host have two tuners, which may not always be the case. If the host does not have two tuners, the user can still record a program, but cannot record one program while simultaneously viewing another. Similarly, if the host does not have all the capabilities, the cable system operator may define a configuration message set using the capabilities that the host does have, or alternatively, the cable system operator may not define a configuration message set at all.

The above service offerings are created by the cable system operator and establishes the service attributes associated with each offering. Offering such services assumes that at least some hosts are manufactured with the capabilities such as the ability to record up to 240 hours and can be configured to: indicate how long they can record, provide the auto-erase capability, indicate how long before data is automatically erased, access extended program guide data, and can indicate which control functions are enabled. It is of little benefit for a cable system operator to define a service that cannot be supported by any host. Configuring these parameters in the host requires the ESS identify the type of host used by a subscriber and configure the host as required. If a host manufacturer does not provide any of the defined set of capabilities for a particular service, then the service typically cannot be assigned to that type of host as typically defined by, but not limited to the particular brand and model of a host. Further, the ESS may require setting other parameters that the subscriber is not readily aware of. Namely, including partitioning of the hard disk, configuring the host to access extended program data, defining whether usage statistics are maintained, etc. The service related parameters establish the nature and operation of the services offered and allow cable operators to define variations of the service, as they deem appropriate for their market. Obviously, the flexibility that cable operators have in defining a service is impacted by the capabilities and configurability offered by host manufacturers. As host capabilities are expected to evolve over time, it is expected that the services offered by cable operators will evolve as well. Further, services offered by various cable system operators are not expected to be identical. In the above example, a cable system operator may elect to only offer one variation of the PVR service, or more than two variations. Others operators may elect not to offer the service at all. In some instances, certain capabilities may not be provided by some hosts, but the service can still be provided, albeit with slightly different operation (e.g., a host with only one tuner cannot provide simultaneous viewing and recording of different channels). The cable system operator determines whether such a service is offered for a given host type. Further, some cable operators may opt to provide a network-based PVR service as opposed to a host-based PVR service.

Figure 10:
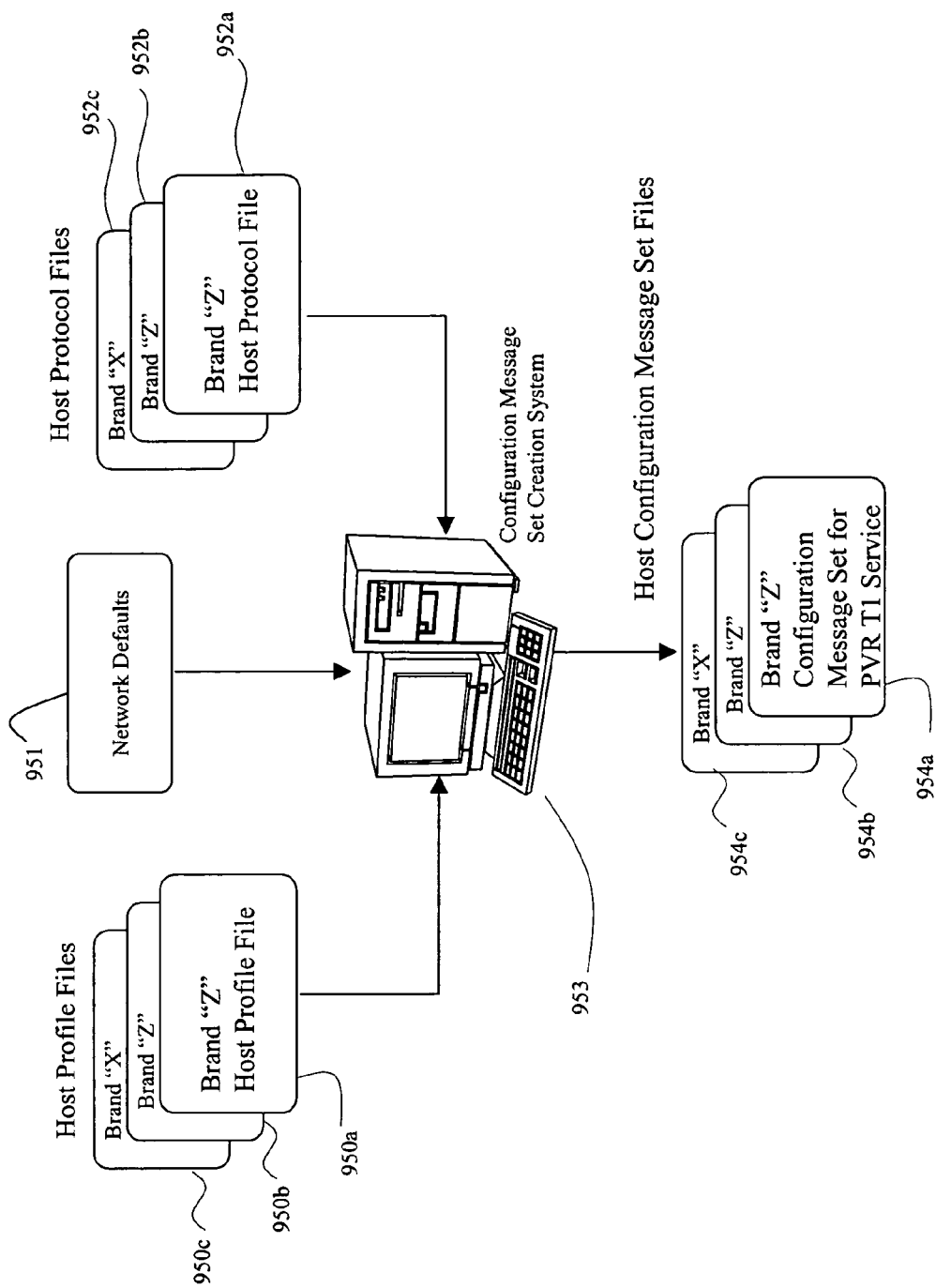
FIG. 10 illustrates one embodiment of a workstation for creating configuration messages according to the principles of the present invention.

The creation of the configuration message set ("message set") used to configure a type of host is illustrated in FIG. 10. The creation of the configuration message is defined for a specific type of host and for a specific type of service. The configuration message set for a particular host may be determined by the cable system operator's service personal or a third-party. The message set is created typically using a configuration message set creation system ("workstation") in the form of an application program on a workstation that provides a user-interface for personnel to select the parameters for the service. The parameters that can be altered are derived from the host profile file, which describes the capabilities of the specific type of host. The host profile file is provided by the host manufacturer and facilitates processing by the creation system by 'driving' the user interface in the workstation. The specific messages generated that comprise the message set are determined from the host protocol file and are specific to the host type. The messages further are associated with configuring certain parameters with certain values.

In FIG. 10, the workstation 953 for creating the configuration message set is used by the service creation personnel. The workstation accesses the various host profile files 950a, 950b, 950b. The workstation also accesses the corresponding host protocol files 952a, 952b, 952c as well as an optional network default file 951. In this instance, the workstation obtains the Profile File for Brand "Z" host 950a and uses this to drive a user-interface in order to select the appropriate messages and parameters from the corresponding Brand "Z"

protocol file 952a. Because the host manufacturer has developed the host profile to describe the capabilities of the host, and the host protocol file is designed to configure those capabilities, the configuration workstation is not required to have additional information regarding the Host "Z." The workstation may have additional information regarding network defaults and/or service data parameters that are used to define select parameters in the configuration messages. The network default values 951 for various parameters avoid having to replicate the parameter setting in each service data parameter file. For example, the cable system provider may always select a NTSC output video signal for a STB if that option is settable.

Figure 11:
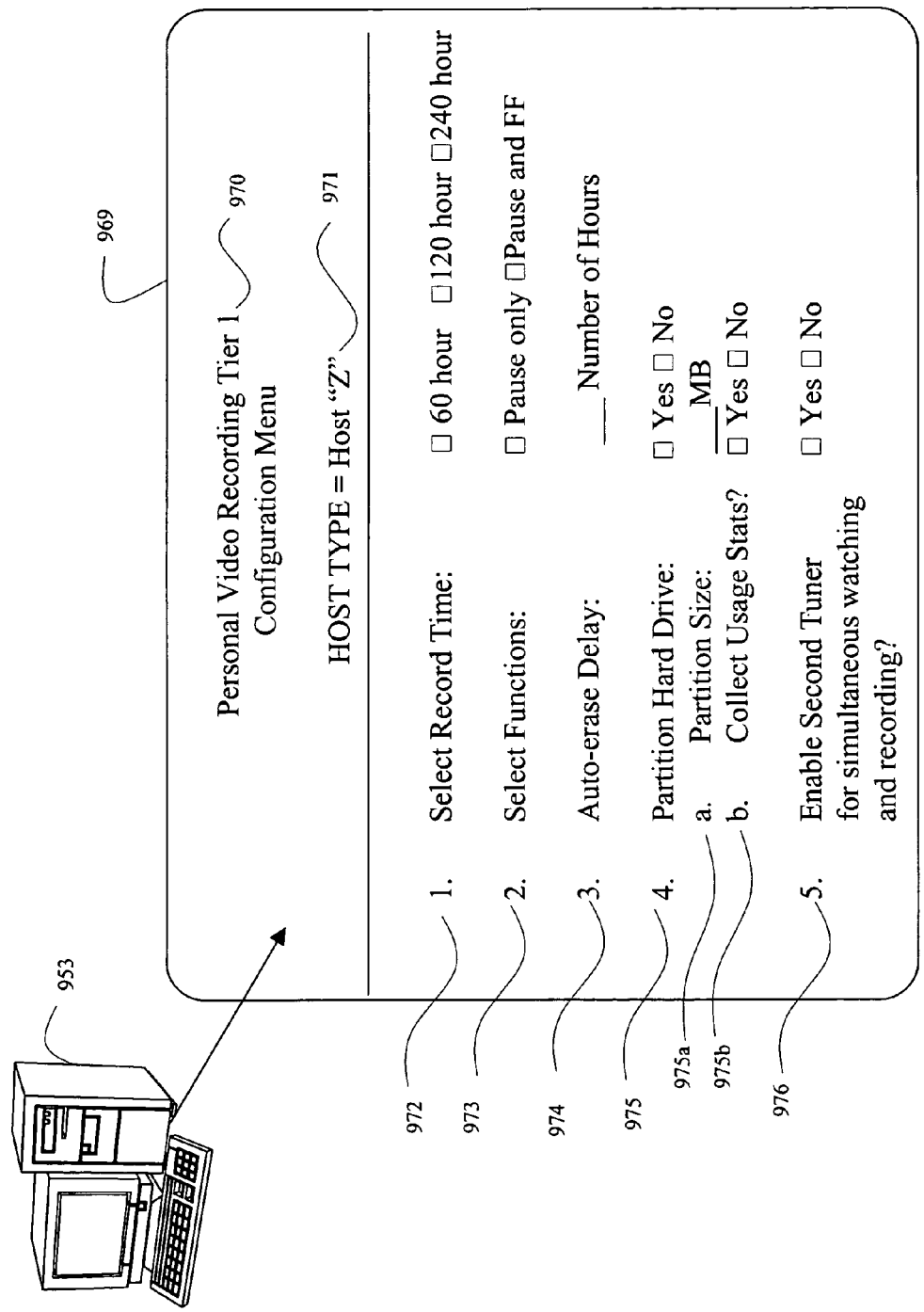
FIG. 11 illustrates one embodiment of a user-interface of the configuration message set creation system according to the principles of the present invention.

In FIG. 11, one embodiment of the user-interface is disclosed. In this embodiment, the screen 969 of the workstation 953 illustrates a configuration menu for the PVR Tier 1 billing code 970. The menu also indicates the type of host that the configuration message set is being created for 971. Recall that a configuration message is associated with a specific host and specific service. In this screen, five options are presented to the service creator for configuring service related options or parameters in the host. Other options may be presented on additional menu screen, using the same or different user-interface schemes, or icons. In the first option 972, the user selects the recording time allocated for a service. This might be used by the host to allocate space on a hard disk drive for recording video, collecting usage statistics, storing advertising, or other related service operation aspects. If the host does not support a particular option, that option may be restricted from selection on the workstation's user-interface. In the next option 973, the functions supported by the host are presented. In the next option 974, the auto-erase delay (retention time) is indicated in hours. If a value exceeds that which is supported, the value may be restricted. The next option 975 allows partitioning of the hard drive in the host. Certain sub options 975a, 975b may only be available if partitioning is selected. The disk partitioning may be required to enable the collection and reporting of usage viewing statistics if it is separately enabled. Finally, a second tuner option 976 is presented. The user-interface may be defined so that if the capability is not present, the option is not presented, or alternatively, the option is 'pre-selected' (e.g., a default value is applied) or the option is restricted from selection as an incompatible option.

The output of the process is the configuration message set (954 of FIG. 10) that is stored in the enhanced services system. The message set is specific to a service (e.g., associated with a billing code) and is specific to a type of host. There are at several ways in which the host configuration messages can be created. In the first case, the configuration message set is analogous to a 'compiled' computer program and this type of configuration message set is called a 'static' configuration message set. In a static configuration message, all the service related parameters and network default are known and set in relation to the host-specific configuration message encoding. When applying these values to a host protocol file during creating the message set, the exact and final message structure and encoding can be determined. The messages are ready for future communication to a specific host for a specific service without further processing. Thus, each message set for a specific host and specific service is created, stored, and indexed in the ESS.

Alternatively, the configuration messages may be analogous to an 'interpreted' computer program. In this case, the workstation may store a service parameter file associated with a given service and host type, and apply that to a configuration message as required just prior to communicating the message to a host. This approach requires storing the messages for each host, but without fixing all the parameters. The parameters are determined once the service data file (not shown in FIG. 10) is determined and the program interpreting the host protocol file selects the parameters and the encoding rules (in the protocol file) to determine the configuration command to be sent to the host. As those versed in the art of computer science are aware, each approach has performance and storage tradeoffs. Either approach, as well as variations, falls within the scope of the present invention. In either case, any of the associated files may be considered host files and are stored in the ESS until a specific host type is configured for a specific service. The necessary files are retrieved and processed accordingly to effect the configuration and control of a host for a specific service.

Figure 12:
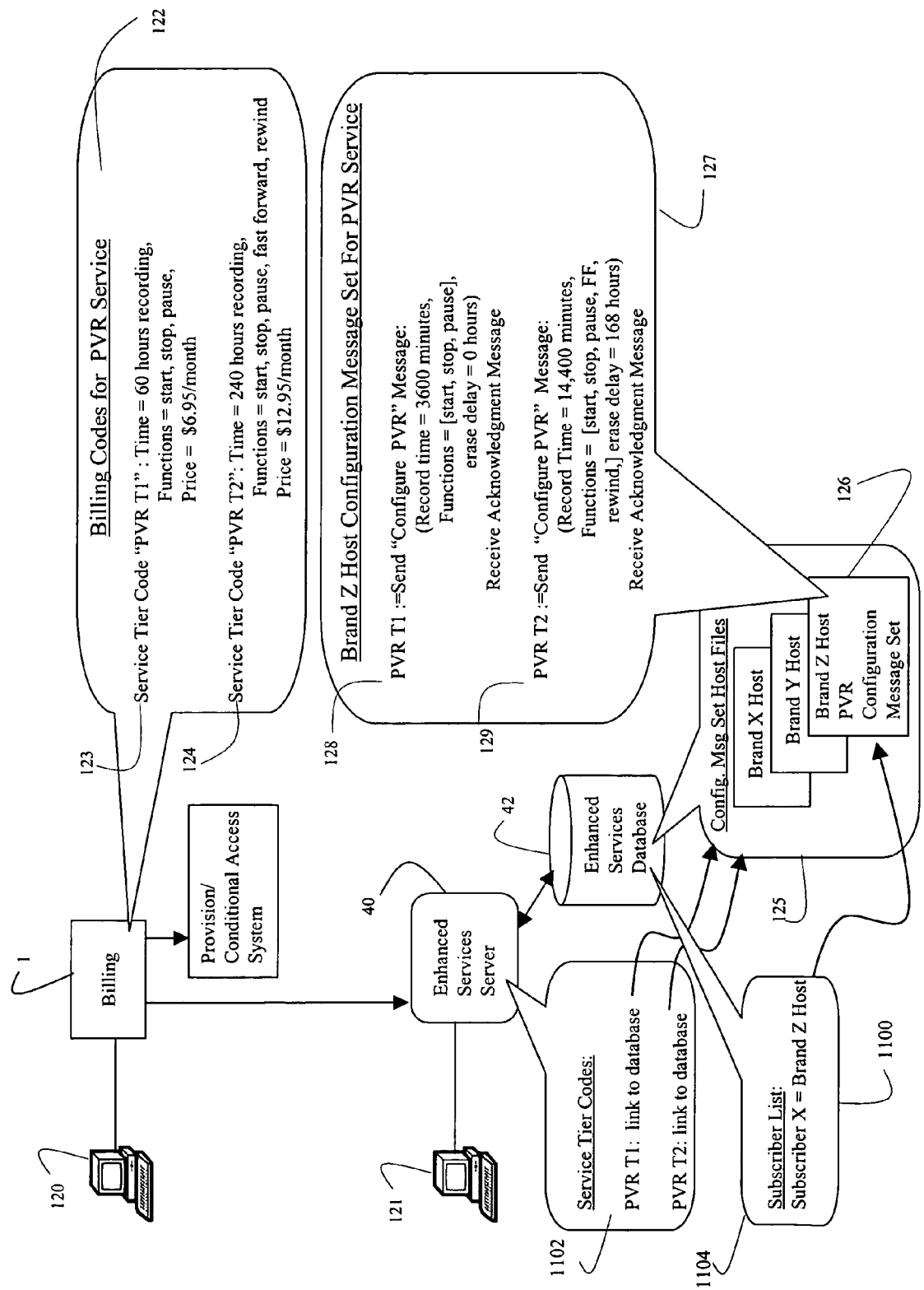
FIG. 12 illustrates one embodiment of network and service configuration information for an enhanced service according to the principles of the present invention.

After creating the configuration message set, another activity associated with network and service configuring is shown in FIG. 12. In FIG. 12, the various network elements are provisioned with PVR service. This includes the billing system 1a, and the Enhanced Services System, comprising the Enhanced Services Server 40 and the Enhanced Services Database 42.

The configuration of the systems typically uses a computer 120 that may be directly connected for performing these functions, or may be interconnected via the Internet. The billing system 1a is configured with service related information, specifically information pertaining to the two types of PVR service 122. The billing system is configured with the two PVR billing codes, PVR T1 123, and PVR T2 124 that are mapped to the two corresponding service tiers as appropriate. Each billing code is further associated with a monthly price in the billing so that appropriate charges can be computed. Pricing data may also be used by a service agent when communicating with a caller to explain various service related charges, but the pricing data is typically not required to configure the host. Note that up to this point, the PVR related information is generic and has not been associated with a specific subscriber or host.

The enhanced service system maintains information required for enhanced service provisioning by maintaining data in both the ESS 40 and the ESD 42 as shown in FIG. 12. The ESS 40 contains information 1100 that includes mapping the billing code 1102 to the appropriate host files (i.e., configuration message set file). For example, the PVR T1 billing code is associated with the created configuration message sets for configuring the PVR T1 service regardless of host type. This is maintained in the Enhanced Services Database 42. Further, the ESS 42 also contains a pointer (not shown) to a 'Subscriber List' 1104 file of all the subscribers as identified by their host address and their respective host types. The Subscriber List 1104 is typically stored in the ESD 42. In this embodiment, only one subscriber is illustrated, although in a typical embodiment thousands of subscribers are contained in the file. In other embodiments, the data of the subscriber list may be contained in the Enhanced Services Server. The ESS uses the billing code and subscriber identifier to determine the appropriate specific host file 126 in the Enhanced Services Database 42 to perform the host-specific configuring actions.

The ESD 42 contains configuration message sets 125 with a PVR specific configuration message set file 126 for each host type. FIG. 12 illustrates a PVR Host file 125 containing hosts files for Hosts manufactured by X, Y, and Z 126. These correspond to various brands of host, and there may be further files based on a particular model associated with a specific brand. This level of detail is not shown, but the principles of the present invention can be appreciated without requiring further breakdown of specific models of a given host manufacturer. It is the cable system operator that determines which hosts are supported by defining the corresponding configuration message set, and there may be other host brands that do not have corresponding configuration message set files created. Recall that "Host A" 485 of FIG. 5 did not have a PVR capability so that a corresponding configuration message cannot be defined. In this case, if this host were selected for configurating the PVR service, an exception to the provisioning process may occur. Ideally, the lack of support for a given host is determined earlier, such as at the time the subscriber purchases the hosts and service related input data is provided.

It is apparent that alternative data structures associated with a service can be defined. For example, FIG. 12 illustrates one embodiment in which the files for a given service are grouped in the enhanced services database 42 and contain various host-specific files. An alternative format would be to group the files according to the host brand type. Those skilled in the art of database structures realize that various other organizational schemes can be defined.

Returning to the information stored in the ESD, the configuration message set for the Brand Z Host is examined in greater detail. The Brand Z Host PVR configuration message set file 127 contains specific protocol messages, parameters, and procedures required for interacting with the Brand Z Host to control either type of PVR service. As will be discussed in further detail, host-specific files typically include at least one file describing the host capabilities and resources of the host (called a host device profile), and another file indicating how to interact with the host (host protocol). The host device profile often contains data in a format facilitating the generation of a user-interface on the a service creation workstation to build a configuration message set.

In other embodiments, in lieu of a host protocol file, replacement application software may be present. In this example, message sets for configuring two PVR services are defined. In both PVR services, the script involves sending a message configuring the service in the host and waiting for an acknowledgement. This assumes a two-way network. In the embodiment illustrated, the PVR Host file has two sets of protocol messages that correspond to the PVR Tier 1 service 128 and the PVR Tier 2 service 129. Alternatively, the PVR Host file may only contain the configuration message set for one type of PVR service, and the other type would be in a separate host file. The specific structure and byte definition for these messages are further defined in the protocol message set in the host file, but are not illustrated in FIG. 12. The first message 128 is illustrated as a "Provision PVR" message, and this message is defined by the particular host manufacturer (in this case, the manufacturer of Brand Z). The manufacturer may define any type of message, syntax, and structure as long as it can be conveyed via the network protocol to the host. In essence, the host manufacturer provides via the host protocol file the messages for communicating with the host. As the host manufacturer is the source of the host file, the cable system operator is not responsible for defining or developing the message for its intended application. The cable system operator may not even know the syntax associated with the message. In this embodiment, the message 128 configures the recording time in minutes. Consequently, the 60-hour recording time associated with Tier 1 is indicated as 3600 minutes. The additional parameters indicate the associated recording functions and the automatic erasure time, which is indicated in hours. Note that there is no need in this embodiment to record the monthly price information in the Host file since the ESS typically does not require communicating this information to the Host in the configuration message set file. However, if a cable operator found this parameter useful to the service operation, then this could be included. Finally, the Host file for PVR Tier 1 indicates that after sending the "Provision PVR" message, an "Acknowledgment" message is received. This illustrates an elementary script where a sequence of messages should be exchanged to complete provisioning. This script presumes a two-way network, and the acknowledgement message may be viewed as optional if a one-way network is involved. A similar script corresponding to PVR T2 129 is disclosed reflecting the associated service parameters.

Other host manufacturers may use different messages, different parameters, and different procedures. The cable system operator does not define message formats for a host, but is required to select the appropriate host configuration files for configuring a particular host for a particular service. The cable system operator may define the service operation and the configuration message set, or may use the services of a third party to do so, or may purchase from a third party pre-defined configuration message sets for specific services and host types.

Host protocol file embodiments may only have one message, or a more complex set of messages and/or interaction. The embodiments may differ based on whether a one-way or two-way cable network is involved. There is no requirement that the PVR Host file for Brand Y follow the same message set and parameters as illustrated for Brand Z. Further, the host manufacturer may define simpler or more comprehensive command messages based on their host capabilities. Further, it is possible that de-facto or informal standards may evolve, and a host manufacturer may migrate to using the standard message format for a service. Finally, as was discussed, various methods for organizing the data and hosts files are possible in the ESS.

Host-Specific Provisioning

As previously indicated, "provisioning" can be broadly construed, and the overall process can be subdivided to facilitate presentation. In FIG. 7, it was previously indicated that after the network and service configuration activities have occurred, then the host-specific activities may occur. These were divided into external system input of service related and data and specific host configuration messages. The input of service related parameters to external input systems is now considered.

In provisioning a cable service, the subscriber indicates their service selection to a service initiator. The service initiator is the person responsible for the input of the necessary information to provision the service. There are typically three embodiments of the service initiator disclosed. In the aforementioned retail sale environment examples, the service initiator is the retail store sales personnel. The retailer is but one type of a third-party service initiator. In this context, it is assumed that the retail service initiator has experience in provisioning and can explain the necessary service options to the cable subscriber.

A second type of service initiator is the cable service subscriber themselves as the person providing the service information to the input system. The level of experience presumed for this type of service initiator is typically much lower compared to the third-party service initiator. The cable subscriber typically provisions their service only when a service change is required, which is usually infrequent.

The third type of a service initiator is a customer service representative or agent of the cable system operator. This type of service initiator is typically employed by the cable operator and verbally interacts with the subscriber in-person or over the telephone. Based on the interaction with the subscriber, the representative provides input to a provisioning system. For this type of service initiator, a high level of knowledge is presumed, since the customer service representative is typically experienced. Typically, the agent has the most experience with respect to service provisioning compared to the retailer or the subscriber.

A variety of access technologies and input systems can be used to accept input from the service initiator. The input systems provide various levels of availability, flexibility, and ease of use. The level of experience associated with the type of service initiator may impact the design of the human-machine interface for a type of input system. There are at least three main types of input technologies typically used. First, an interactive voice response (IVR) system can provide telephone access and guide a service initiator through various options using voice prompts and Touch Tone® inputs from a telephone. Alternative input options include the caller providing speech input and using speech recognition software in the IVR to determine the user's selection. Second, an interactive computer application program running on a personal computer can be integrated with a call center. This system allows a service initiator (typically an agent) to provide keyboard-based input in response to verbal information provided a caller over the telephone. Provisioning information is displayed to the agent on a computer monitor, allowing the agent to interact and explain service options with the caller as appropriate. A third option is a computer based input system providing input to a provisioning system. This could be embodied in a personal computer accessing an Internet website, or a videotext like arrangement using the television monitor to navigate a menu or display windows. In the second and third aforementioned embodiments, the human-machine interface may or may not be the same or similar. Specifically, there may be different human-machine interfaces to accommodate different service initiators based on their skill level.

Various combinations of service initiators using input systems are possible to accomplish service provisioning. A cable subscriber may call and verbally discuss with an agent the options and services desired. The agent, interacting with a computer, can then perform the appropriate provisioning. Alternatively, a cable subscriber may call and interact with the IVR system using telephone keypad input to indicated service related data. Finally, a cable subscriber may indicate service related input data using a personal computer using the Internet to access a website to perform provisioning. While it is possible for agents and retailers to use an IVR input system, typically agents and retailers only utilize a computer to provision the service. For experienced service initiators, a computer-based interface is typically more efficient. On the other hand, greater ubiquity of telephone service allows an IVR to accommodate almost all cable subscribers as service initiators. As will be seen, in some cases the user-interface may not necessarily support every service interaction.

Figure 13:
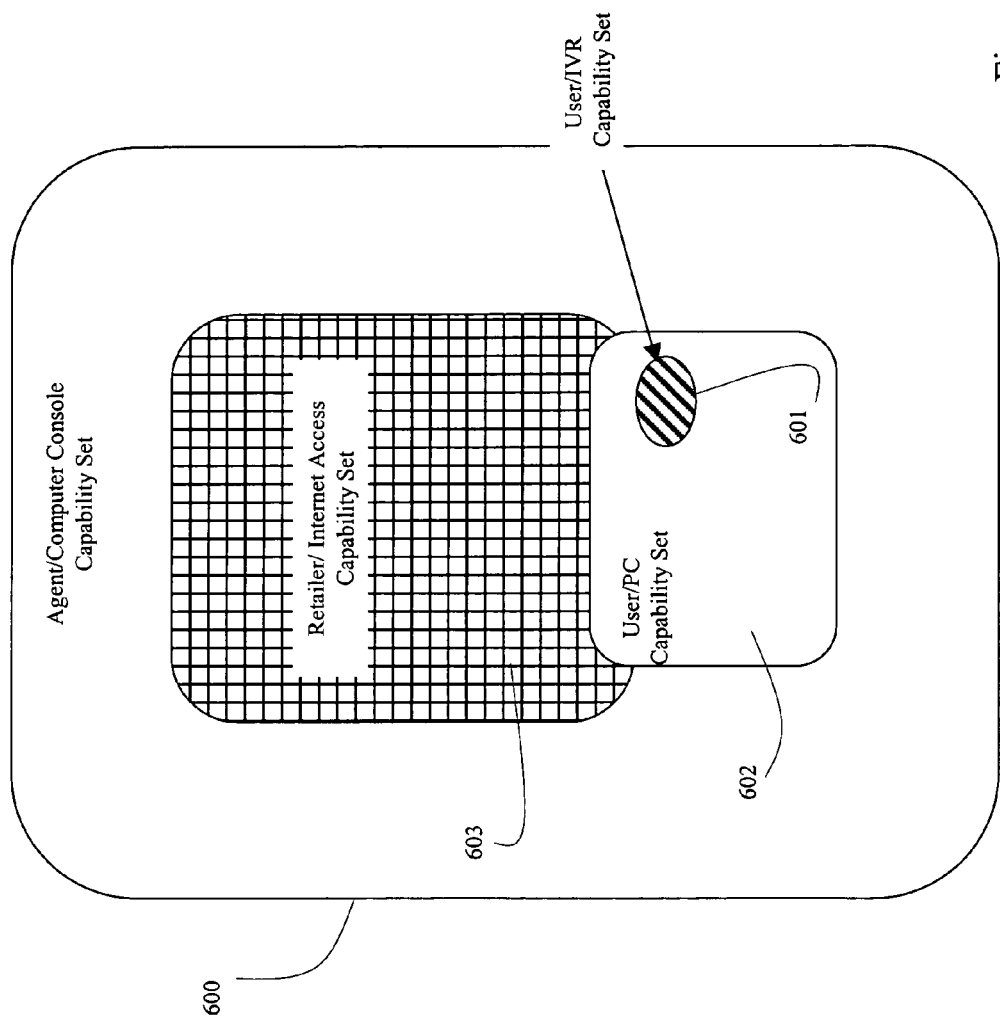
FIG. 13 illustrates one embodiment of the concept of provisioning capability sets according to the principles of the present invention.

Each input system accepts input of service related data from the service initiator and can generate the appropriate messaging to the required network elements. However, in some instances, certain service input capabilities may be restricted to using certain input systems or are available to only certain service initiators. This is illustrated by introducing the concept of 'capability sets' as illustrated in FIG. 13.

A 'capability set' refers to a set of service provisioning capabilities provided to a service initiator using an input system. The capability set is determined in part by the cable system operator and takes into account the type of service initiator and the type of input system. The service initiator is presumed to have certain skill levels and certain authorization levels. The input system impacts the way interaction occurs and the type of human-machine interface may practically limit the scope of interaction as well as accommodate the various skill levels of the service initiator. The scope of interaction can be further qualified as to the service capability. Examples of service provisioning related capabilities include subscribing to basic cable service, activating a new brand of cable set top box in the subscriber's premise, or altering the subscribed service packages (e.g., add a premium channel) for a subscriber.

The scope of the capability set is based in part on the type of service initiator—typically there are capability sets defined for the cable subscriber, call center agent ("agent"), and third-party retailer ("retailer"). For example, in FIG. 13, the capability set with the largest scope is designated as the "Agent/Computer Console" capability set 600. In general, the first descriptor ("Agent") represents the service initiator and the second descriptor ("Computer Console") describes the access technology or input system. The Agent/Computer Console capability set is the set of capabilities provided to an agent using the computer console integrated with the call center. Because the agent is presumed to have a high skill level and is a trusted entity, this capability set has the broadest range of capabilities in regard to provisioning services. Typically, any and all service related provisioning functions for all cable subscribers on a cable system could be accessed by the call center agent using the computer console. Further, administration, operations, and repair related capabilities, such as issuing service calls, initiating service installations, reporting troubles, and receiving outage indications are also typically included in this capability set. In comparison, the Retailer/Internet Access Capability Set 603 is typically a subset of the Agent/Computer Console capabilities. The capability set provided to a retailer is typically based on an input system using the Internet to access a website designed for third-party provisioning. Since it is expected that retailers will sell various embodiments of hosts, this capability set typically focuses on the retailer provisioning a host for the customer. It is possible the retailer may sell the host to an existing subscriber that is replacing an existing host without altering the services provided.

There is also a capability set that may be defined for cable subscribers or users ('User/PC' and "User/IVR"). This typically is the smallest capability set compared to the others. In the embodiment of FIG. 13, there are two user capability sets—one associated with Internet access via a home PC, and another accessed using a telephone for calling an interactive voice response (IVR) unit. Thus, these are called the User/PC capability set 602 and the User/IVR capability set 601. The User/IVR capability set 601 may be more restricted in light of the user-interface capabilities of an IVR system. An IVR system provides a limited human-machine interface and some provisioning capabilities may be too difficult or confusing to provision in this manner. For example, using a Touch Tone® based IVR interface to alter one's billing address may be unduly complicated using an IVR interface.

The User/PC capability set may be a subset of the Retailer/Internet Access capability set, as there are various features that a retailer would be allowed to access that a user would not be allowed. For example, a retailer is allowed to establish service for a new customer, but the User/PC capability set would typically not allow a user to establish a new account for a third-party. In addition, while a retailer may be authorized to modify services of any existing cable subscriber, the user is typically only allowed to alter their own services. Finally, there may be some capabilities in the User/PC capability set that are not included in the Retailer/Internet Access capability set. For example, accessing or resetting parental pass codes, past due billing amounts and other personal information such as PINs may be restricted from access by the retailer. Personal information may be accessible only to the user or the agent, and excluded from a third-party.

FIG. 13 illustrates one embodiment of how different provisioning functions may be grouped and offered to different service initiators using different input systems. Various combinations and arrangements are possible and it is expected that different cable system operators may define the relative capability sets differently. Nor is it anticipated that a cable system operator will provide all the possible various capability sets and input systems. FIG. 13 is not intended to limit the relative service provisioning capabilities of the various service initiators or access technologies.

Although a variety of capability sets can be defined, the following embodiments illustrate some of the relative functions that may be provided by capability sets. These capabilities are dynamic and are likely to be augmented when new services are added. This may be triggered by the development of new capabilities by host manufacturers and new service opportunities seen by cable operators. Thus, the functions indicated are only representative and may not contain all the functions provided in a capability set.

User Capability Set (This list of functions does not distinguish between capabilities provided using Internet access or using telephone access (IVR).)

1) Alter basic service subscriptions, add premium channels or pay-per-view capability, and change password values associated with the user's account.
2) View billing history, current bill status, and prices for various service components associated with the user's account.
3) Alter billing information associated with the user's account (e.g., payment method, mailing address, subscriber's name spelling, etc.).
4) View a list of enhanced services and corresponding supported cable set top boxes and capabilities.
5) Activate or register a new cable set top box.
6) Subscribe to an enhanced service (e.g., personal video recording).

Retailer/Internet Access Capability Set

1) Alter basic channel subscriptions and add premium channels for any subscriber on a cable system that the retailer is authorized to access.
2) View a list of supported cable set top boxes and services including video, high speed data, telephony, and audio services; determine compatibility of network to support a selected host based on services.
3) Determine whether cable service is available at the customer's home address, verify whether the customer is a current cable subscriber, and determine an account number if an existing customer.
4) Determine account credit status (good/delinquent) as determined by the cable system operator regarding provisioning new services for an existing cable subscriber.
5) Register a new cable set top box (including host and/or conditional access module), including the capability to enter a cable manufacturer's code and model number identifier.
6) Initiate service installation, schedule a service call, establish a new service account for a customer, establish billing period dates, and indicate an amount of the initial deposit.
7) Activate services and establish initial service parameters.

Agent/Computer Console Capability Set

1) All of the above capabilities defined in the User and Third-party capability sets.
2) Issue service calls, check on network outages and status, access subscriber billing information, modify or reset user pass codes, modify billing charges, etc.

Input Systems Architecture

Figure 14:
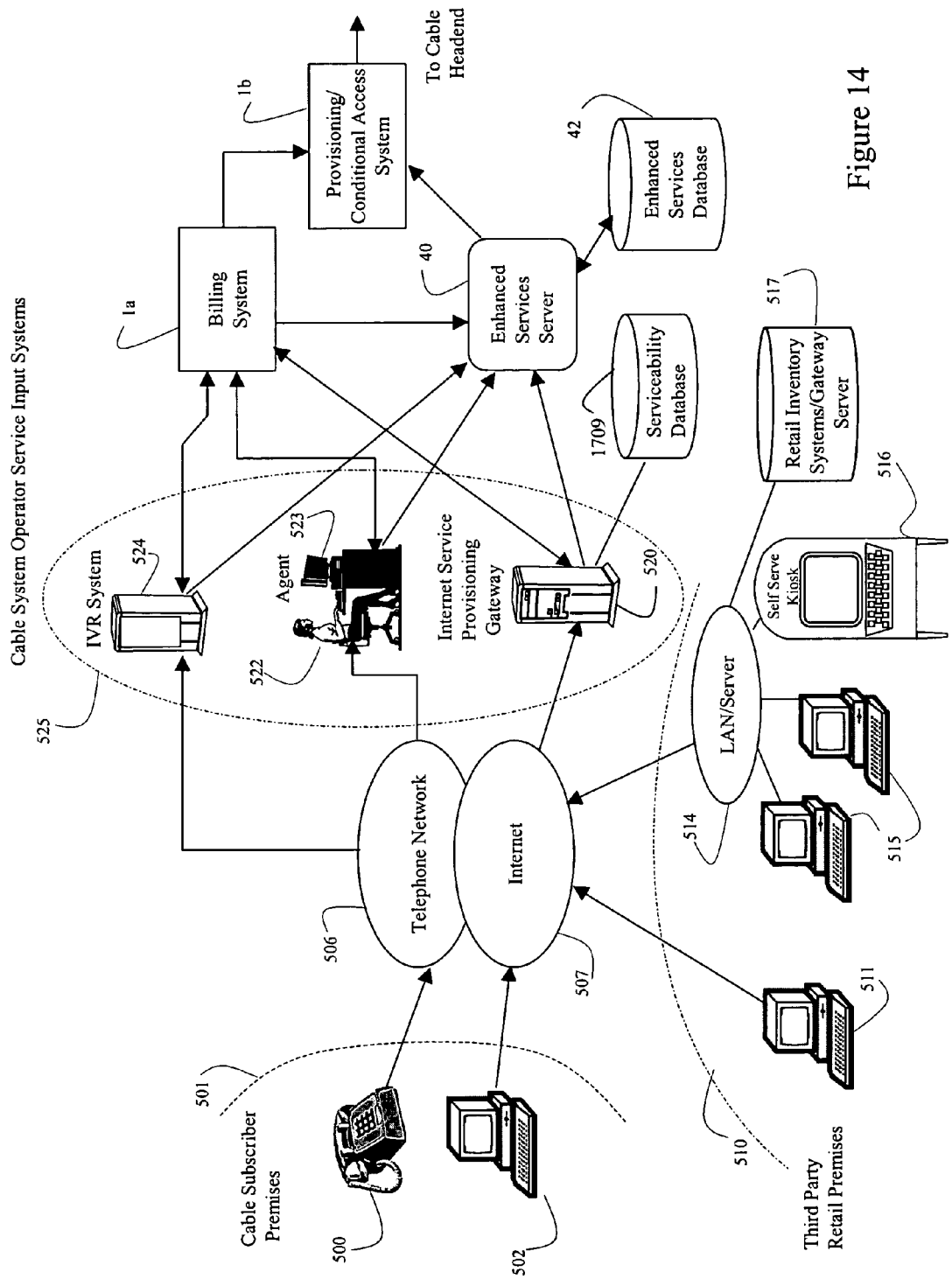
FIG. 14 illustrates one embodiment of a provisioning input system architecture according to the principles of the present invention.

The architectures for the input systems for providing service related data are illustrated in FIG. 14. The architecture comprises various access input technologies that are "loosely coupled" to the cable distribution plant. In other words, the input systems can be altered without impacting the cable distribution plant or the enhanced services system. FIG. 14 illustrates one embodiment of the various service initiators involving a cable subscriber (not shown, but typically located at the cable subscriber premises 501), a retailer sales personnel, typically located at the third-party retail premises 510, and an agent 522 typically located in a call center.

The cable subscriber's premise 501 is illustrated as having a standard Touch Tone® telephone 500 connected to the telephone network 506. The telephone can be used to access the agent 522 at the call center, or the IVR System 524 for automated access. The cable subscriber may also have access to the Internet 507 using a personal computer 502. In this access method, an Internet Service Provisioning Gateway (SPG) 520 hosts a website accessed by the cable subscriber. As is well known, the personal computer may access the Internet 507 either by a dial-up or DSL connection through the telephone network 506 and FIG. 14 should not be interpreted as excluding or requiring either dial-up or DSL access. Although not shown in FIG. 14, the subscriber could access the Internet by using a cable modem connected to their cable line. Another embodiment involves the cable subscriber using the television as videotext-like terminal. This embodiment is discussed subsequently.

The third-party retail premises is indicated by a dotted line 510 and is typically located in a retail store in a mall or stand-alone business location. In other embodiments, the third-party may be a mail order or Internet based business. The retailer may be local to the serving area of the cable system operator, or the retailer may be geographically remote, such as in a different metropolitan serving area. The retailer typically provisions services by interacting with the subscriber verbally in-person or via a telephone. The retailer uses a computer connected to a provisioning network, typically connected to the Internet. The access to the Internet 507 may be direct via a computer 511 or another computer 515 connected to a corporate LAN or intranet, server, or gateway 514 operated by the retailer. The corporate LAN, server, or gateway is typically used if the retailer is a large chain, and the LAN may use a gateway server 517 to provide a customized user-machine interface (e.g, a store "branded" user interface) to the retail sales personnel for service provisioning. In some embodiments, the gateway may be remotely located, even if the retailer's location is local to the cable system operator. The gateway 517 server may also be integrated with inventory control systems as well as serviceability databases that indicate features and capabilities of various hosts and/or cable operators. Alternatively, the serviceability database may be a standalone entity accessed by the gateway as required. The provisioning computers 511 that access the Internet 507 directly typically access a host website that operates in an Internet Service Provisioning Gateway 520. For those computers 515 on a corporate server 514, the computers may access the website interface in the SPG 520 directly or by accessing a retailer-based provisioning website on the gateway 517, which then interacts with the SPG 520. Finally, it is possible that the retailer may install various self-serve kiosks 516 allowing the customer to obtain information regarding various host products, compare compatibility with a selected cable system operator, and aid in selecting a host to purchase. The kiosk may access the corporate gateway and/or may provide limited self-guided provisioning capabilities in accessing the SPG 520. Further, the functionality of the kiosk and provisioning computer 515 may be integrated, so that both functions could be provided by a single physical terminal.

It is possible that the website accessed by the various entities (e.g., cable subscriber's computer 502, the retailer's computer 511, the retailer's computers 515, the retailer's kiosk 516, or the retailer's gateway 517) may have different capability sets and have different user-machine interfaces implemented by different websites hosted on the same server. In the case of the retailer, different capabilities can be defined in the computers 515 and the kiosks 516.

The cable system operator may operate several input systems 525 for receiving provisioning input. In FIG. 14, the IVR system 524 is connected to the telephone network 506 for receiving telephone calls. Such IVR systems are well known in the art and provide various verbal menu prompts and collect Touch Tone® inputs representing caller selections. The IVR system may also receive the calling party number or ANI (automatic number identification) from the telephone network indicating the telephone number of the caller. Alternatively, the IVR system may prompt the caller for their telephone number using keypad or speech input. The IVR system may use the telephone number to query the billing system 1a to obtain service records associated with that telephone number. Alternatively, the IVR may have service records stored locally.

The cable system operator may also provide agents 522 in a call center. The call center may be operated by the cable system operator or contracted out to a third-party call center. In either case, the agents 522 have telephone contact with the caller and access a computer console 523 for viewing customer service information and providing input selections. Such call centers may also receive ANI and automatically display the subscriber's records on a display monitor prior to answering the call. The call centers may access the customer billing records based on ANI or other information in the billing system 1a, or the call center may replicate the billing records locally.

Finally, the cable system operator may also provide an Internet Service Provisioning Gateway (SPG) 520 comprising a server hosting a website(s) allowing direct computer access. The SPG 520 typically has a high-speed interface to the Internet allowing simultaneous access by typically hundreds of service initiators. The SPG 520 may access or incorporate a serviceability database 1709 that provides information as to what services a customer may obtain from a selected service provider. This serviceability database may map the user's location to a particular service provider, and may also provide a list of services offered by the selected service provider. Alternatively, a comparison of services offered by the various providers may be obtained.

Although FIG. 14 illustrates the IVR system, the call center, and the Internet Service Provisioning Gateway as all operated by the cable system operator (as indicated by dotted line 525), there is no requirement that all these systems be provided. If provided, there is no requirement that they be commonly located or under the common control of a single cable operator. These systems, or portions thereof, and can be leased, outsourced, and operated by a service bureau, or shared among multiple cable operators according to various business arrangements. Further, although the Figure illustrates many systems directly connected, they may be indirectly or operatively connected so that data can be effectively transferred even if various gateways, converters, routers, etc are involved.

Each of the service input systems 525 may interface with the billing system 1a and the Enhanced Services Server 40. Typically each input system will interface with either one or the other. Access to the billing system 1a may be required for various reasons. First, service interactions typically require knowledge of the current level of service provided to the customer, including verifying whether the user is a current subscriber. For example, a user interacting via a personal computer 502 using the SPG 20 may desire to verify their service level. This requires the SPG 520 to obtain the appropriate service records from the billing system 1a. If a service initiator adds a service, the provisioning systems should not allow adding a service already subscribed to by the subscriber. Similarly, if the subscriber requests terminating a service, the input system should not allow termination of a service that is not subscribed to by the cable subscriber. Access to the billing system may require the input system to authenticate itself prior provisioning data transfer. This may also be required if the input system access the ESS.

Also, modifying service levels typically requires recording the service transaction and the service levels changes in the billing system. Typically, provisioning a new service results in a billing change, and such information is maintained in the billing system in service records associated with a given subscriber. For example, a cable subscriber may interface with an agent at a call center 523 to add a new service, such as personal video recording. The agent 522 interacts with the call center computer 523 to update the service record associated with the subscriber in the billing system 1a. Then, when the billing process computes the periodic bill for the subscriber, the billing system will calculate the correct charges according to the services provided to the cable subscriber.

The billing system 1a may also define various service levels or service packages according to business rules defined by the cable system operator. For example, 'basic cable service' may comprise certain channels and certain options. Another service tier may be associated with a certain premium channel and additional options. The billing system may have business rules that impact the selection of service packages. For example, a subscriber may be allowed to add a premium channel to basic cable service. However, while business rules may allow deleting a premium channel for a subscriber having basic cable service, the business rules would typically prohibit deleting the basic cable service for a subscriber while retaining only the premium channel. Similar business rules may be implemented in the billing system regarding enhanced services. For example, subscription to a PVR type service might also enable a second tuner in the host to allow simultaneous viewing and recording of two programs.

To facilitate provisioning, the cable system operator may define several service packages or billing codes. The service provisioning input systems may only indicate a service package mnemonic or the billing code to the billing system, which in turn sends it to the provisioning/conditional access system. In this manner, the various service provisioning input systems 524 do not have to be reprogrammed and coordinated with the changes in the definition of the various types of service packages, which may change from time to time. For example, a 'deluxe premium' or 'gold level' package may comprise a set of basic channels, a set of premium channels, and enhanced services, such as personal video recording (PVR) and music-on-demand. Further, the package could define the PVR service as comprising one of two sets of options (e.g. a defined recording duration associated with the PVR service). There may only be two other service packages (e.g., 'silver' and 'bronze' levels). Defining such service packages requires the input system to only recognize three basic service packages and facilitates the service initiator's selection of a service level and design of the input system. This also simplifies communication between the input systems 524 and the billing system 1a.

The input systems 525 may also interact with the Enhanced Services Server. This interaction can be accomplished directly or indirectly. For example, at least some direct interaction is typically required between the input systems and the Enhanced Services Server when provisioning a new host for a subscriber. When the cable subscriber purchases a new host, the make and model of the host, along with potentially a host identifier is maintained in the Enhanced Services System, typically in the Enhanced Services Database 42. While some embodiments may replicate this in the billing system, the information is still typically required in the ESD. Provisioning this data into the Enhanced Services Database typically occurs when the subscriber purchases a new host at a retailer and the retailer functions as the service initiator. The provisioning transaction is then typically referenced in some manner subsequently, when the user activates the host. The means of associating the host with the transaction may be via a transaction reference number or the host identifying numbers (e.g., host or conditional access module address and/or serial number). As will be discussed subsequently, the ESS requires knowledge of the host because the host may automatically 'activate itself' to the cable network by communicating its host identifier. Alternatively, the cable subscriber may manually indicate the presence of the host such as accessing an IVR system and providing a transaction reference number. In either case, the ESS accesses a pending provisioning transaction and must be able to determine the type of host and the appropriate configuration message set required to configure the host. In some embodiments, the 'pending' transaction may actually be a pending transaction, but results in repeating a previously attempted transaction. This will be discussed in greater detail.

Further, the provisioning input system may verify that the host selected by the cable subscriber is supported by the ESS 40. The direct connection between the input system and the ESS allows determining whether the host is supported. This typically requires the ESS to access data in the ESD 42. Alternatively, the input system could query the billing system 1a, which in turn, could query the ESS. However, it may be desirable to isolate the billing system 1a from host-specific details. Similarly, the IVR system 525 and computer console 523 may have functionality for querying the ESS directly or indirectly. Whether the input system accesses the billing system or ESS depends how the messages and their order are controlled—this is called 'workflow management'. As will be discussed, in some embodiments the ESS may provide this function and provide a single point of contact for the input system, with the ESS managing subsequent messages to the other elements and systems.

Figure 15:
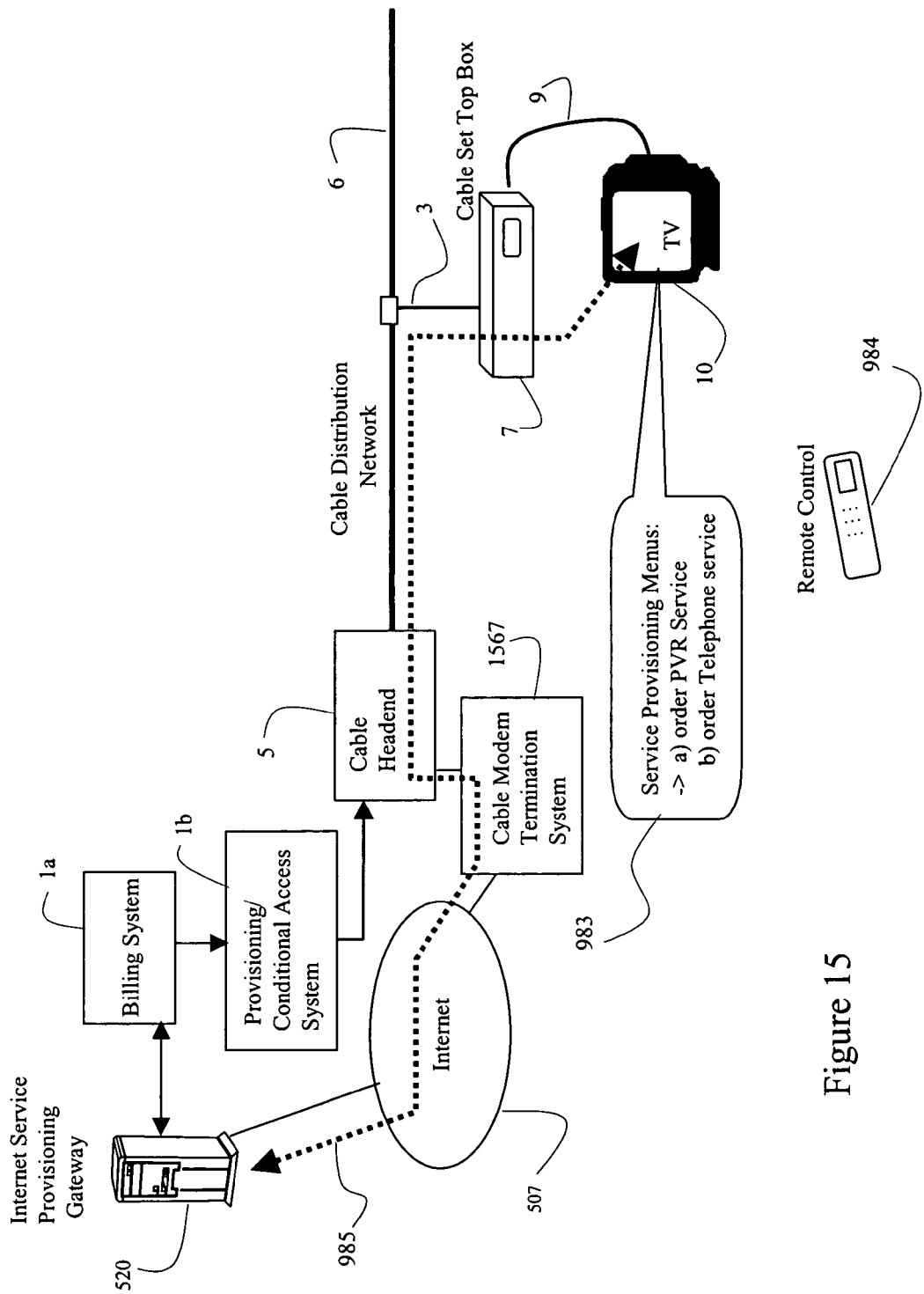
FIG. 15 illustrates another embodiment of a provisioning input system architecture involving service provisioning menus on a television screen according to the principles of the present invention.

Another variation of the user accessing the SPG 520 is embodied in FIG. 15. FIG. 15 discloses an embodiment where the television set 10 functions as an output device by providing videotext like menu options to the user. The user indicates their selection using a remote control 984 as an input device to select a particular menu option or indicate an answer to a question. The menus and input are processed by the STB 7, specifically the host (not shown). The STB then relays information over the cable network 6 using a DOCSIS channel through the headend 5 that is then handled by the Cable Modem Termination System 1567 through the Internet 507 and then to the SPG 520. This architecture requires a two-way cable network and may piggy-back upon the high-speed data capabilities in the host. The host may implement high-speed data capabilities, using a DOCSIS channel as illustrated. Other embodiments may use a reverse path on the cable network. Even if the subscriber does not subscribe to the corresponding high-speed data service, the cable system operator may enable the DOCSIS channel to allow the user to provision or configure services. The host implements a videotext application (which may be downloaded to the host from the ESS) for displaying menus on the television. The user interacts and selects menu options using an infrared remote controller. The host processes the user data (typically returned on a reverse channel) and updates the menus as appropriate. Those skilled in the art will readily identify numerous variations that are possible based on this embodiment. For example, the Internet 507 illustrated in FIG. 15 could be a LAN or other type of direct connection between the Cable Modem Termination System 1567 and the SPG 520, as well as involving the billing system 1a and provisioning/conditional access system 1b. This type of arrangement may be used to provide near real-time provisioning of a service to a subscriber. For example, a user may tune to a premium channel and receive a message indicating that they are not subscribed to the service. The user could then provision their service to include the premium channel using the aforementioned procedures.

Another variation of FIG. 15 involves using an inband channel for broadcasting provisioning information in video form to the user. When a subscriber indicates a desire to provision a service, the request is conveyed on the reverse channel and received by the ESS. The ESS then responds by sending a billing handle to the provisioning/conditional access system that enables the television to receive a channel that is used for subscriber on-line service provisioning. The ESS simultaneously provides the data for the video channel and alters the menus based on the user inputs from the remote control. This scheme is similar in some respects to the interactive television, and represents still another embodiment of a cable subscriber provisioning a service. In this architecture, the ESS could update the billing system as appropriate.

Alternative Input Systems Architecture Embodiment

Figure 16:
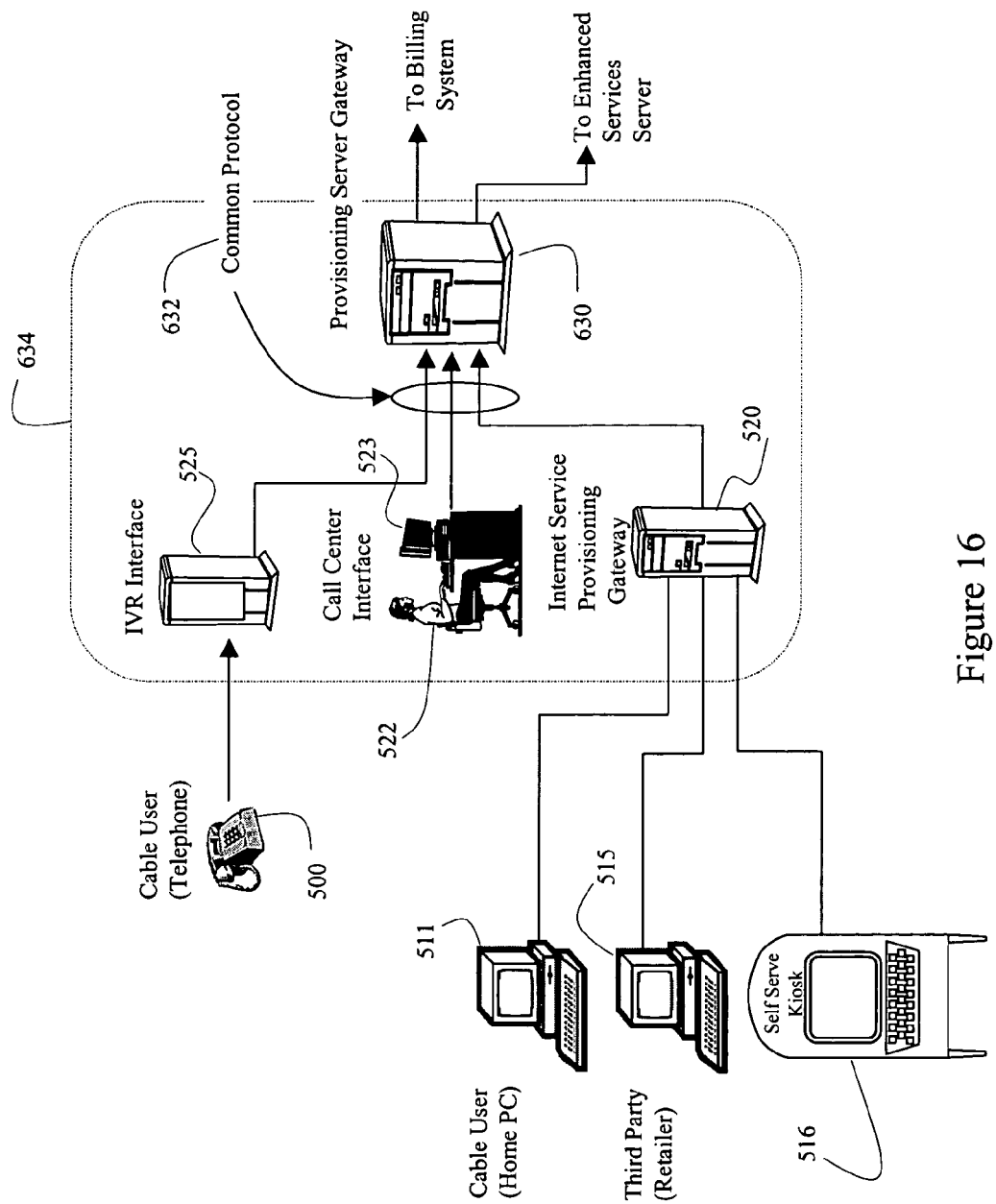
FIG. 16 illustrates another embodiment of a provisioning input system architecture according to the principles of the present invention.

An alternative input system architecture embodiment is illustrated in FIG. 16. The concepts of capability sets are useful in explaining alternative embodiments. In FIG. 16, the various provisioning input systems are indicated by the dotted line 634. In this embodiment, the IVR interface 525, agent computer console 523 and the SPG 520 represent systems providing a user-machine interface to the service initiator. The IVR collects data via Touch Tone® and provides verbal feedback to the user, while the other two computer based input systems provide a graphical or text based user-interface. All three systems function as input/output devices to a Provisioning Server Gateway (PSG) 630. A standard or common protocol 632 may be used to communicate input/output actions between the input systems 525, 523, 520 and the PSG 630. Thus, one function of the PSG is to convert provisioning input messages from the input system to a message format compatible with the billing system and/or ESS system.

In this embodiment, a user interacting with the IVR interface may add a premium channel to their existing channel service list. This is accomplished using a telephone 500 interacting via the IVR menus. Alternatively, the agent 522 at a computer console 523 can perform the same function, as can the cable subscriber or retailer accessing a website. In each case, the user-machine interaction could be different. However, in each instance, the input system sends a similar message to the PSG 630 indicating the function of adding a premium channel for a specific subscriber. The PSG then performs the necessary processing, which may include checking with the billing system whether the cable subscriber is current on their bill and sending messages to perform the requested service change.

This architecture implements a single provisioning application in the PSG system 630 rather than replicating the functionality in each of the input devices 525, 523, 520. Further, each input device could define its own capability set based on the type of service initiator. For example, the IVR application may be developed only to provide those capabilities deemed by the cable system operator as appropriate to the user using a telephone access system. Similarly, the SPG 520 may host three different websites with different capabilities sets by providing one website to the cable user 511, another website to the retailer's PC 515, and another to the retailer's kiosk 516. Access to the retailer's website in the SPG 520 can be secure and limited by various security mechanisms. This prevents unauthorized parties from accessing the capabilities of the retailer. The above architecture isolates the PSG 630 from the definition of the capability set used by the input system technology. Thus, altering the capability set for a class of service initiator only impacts the input system used by that class of service initiator. Changes to a capability set typically do not require any re-development in the PSG 630. Further, this embodiment only requires a single interface on the billing and provisioning/conditional access systems, the Enhanced Service Server, and the PSG. Further, the input systems only have a single interface to the PSG, rather then two interfaces, one for the billing and provisioning/conditional access system and one for the ESS.

This embodiment can be extended to allow a single common provisioning server gateway 630 to interface with a plurality of cable system providers. In other embodiments, the functionality of the SPG 520 may be integrated into the PSG 630. Thus, the PSG 630 may allow retailers or cable subscribers to directly interface with the PSG. This allows a third-party to perform much of the user-interaction on behalf of a cable system operator. The provisioning server gateway may also implement or access a serviceability database that implements the functionality of determining the compatibility of a host type and a cable system operator. In this manner, the PSG may be a third-party entity providing web-based subscription provisioning capabilities to a cable system operator. By serving various cable system operators, the PSG operator can spread costs among all the cable system operators. In a typical business arrangement, the PSG operator receives a commission for the services purchased by subscribers. It is possible that the PSG operator may customize the 'look and feel' of the user-interface by tailoring it to different cable operators, retailers, or other entities.

Another Alternative Input Systems Architecture Embodiment

Figure 17:
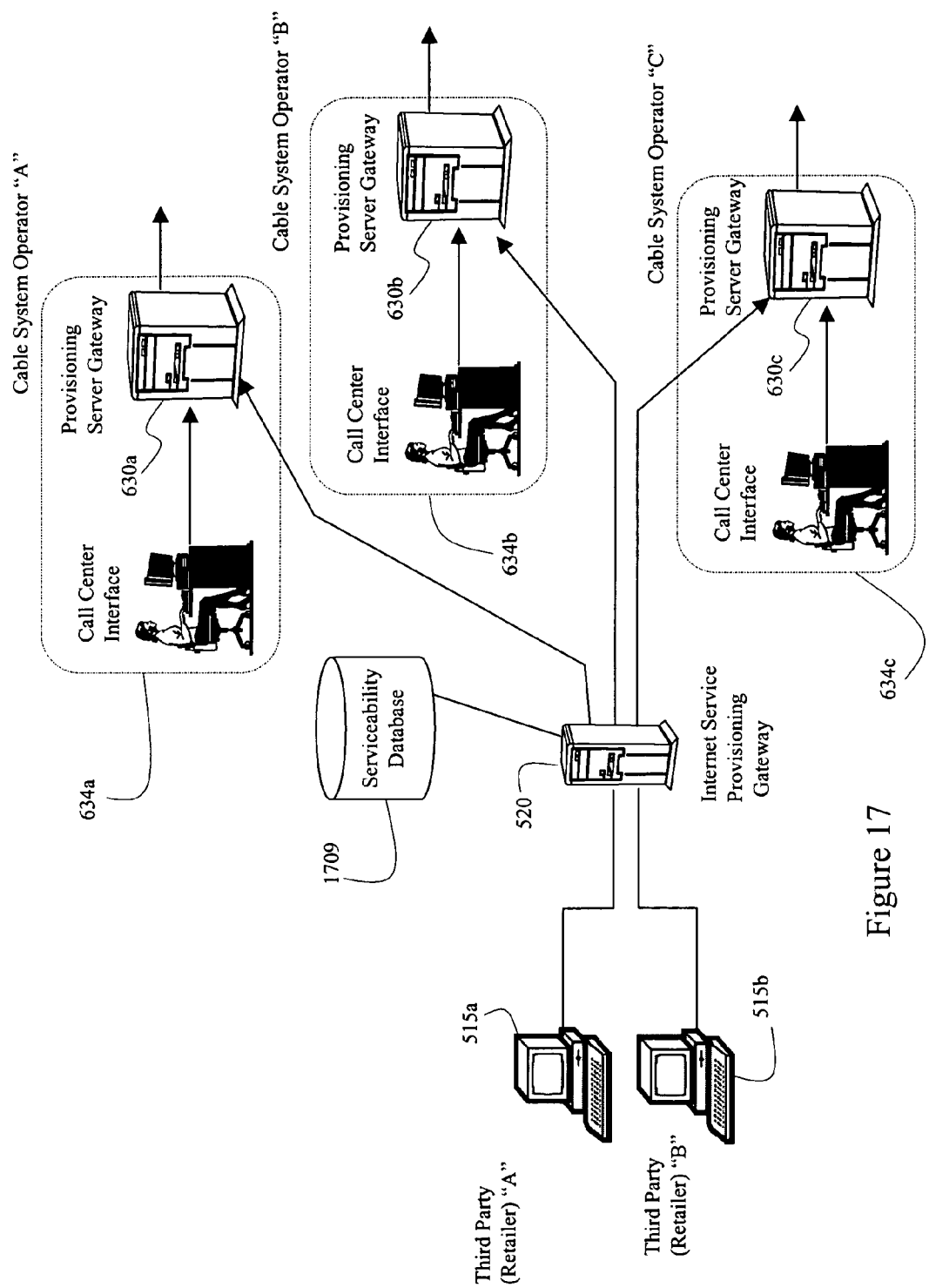
FIG. 17 illustrates yet another alternative embodiment of a input system provisioning architecture according to the principles of the present invention.

FIG. 17 illustrates another embodiment of a provisioning architecture based on a plurality of retailers and a plurality of cable systems. In this embodiment, an Internet Provisioning Gateway 520 provides a website interface to two different retailers 515a, 515b. In this embodiment, the SPG 520 allows communication with a plurality of Input Systems 630a, 630b, 630c wherein each input system is controlled by a separate cable system operator 634a, 634b, 634c respectively. The cable systems may be widely dispersed, for example, located in different states or regions. Alternatively, the different cable systems may be serving the same metropolitan area. The SPG 520 typically uses the Internet (not shown) to communicate with the various input systems based on the serving area of the cable subscriber. Further, the SPG may be operated by a third-party that is not affiliated with any of the cable operators. This arrangement allows economies of scale in sharing resources.

This embodiment provides a common interface to the various retailers, namely third-party retailer "A" 515a and third-party retailer "B" 515b. Again, connectivity between the retailers and the common web host may occur using the Internet or other communication networks and facilities. Thus, either retailer 515a, 515b can provision services for a subscriber on any of the cable systems 634a, 634b, 634c by accessing the common SPG 520 for inputting data. The common SPG 520 incorporates the functionality to select the proper input system 630a, 630b, 630c. This requires that the common SPG maintain a list of each cable system operator and select the operator based on the cable subscriber's service location. If the service areas overlap, the SPG allows the user to select a particular cable system operator. However, unlike the previous embodiment, the third-party retailer is not required to have the ability to select one of several input systems based on the cable subscriber's service location.

As with FIG. 16, the SPG 520 in FIG. 17 may be a third-party entity operating or accessing a serviceability database 1709. In this embodiment, the serviceability database 1709 is illustrated as connected to the SPG. The business arrangement may be that the serviceability database provider receives a commission for the services purchased in exchange for providing comprehensive web-based provisioning services.

The deployment of enhanced service provisioning capabilities is facilitated by simultaneous modification of several elements in a coordinated manner. Frequently this is not possible and new capabilities are introduced at different times with regard to different network elements. For example, in FIG. 14, an enhanced service provisioning capability may exist first at the call center computer console 523 and then a subsequent development may allow a third-party computer 515 to provision the service by accessing the retailer website 520.

Host-Specific Configuration and Control

Overview

The aforementioned service input architecture focuses on various elements receiving service initiator input and providing the service selection data to the billing system and/or the Enhanced Services System. Now, attention is turned to the processes involving the billing and provisioning/conditional access systems and Enhanced Services System. These latter elements are 'tightly coupled' with the cable network infrastructure and the following processes are the culmination of the process that started with the service initiator interacting with an input system.

In general, the message flows for host-specific configuration and control are construed broadly. The function of the various messages and the interaction between the various network elements can be varied. Any such interactions are encompassed by the phrase "host-specific configuration and control." FIG. 18 indicates the breadth of the various functions and flows that are encompassed by host-specific service configuration and control.

Figure 18:
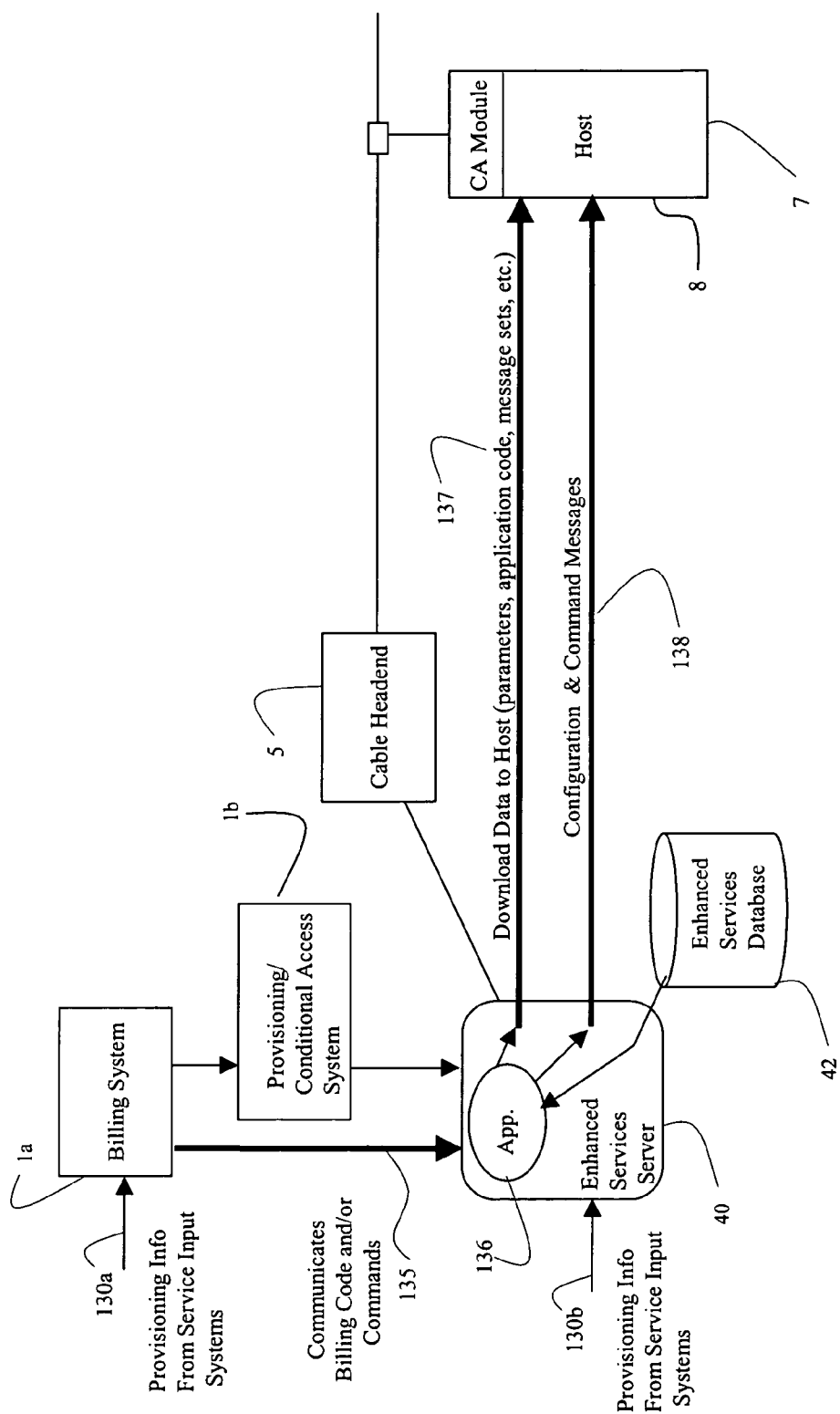
FIG. 18 illustrates one embodiment of information flows for host-specific provisioning according to the principles of the present invention.

In FIG. 18, the basic architecture is presented comprising the billing system 1a and provisioning/conditional access system 1b, the Enhanced Services Server 40, the Enhanced Services Database 42, and the STB 7, comprising a conditional access module and host 8. As previously indicated, configuring enhanced services for a specific host typically requires communication between the ESS and the appropriate host 8 using host-specific protocol messages. Recall that a subscriber may have several hosts, and the specific host to be configured must be identified. Typically, the process starts with the billing system 1a communicating a billing handle or code to the ESS 40. Alternatively, the billing System may communicate commands. In general, whenever a billing code can be communicated, so can a legacy based command. Although the current embodiment is discussed in light of host-specific configuration messages, host-specific commands apply equally. An application defined for completing the provisioning of that service in the ESS is then executed. The application could be written in a variety of languages, including XML, Java, Visual Basic, or a database management application language. The application retrieves the host-specific configuration messages from the ESD. The application typically sends one or more messages to the host, and may receive none, one, or more messages from the host (not shown) in response. The messages sent may be formed 'dynamically' or 'statically' as previously discussed. Receiving messages from the STB requires a two-way cable distribution network and the provisioning process must be defined to operate over a one-way or two-way cable network. If a one-way cable network is used, then no response messages are expected.

In FIG. 18, the information flow is presumed to flow from billing system to the ESS, and the ESS then forwards the information as required to the provisioning/conditional access system. This presumes that the ESS is able to identify which billing codes and commands it receives are to be forwarded to the legacy elements (e.g., the provisioning/conditional access system). Another architecture involves an alternative information flow where the billing system communicates selective billing codes and commands to the provisioning/conditional access system, and selective billing codes to the ESS. In this case, the provisioning/conditional access system then functions as a workflow coordinator. In yet still another variation, the billing system may replicate each billing code to both the legacy provisioning/conditional access system and the ESS. In this variation, the provisioning/conditional access system would typically ignore enhanced services codes, and only act upon those billing codes it implements. Similarly, the ESS will act upon enhanced service billing codes and ignore those legacy codes. Each of these variations are different embodiments of workflow management. The workflow management function described above defines which messages are processed by which elements. Although the above embodiments have discussed this function as being integrated with either the billing system, ESS, or provisioning/conditional access system, other embodiments are possible where a separate workflow system is deployed that communicates with the above mentioned systems and coordinates the flow of billing codes and commands. Those skilled in the art can devise further alternatives that can be used in conjunction to accomplish the goals of the present invention.

The messaging between the ESS and host may occur using either an out-of-band channel, in-band channel, or a DOCSIS-based channel. In some situations as it will be seen, both an out-of-band and inband channel may be used for provisioning a host for a specific service. Two-way communication is not always present or required in the cable distribution network, although typically a more robust set of capabilities can be supported using two-way communication. Further, messages conveyed by the ESS or host may be in various forms, including plain text form, bit mapped, XML, or other, and can be encrypted, authenticated, or both encrypted and authenticated. Since host capabilities may be remotely configured and controlled, and software applications can be downloaded, it may be desirable to encrypt information for privacy or authorization reasons or authenticate data to ensure the purported entity sending the information is the actual entity. The existence of computer viruses and hackers on cable systems are not as prevalent as on the Internet, but this is partly attributable to the historically closed nature of the cable network. As downloading data and remotely configuring parameters becomes more prevalent, additional security measures may be necessitated to avoid software viruses, worms, and the like. Encryption and authentication techniques are well known, and various schemes can be used in conjunction with ESS-to-host messaging. Further, the encryption keys sent to a particular host for enabling decryption of digital programming information could be used to encrypt and decrypt data sent in the out-of-band or inband channels. Alternatively, other encryption techniques (such as DES, Pretty Good Privacy, message digests, or other schemes) can be used. Those skilled in the art will recognize that various techniques can be applied to the messaging between the ESS and the host.

In FIG. 18, two main types of interaction between the ESS and the host are illustrated. One form is typically for configuring and controlling the host, while the other form, typically used less, is to download software code objects.

The most common message is a configuration or command message 138 to invoke a function or interact with the host in some manner. The distinction between a configuration message and command message is not always definitive, but messages setting parameters can be considered configuration messages while command messages instruct performance of an action. Regardless of the distinction, configuration and command messages could be used to read/write/update memory locations or parameters, reset or initialize the host, execute a service routine, report diagnostic information, report usage statistics, et cetera. It is expected that host manufacturers will develop a variety of messages for configuring various functions. All such host-specific message variations are encompassed within the scope of 'host specific configuration and control' and may be included in a configuration message set. Eventually, a quasi-standard of messages and capabilities may evolve among host manufacturers for a common capability. As these develop, the principles of the present invention allow the ESS to implement the newer versions of the protocols in a similar manner. The ESS may retain both versions during a period in which the older protocol is being phased out.

A second type of interaction is downloading a large amount of host-specific data. In this case, a message 137 downloads data, such as replacement application code (e.g., 'software patch'), or protocol messages. One application of the present invention is to allow convenient updating of software in the host or deployment of new capabilities. For example, if a new service capability is developed, the host could obtain the capability by downloading software without requiring the user to purchase a new host. Alternatively, if the user desires to alter a service attribute, application software regarding handling of the new service attribute could be downloaded. The host may be designed to be backwards compatible, so that the new configuration and control messages augment the existing messages rather than replace them.

Host-Specific Configuration—Specific Service Example

Continuing with using the aforementioned PVR service example, after the cable operator has created the appropriate configuration message set, the next step is to configure a specific host. For example, after the subscriber adds Tier 1 PVR service to their service profile in the billing system (typically via one of the aforementioned input systems), the subscriber's host must be enabled and configured for the service. In some cases, the business rules or the service definition may also require configuring or authorizing a basic service in conjunction with the enhanced services. For example, subscribing to a PVR service typically requires at least subscribing to at least some video programming services. The non-enhanced service component of the enhanced service may be configured using the existing provisioning/ conditional access system commands and procedures or may use messages and procedures defined using host-specific messages.

In the present example and focusing on the PVR service, the Enhanced Services Server must configure the subscriber's host to enable recording for the appropriate number of hours, enable the appropriate function set, and indicate the automatic erasure time, partition the disk drive, enable simultaneous use of a second tuner, etc.

Figure 19:
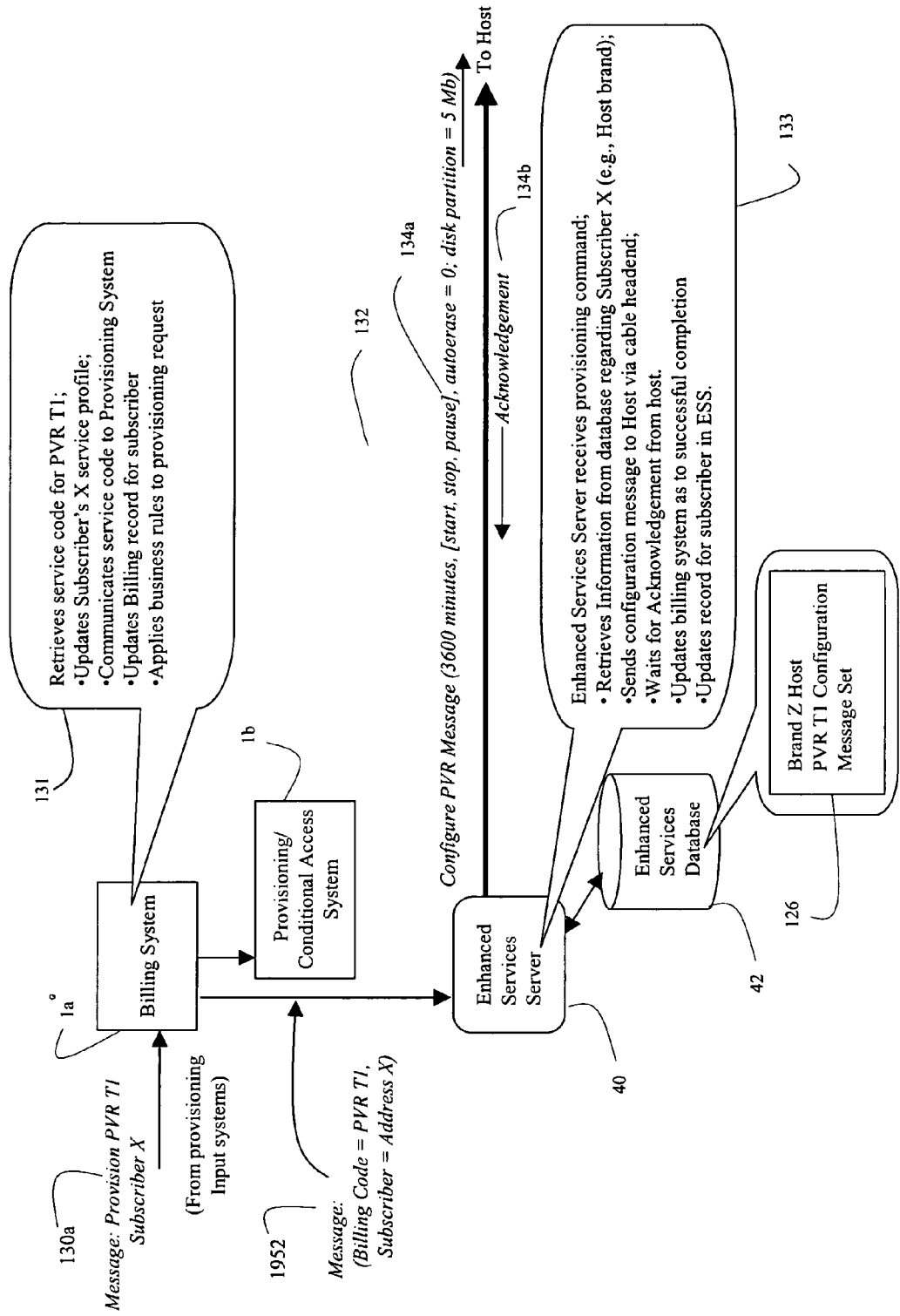
FIG. 19 illustrates one embodiment of the message flow for provisioning a specific enhanced service according to the principles of the present invention.

An embodiment of a specific message flow for provisioning a subscriber is illustrated in FIG. 19. In FIG. 19, the billing system 1a receives a message 130a requesting the provisioning of a service. This message could have originated from any of the previously discussed input systems and from any of the service initiators as defined by the service input used by the cable operator. In an alternative embodiment, the message 130b may have been received instead at the ESS. If that were the case, the ESS manages the message flow by copying the message as appropriate to the billing system 1a. The message 130a indicates provisioning Personal Video Recording Tier 1 (PVR T1) for a specific subscriber, designated here as "Subscriber X." As the billing code PVR T1 was previously established during network and service provisioning, the billing system 1a recognizes the billing code and performs the defined actions 131 including: updating the appropriate subscriber's service and billing profile to reflect the added service, determining the appropriate host address for the subscriber, and communicating the provisioning information to downstream elements, namely the ESS. Recall that the billing system maintains subscriber information, including name, address, host address, and optionally host type. The billing system is able to recognize the subscriber identification information in the message 130a and determine the appropriate host address and provide this in another message 1952 containing the billing code to the ESS.

Recall from FIG. 18 that there are various alternatives for communicating service related messages from the billing system to the ESS. In one embodiment, the billing system sends all billing codes and commands to the ESS, and the ESS then forwards the appropriate billing codes and commands to the legacy provisioning/conditional access system 1b. The architecture in which the ESS incorporates work flow management functions is presumed here, which is why the billing system does not send the billing code to the provisioning/ conditional access system, but rather directly to the ESS. The ESS then determines what information is forwarded to the provisioning/conditional access system. Further, as previously mentioned, the input message 130b could be been alternatively received at the ESS, and the work flow functions would also be performed at the ESS as well.

In addition to updating the subscriber's service profile in the billing system, the billing system may also apply business rules established by the cable system provider. For example, subscription to PVR will typically require the subscriber to have some level of video programming service. Alternatively, the cable system operator may mandate that the service is only available on 'deluxe' service packages. Thus, a subscriber having only high-speed Internet access may not be eligible to be provisioned for PVR service. Further, since the subscriber may have multiple STB in their serving location, the same STB enabled for PVR must also be enabled for video programs.

After receiving the message indicating the PVR T1 billing code and host address 1952, the Enhanced Services Server executes an application 133 that determines the host type associated with the host address, and retrieves the appropriate PVR configuration message set for the appropriate host type. Typically, the specific host is identified by the manufacturer's identifier and model number. Recall that a subscriber's host type was previously recorded in the Enhanced Services System during provisioning. (If maintained as part of the 'house record' in the billing system, this may be conveyed as required to the ESS. Similarly, the ESS typically records the host address, but if stored in the billing system, the ESS may query the billing system as appropriate.)

After determining the host type, the ESS 40 determines whether the appropriate host-specific configuration message file is present in the database 42. If not present, the Enhanced Services Server 40 may treat this situation as a non-supported host and treat the provisioning request as an error condition. In other cases, the absence of a host-specific configuration message set may be due to the ability of the ESS to use legacy type commands for configuring the host. Assuming the host file is present, the Enhanced Services Database 42 retrieves the appropriate configuration message set for interacting with the host. The messages are obtained from the ESD 42, shown here as "Brand Z Host" PVR T1 Configuration Message Set 126.

After retrieving the appropriate configuration messages, the Enhanced Services Server then formulates the host-specific configuration message to send to the subscriber's host to configure the PVR service. As previously discussed, the configuration messages may be dynamically or statically determined. If the message is dynamically determined (similar to interpreting a computer language command), the ESS uses the host protocol file and a service parameter data file (and network default parameter file if required) to formulate the host-specific message. The protocol file indicates the messages, including the syntax and encoding rules, and the service data file indicates the parameter settings that are used for the service involved. The ESS uses the parameter settings to determine how to encode the variable parameters used in the protocol messages. The service parameter data may be stored in memory of the Enhanced Services Server, or in the ESD and indexed by the billing code.

If the configuration message set is statically determined, then the appropriate message syntax and encoding is stored in the configuration message file and no 'interpreting' is required. This is similar to 'compiling' the required message. Of course, a statically determined configuration message requires storing every required service variation in the appropriate host file. Dynamically determined configuration messages do not require as much storage space, but do require separate information as to default parameter values for a service. In some embodiments, implementations may utilize one or the other, or a combination of techniques. With respect to commands (that may not communicate parameters to the host, but have single syntax), the difference between the two techniques is less significant. In the following embodiments, the messages illustrated could be generated in any of the above ways.

The message 134a as illustrated, is structured according to the protocol specifics and functional definition for that particular host (e.g., "Brand Z"), which in this embodiment involves setting various parameters, including the recording duration in minutes, enabling access to the extended program guide information, setting the auto-erasure time, and setting various disk partitions sizes. The determination of these parameters is based in part on the cable system operators' service definition, the host's capabilities, and the protocol messages defined by the host manufacturer for interacting with the host. The structure of the protocol messages, responses, syntax, parameters, encodings and the like are determined by the host manufacture and the cable system operator selects the specific configuration messages and the value of parameters to conform to the operator's desired service operation. The structure of the protocol message is typically maintained in the host protocol file in the Enhanced Services Database 42.

In some instances, the host may implement a capability associated with a service, but the capability has a default or fixed value, so that a configuration message is not required. For example, the host in FIG. 19 may not have a second tuner. Consequently, configuring its status is not required nor would sending such a message alter anything. Alternatively, the host may always enable a second tuner for simultaneously viewing and recording two separate programs, in case the host has two tuners. Again, in this case sending a configuration message may not accomplish anything. In other cases, the cable system operator may include such messages anyway as a 'safety' feature to initialize the host to a know state. For example, STB or hosts manufactured primarily for the European market may be designed to provide PAL video output signals by default, whereas hosts manufactured for the U.S. market are designed to provide NTCS output signals as a default. A cable system operator may always send a message for a certain brand of host to configure the video output for NTSC. If the host is already in this mode, the message will not result in any change. However, if the host is set to provide PAL output signals as a default upon powering up, then this type of configuration message ensures that the host provides a recognizable video signal for U.S. operation. Further, if the host does not recognize the message (e.g., it only provides NTSC so that commanding it to provide NTSC has no effect), then sending a message to enable/disable a non-existent capability may not adversely affect the service operation, but would only potentially benefit operation if the host does recognize the message.

Finally, after the host receives the message 134*a*, the host may respond with an acknowledgement message 134*b*, completing the process. This presumes a two-way cable network. In a one-way cable network, no acknowledgment message could be sent. The ESS may confirm the successful completion of the configuration to the billing system (not shown). This indicates to the billing system that the service is provisioined and charging can begin for the service. This avoids charging a user for a service when activation was not successful. Depending on the service and host characteristics, additional messages may be required by the ESS. For example, the ESS may request the provisioning/conditional access system to reinitialize or reset the host. If available, this may occur using legacy based capabilities over legacy based interfaces. Alternatively, this could be accomplished using a newly defined command message from the ESS to the host.

In alternative embodiments, the ESS may instruct the host to tune to another channel to receive the configuration and command messages. For example, the ESS may send the following file to a host:

```
Config.xml {
    ConfigVersion = "1.0"
    ConfigType = "Cable"
    ConfigTuningInfo= "atscChannelInfo"
    IndexFile = Index.xml
    EnhancedServerAddr= "192.1.1.3"
    ServerPort = "14191" }
```

This command file first indicates the version used, which allows different future formats to be used. The "ConfigType" indicates this message applies to a cable network. The "ConfigTunningInfo" indicates which channel the host should tune to in order to receive further messages. The IndexFile indicates further identifying information, such as the MPEG-2 service name in the channel containing the private data section that contains the index file. Finally, the ESS address and port number are indicated, which are used for reverse path communication in a two-way network. The ESS then provides the appropriate data on the indicated channel for the host to receive.

Exception Procedures

There are various exception procedures that may occur in conjunction with the aforementioned provisioning example. Not all are detailed, and the handling of each exception procedure can be defined differently, based on the cable system operator's requirements. Three generic exceptional procedures are embodied in light of FIG. 19.

In the first example, the cable system does not support the indicated host, either for any enhanced service, or for the specified enhanced service, nor does the system support the indicated subscriber. In one embodiment, the billing system 1*a* upon receiving the provisioning message 130*a* rejects the message indicating the service cannot be provisioned because of the indicated service or subscriber. The billing system 1*a* either maintains a list of supported hosts or specific services for a given host, and determines that provisioning of the host or specified service for that host cannot be supported, or alternatively, the billing system may access data from the Enhanced Service Server 40 to determine if the host/service can be supported. In either case, the billing system generates an error and does not send any service related provisioning message to the ESS. In alternative embodiments, the billing system may provision the host for legacy based capabilities and forward all unrecognized codes to the ESS and let the ESS appropriately handle the event. In other embodiments, if the host is initially activated (e.g., corresponds to a new service account), the billing system may provision the host for a minimal level of service (e.g., basic cable) so that the subscriber is not left without any service while the error is investigated.

In the second generic exception procedure, the billing system accepts the message 130*a* and generates a message 132 to the Enhanced Services Server 40 with the enhanced service billing code. Alternatively, the message 130*a* may be sent directly to the ESS 40 (corresponding to message 130*b* of FIG. 18). The ESS 40 accesses the ES Database 42 and discovers an error, such as the indicated host type is not supported, the subscriber's host type cannot be determined, the billing code is not defined, etc. Typically, the ESS 40 returns an error message to the billing system and does not send any configuration or command messages to the host.

Finally, a third generic exception procedure occurs when the ESS 40 to Host messaging 134 fails in some manner. This would be manifested, for example, by the return of a message from the host indicating a failure, or the lack of any return message in a two-way cable network. For example, a "negative" response from the host could be received at the ESS, or an expected 'acknowledgement' message sent by the host was not received at the ESS. In this circumstance, the problem may be due to a variety of reasons, including a mismatch between the host actually used at the subscriber premises and the host recorded as being used. For example, "Brand X" is recorded in the database system as being used by the subscriber, but the subscriber has connected "Brand Z." This may occur if the cable subscriber 'swaps' the set top box without notifying the cable system operator or activating the unit in some manner. Alternatively, the ESS to host messaging may have failed for any number of reasons, or the host requires a newer (or older) host protocol version. Or, the configuration message set was created based on a two-way network configuration whereas the network is only one-way. Resolution of this type of failure in the ESS-host provisioning message 134 may require manual intervention on the part of the cable system technicians. In any event, the ESS will typically generate an error message on a maintenance console (not shown) indicating the cause of the failure or communicate the error message to some other cable network system. Further, a message is typically returned to the billing system indicating failure of the provisioning request so that billing charges are not included in the subscriber's bill. An indication may also be passed to a customer service agent or service technician where they further resolve the problem.

Host Activation

"Host activation" is the process of letting the network know about the presence of the host on the cable plant. This may occur due to power loss at the host, initially connecting a new host, or manually resetting the host by the user. The cable network, in turn, then treats the host as appropriate. For example, a host connected for the first time would be initially configured for all associated services. Depending on the service and implementation aspects, other hosts may not necessarily require configuration. Various embodiments may exist, and the phrase "set top box" should not be construed to limit the inventive principles in any way.

In many instances, the service provisioning process is initiated prior to actual installation of the STB. For example, a customer may purchase the set top box at a retailer, and the retailer initiates service provisioning for the customer. The process is initiated while the customer is in the retail store with the STB, prior to the customer returning to their home and connecting the STB. While the service input phase may have been completed, the host-specific configuration commences after the host is connected to the cable network.

In such cases, the cable network elements can be thought of as maintaining the provisioning transaction in a pending state. From an implementation perspective, the transaction may be actually pending or it may be virtually pending. In the first case, the service input message is received by the billing system, the billing system sends the appropriate billing code or command to the ESS, and the ESS waits for the host to be activated. During this time, the transaction is actually pending. (In an alternative architecture, the service input messages are delivered to the ESS first, which then manages the workflow to the billing and provisioning/conditional access systems. This alternative does not impact where the transaction is viewed as pending or completed and requiring re-initialization.) The ESS maintains an indication of whether the subscriber's host has been activated. The ESS could even send a message to the host confirming its presence (assuming a two-way network allows the host to respond). Regardless, the ESS refrains from sending the configuration messages to the host until the host is connected to the network, which is determined by the following host activation procedures.

In the virtually pending transaction, the ESS sends the appropriate configuration messages as soon as the billing system provides data. If the host is not connected, then the messages sent by the ESS are ignored as the host obviously cannot be configured if not present. However, when the host is subsequently connected to the cable network, then the configuration messages are resent. This latter approach is consistent with operation on a one-way network.

Thus, the ESS either withholds sending the configuration messages until the host's presence is detected, or it sends the configuration messages immediately, and resends the message after the host is detected. From a high level perspective, the ESS appears to maintain a pending transaction in either case, whether it actually does or not. The above applies regardless of whether or not an enhanced service requires invoking a legacy configuration or command message as a component of provisioning the service.

The procedures for starting the host-specific configuration process depends on the nature of the cable distribution network, specifically, whether the cable network is one-way or two-way. There are several embodiments of notifying the headend of the connection of the new set top box. First, the STB could 'auto-initiate' the activation procedure. Second, the subscriber could manually initiate activation, typically by placing a telephone call.

The auto-initiation activation of the STB could be triggered by the application of power to the STB and connecting the STB to a two-way cable network. Once the STB determines it is connected to the cable distribution network, it initiates a message on the reverse channel to the cable headend that is provided to the ESS. Alternatively, this could be initiated using a default MAC address on an out-of-band DOCSIS channel. One embodiment of the activation message sent from the Host to the ESS is shown below:

```
HostProvision.xml {
    ProvisionVersion = "1.0"
    HostAddr = "00:00:01:4b:fc:3b"
    HostID = "Thompson"
    HostInfo = host-specific information }
```

In this activation message, the protocol version indicator allows forward messaging flexibility for activation protocol formats. The HostAddr indicates a conditional access module associated with the host that the ESS can use for host-specific communications, such as communicating a configuration or command message or indicating a channel on which further host-specific information can be received. The HostID confirms the make of the host to the ESS and the "host-specific information" may contain a software inventory comprising software modules present in the host and associated version numbers, specific options present in the host, or any other indication of capabilities associated with the host. The ESS may use this information to map the host to specific capabilities and services provided by the network. The ESS may also determines the subscriber based on identification data sent from the STB. The ESS then determines the appropriate provisioning data, including the required configuration message set files, to send to the host (or to resend, as discussed previously).

However, the cable network may be capable of only one-way communication. In the case of a one-way system, there is no reverse channel communication from the STB. In these cases, activation can be initiated by the subscriber placing a telephone call. In one embodiment, the subscriber calls a telephone number that is answered by the customer service representative. The subscriber verbally provides confirmation of identity, and equipment information regarding the manufacturer and model numbers of the STB, the MAC address, etc. Alternatively, the caller provides a transaction reference number to the cable network to identify a pending transaction. Either type of information allows the ESS to identify the transaction. The host type is typically indicated in the previously established provisioning record so that the information is not required to be repeated to the agent. However, if required for verification or other purposes, the caller may be requested to repeat the information. The agent then initiates the activation process in the cable headend and/or Enhanced Services Server to configure the STB as well as transmit any required host files to the STB. The agent in this case typically uses the same provisional computer console as previously described.

An alternative embodiment involves the subscriber calling an interactive voice response (IVR) system. This system receives the calling party number of the caller provided by the telephone company (frequently called automatic number identification or ANI) and accesses the previously established provisioning records based on matching the ANI with the provisioning record or receiving a transaction number entered by the user in response to a prompt. The provisioning record was previously established by a service initiator using one of the aforementioned input systems. If the record is not found for any reason (e.g., the subscriber is calling from another telephone, such as a cellular telephone), the call can either be transferred to an agent where the process continues manually, or the system can prompt the caller to enter additional information using the telephone keypad (e.g., their home telephone number). Assuming the appropriate pending provisioning record is retrieved, the Enhanced Services Server can configure the STB as required, download the appropriate host data files to the STB, or invoke a legacy based conditional access capability. The IVR system may instruct the subscriber to power-on their STB and television and wait for a confirmation message displayed on the television indicating that the process has successfully completed. If the confirmation message does not appear, the IVR could transfer the call to an agent for additional troubleshooting. In one embodiment, the IVR STB activation application could share a common platform with the IVR service provisioning input system.

In each of the activation embodiments, a record of a provisioning action is retrieved by the ESS. This record was created by one of the input systems previously mentioned and may or may not be an actual 'pending' transaction as previously discussed. For example, when a third-party retailer sells a STB and services for a customer, a pending provisioning request is created. The third-party retailer may provide the customer with a transaction reference number that the customer enters into the IVR system or provides to the agent. This reference number is provided to the ESS upon creation of the provisioning transaction and allows identification of the request. Once the provisioning record is retrieved, the ESS may further interact with the headend to communicate any necessary configuration parameters or software objects, or reinitialize the host, as appropriate. The determination of which configuration parameters are required and the need for downloading host files depends on the service provisioned.

Several examples are subsequently illustrated at a high level regarding the role of host activation.

EXAMPLES

Two examples further illustrate some of the previous capabilities including the host activation. One example involves a one-way cable network, in which there is no reverse channel, and the other example involves a two-way cable network, in which the STB can signal on a reverse channel to the cable headend. The latter provides a richer set of service interactions by allowing signaling to occur from the subscriber's premises to the network. In each example, it is presumed that access to the cable network is physically available at the subscriber's serving location and properly configured, so that a technician is not required to install the cable outlet and connect any consumer electronics devices. Within each example, alternative embodiments are described.

Example 1

Provisioning Legacy Services and Enhanced Services on a One Way Network

This embodiment can occur under various circumstances, including a new cable subscriber purchasing a new set top box from a consumer electronics retailer and subscribing to basic and premium services along with an enhanced service, such as PVR, at the same time. The exact form of the legacy and enhanced service is not critical to illustrate the principles of the present invention. As previously indicated, the principles of the present invention can be applied when provisioning only a legacy service or an enhanced service, and this illustrates both services for the sake of completeness. Further, various prerequisite steps are illustrated to facilitate understanding the relationship of the various entities.

The message flow of the various entities is illustrated in FIG. 20. In these diagrams, steps are referenced (in the left column of the figure) in lieu of item numbers to facilitate the presentation of the figures. FIG. 20a illustrates some of the prerequisite steps that occur prior to host-specific configuring. In FIG. 20a, the process begins in step 1 with the host manufacturer creating a host and the associated software for controlling the newly developed host capabilities. The host manufacturer deposits the software in the Host File Database after appropriate certification and testing has occurred in step 1. The Host File Database then distributes the software to various cable systems, specifically downloading the host profile file and host protocol file to the Enhanced Services System in step 2. The files may be 'pushed' by the Host File Database or triggered by an explicit request by the ESS (not shown). The cable system operator must support the target host by obtaining the software and defining the appropriate configuration message sets for that host as previously discussed and is shown in step 3. It is presumed that the appropriate billing codes are defined and configured in the billing system and the various input systems are updated as required.

The host manufacturer then introduces their host product into the retail supply chain where the customer subsequently views and selects the host at a retail store (not shown). Once the customer decides to purchase the host, the retailer first determines the ability of the customer to obtain the desired services in step 4. In this embodiment, a Provisioning Server Gateway is accessed in step 4 to determine the purchaser's serviceability based on the purchaser's location. Alternative embodiments may use a separate, standalone database. Alternatively, the retailer may access a serviceability database at a website operated by the cable operator or operated by a third party on behalf of one or more cable operators. Determining the customer's serviceability is typically based on information provided by the customer, such as their residential address, zip code, or telephone number. The retailer, typically using a computer accessing the Internet, accesses the Provisioning Server Gateway. Various embodiments of the gateway are possible, including using retailer proprietary systems, third-party databases, etc. Some larger cable operators may utilize retailer proprietary systems, while smaller cable operators may prefer outsourcing this capability to a third-party. The response indicates information of the various cable operators and their area of service coverage, services offered, and compatible host manufacturers available for the customer.

After the serviceability and compatibility of the host to be purchased is determined relative to the customer, the retailer then provisions the service. In some embodiments, the retailer may have access to removable conditional access modules and installs it while in other situations the retailer only provides the host. Typically, the conditional access modules are designed to be compatible with a particular cable headend, so the host retailer typically at least configures the appropriate type of conditional access module. In step 5, the host retailer determines the appropriate information from the conditional access module, if provided (e.g., serial number, MAC address) and provides the data to the service provisioning input system. This information indicates the host brand and model as well. The data is communicated from the Provisioning Server Gateway to the appropriate billing System and then to the Enhanced Services System. In step 6, the ESS is illustrated as commanding the provisioning/conditional access system to add the host. In step 7, the various systems acknowledge completion of the action.

In this embodiment, the billing system receives the data from the Provisioning Server Gateway in step 5 and forwards the appropriate command and data to the ESS. An alternative embodiment, as previously described, may result in sending the appropriate command and data from the Provisioning Server Gateway directly to the ESS. In this embodiment, the ESS then indicates the service added to the billing system. This alternative, as well as others, depends on the workflow management flows provided by the billing system and the ESS.

Further, in this embodiment, the provisioning/conditional access and cable headend (represented as a combined entity for purposes of illustration of the figure) does not communicate the corresponding channel maps, authorization keys, configuration messages, etc. This presumes that the STB has not been connected to the cable plant and the cable plant is waiting activation of the STB. Alternatively, the provisioning/conditional access and cable headend system could communicate the messages, and if the STB is not present, then the messages will have no effect. This is dependent in part on whether the cable plant is one-way or two-way. If one-way, then the cable plant may not know if the STB is present.

Continuing with the message flow, in step 8, the host retailer then provisions service related information. The acknowledgement from the ESS in step 9 confirms the receipt of the service related provisioning information During the process of provisioning the host and service, the ESS may provide a transaction reference number to the retailer, which in turn, is provided to the customer. Alternative embodiments may incorporate a timestamp and host retailer identifier number generated by the Host Retailer (or that some other values determined by the Host Retailer) to identify the transaction. This number identifies the transactions that were performed on behalf of the subscriber. The transactions may be flagged as being in a pending provisioning state in the ESS, since the customer has not yet installed and activated the host.

At this point, the retailer's actions are completed, and the subscriber completes their purchase of the set top box (which may be embodied as a host in a consumer electronics device), and which comprises the conditional access module installed in the host in this particular embodiment. As previously noted, other embodiments may involve the functionality of the host and conditional access module integrated in a consumer electronics device (e.g. digital television). The user takes the STB home, and connects the STB to their television and the cable outlet as shown in step 10 of FIG. 20*b*. At this point, the cable subscriber must activate the unit.

Since the cable plant in this embodiment is one-way, it does not allow reverse channel communication from the host and the user must manually notify the cable operator of the installation of the STB. This is accomplished in step 11 by the subscriber calling an agent in a call center, or calling an IVR system that recognizes the cable subscriber using the calling party telephone number. In either case, the call center or IVR is provided the transaction reference number previously obtained. The call center or IVR system then communicates the activation related information to the ESS in step 12. The ESS in step 13 confirms the subscriber's existence. In step 14*a*, the ESS instructs the billing system to add the appropriate billing code to the subscriber's billing record.

In this embodiment, the service input system provides the data to the ESS; other embodiments may provide it to the billing system that then forwards the information to the ESS. In step 14*b*, the ESS then instructs the provisioning/conditional access system to initialize the host. In alternative embodiments, the billing system could have performed this step. Regardless of which of the above embodiments is used, the provisioning/conditional access system configures and authorizes the host for the legacy based capabilities in step 15 by sending the appropriate configuration messages, commands, channel maps, encryption keys, etc. as required. In step 16, the actions are acknowledged to the ESS once completed by the provisioning/conditional access system. At this point, any of the legacy based services that the customer initially request are available.

The ESS now configures the host for an enhanced service, as appropriate. The enhanced service could be of various forms and its specific operation is not relevant to illustrate the overall message flow. Further, in one alternative embodiment, the configuration of the enhanced service could involve downloading application software. For the sake of illustration, the network may convey the host-specific configuration messages on a separate channel, such as a DOCSIS channel. However, the messages in steps 17-21 are service dependent and vary based on the specific enhanced service involved. Continuing with the example, in step 17 the ESS commands the host to tune to a channel to receive further configuration commands. The ESS does this by using the appropriate command message set defined for that host to accomplish the enhanced service being configured. In step 18, the host (STB) tunes to the indicated channel after which the ESS services system communicates the data in step 19. This may occur using the aforementioned carousel techniques. In step 20, the ESS updates the billing system as to the completion of the service configuration and the cable user in step 21 can invoke the legacy service, such as viewing a movie and invoke the enhanced service.

The full potential of the ESS capability is realized with a two-way system, as this allows communication from the STB to the ESS and facilitates service provisioning and enhanced service offerings. One embodiment is illustrated in FIG. 21a. In FIG. 21a, the configuration of a host with legacy and enhanced services is illustrated using a two-way network.

The provisioning steps start with the user connecting the STB in step 1a. It is assumed the customer previously purchased the STB and associated services. Thus, these steps as well as the creation of the configuration message set files are not illustrated. Rather, FIG. 21a starts with the cable user connecting their newly purchased host. The STB detects connection with the cable network upon application of power, and automatically sends an activation request in step 1b. The activation request may occur using a reverse path and typically includes the address of the host, its type, software code inventory, and associated capabilities as previously indicated. The activation message is received by the ESS that validates the identity of the subscriber and identifies the provisioning transaction in step 2. The ESS instructs the provisioning/conditional access system to initialize or activate the conditional access module functionality in the host in step 3a. The provisioning/conditional access system responds in step 3b by sending messages to initialize the host by providing information potentially by resending information messages regarding the channel map and decryption keys as well as entitlement management messages (EMMs). The ESS in step 4 confirms the status of the STB by sending a poll message that is forwarded to the STB. In step 5, the STB acknowledges its status. In this manner, if a problem is detected, the ESS will readily discover the existence of the problem at an early stage. Those skilled in the art will recognize that a variety of techniques and messages may be used to confirm data sent and identify exceptional procedures.

In step 6, the ESS sends configuration messages specific to the host for the desired enhanced service, as well as any application code or data required by the host. The configuration messages enable certain capabilities in the host and/or set parameters of operation. As previously noted, this information could be sent out-of-band, or instructions could be sent indicating where the host could receive the information. The STB acknowledges the messaging in step 7, which the ESS accepts as completing the configuring process in the host. The ESS then indicates the completion of the configuration process to the billing system in step 8 and receives an acknowledgment in step 9. The billing system at this point knows that the service is active and billing of the service may commence.

For the sake of illustration, once all the network elements are appropriately provisioned, the ESS may send a text based confirmation welcome message to the STB in step 10 that can be displayed on the television monitor. Alternatively, the ESS may return an acknowledgement message, which triggers the host to initiate a display message welcoming the user. In yet another embodiment, the ESS could instruct the host to tune to a certain channel that has a welcome message (e.g., a greeting/system overview channel). Regardless of the embodiment, the message confirms the services provisioned as well as provides the user with information regarding using the service. The information can be tailored to the services provisioned. In various embodiments, the control and definition of screen displays may be under the control of the ESS or host. At this point (step 10a), the user can view the channels and invoke the enhanced services.

The message flows of FIGS. 20a and 20b are generic in that they did not illustrate a specific message flow for a specific service. In FIG. 21b, a specific enhanced service is depicted. This could have been the enhanced service illustrated in FIG. 21a. Namely, steps 11a and 11b could have occurred in lieu of step 6 of FIG. 21a. Alternatively, the cable customer may have subscribed to the enhanced service at a later point in time, e.g., after, and separate from, the communication of FIG. 21a. In FIG. 21b, it is assumed that the feature is invoked after the communication of FIG. 21a in order to facilitate the illustration of the operation. The service illustrated is a host-based PVR service allowing the recording video information. In order to provide a more flexible service, it is desirable for the PVR application to access extended program guide information. This allows the user to instruct the PVR application to record a specific program at some time in the future without having to program the channel, start time, and end time. Access to program guide information provides a schedule for the PVR application to know what programs are available at what times, on which channels. While a program guide channel may be available to the host in a limited form, it may not be in a format suitable for application processing or may be limited to a few days, whereas the PVR service may authorize the host to access two or more weeks of program data.

In step 11a, the ESS sends a host-specific configuration message to enable the PVR capability and indicate where extended program guide information is located. As indicated in step 11b, the host PVR application obtains program guide information from this source. This may occur using an Internet connection with a URL provided previously to the host during the configuration (e.g., see step 6 of FIG. 21a). Alternatively, the message may instruct the host to tune to a certain channel at a certain time to receive the necessary information, potentially embedded with other types of information, such as program preview segments. The ESS may further configure the host to allocate one or more hard disk partitions to facilitate recording video programs, store extended program guide data, store applications, maintain usage statistics, or other service related reasons. At some point subsequently, the user in step 12 desires to record a specific program and in step 13 instructs the PVR application to record a given program. Since the application already has obtained the program guide information and has been enabled by the ESS, the application records the desired program at the appropriate time in step 14. The user may instruct the host to record by interacting with the host in various ways, such as using a wireless remote, a keypad on the host, a PC communicating with the host, etc. The recording action may take place some time after the request for programming in step 13. The host automatically stops recording at the appropriate time since the host knows when each program ends. In step 15 the user subsequently views the recorded program by invoking the 'play' function. The host responds in step 16 by playing the video.

There are other enhanced services that can be enabled by the messaging of step 6 in FIG. 21a. For example, the ESS to host messaging could enable Internet access by provisioning a high speed data service on the host. The ESS would communicate parameters to the host enabling a DOCSIS capability providing the subscriber with a high-speed data service to the Internet using an integrated cable modem in the host to provide a high-speed data access service. Further, the cable network may enable wireless access to the user's personal computer from the host using one of the IEE 802 based wireless protocols, such as 802.11b.

The embodiment of the architecture of one such system is illustrated in FIG. 22. In FIG. 22, the user has purchased or obtained a cable set top box 7 that incorporates DOCSIS capabilities for a high-speed data service for accessing the Internet 1554. Currently, Internet service over cable is well known and involves the use of cable modems incorporating the DOCSIS standard. Such systems are provisioned using a Cable Modem Termination System (CMTS) 1567 that provides IP data termination at the cable headend and provisioning capabilities for the cable modem functionality in the host.

Some embodiments may have a plurality of Cable Modem Termination Systems requiring an additional cable modem provisioning system to select the appropriate CMTS. The set top box 7 illustrates one embodiment where the cable modem capability is integrated into the host. Typically, cable modems are separate physical devices from the STB, and this embodiment can be accommodated as well using the principles of the present invention. In this embodiment, the STB further incorporates 802.11b 1556 wireless access capabilities. The wireless capabilities allow a personal computer 1560 equipped with 802.11b wireless capabilities to communicate wirelessly 1558 with the host. Typically, the range of 802.11b allows a personal computer to communicate with the host over a range of several hundred feet, so that the personal computer can be located in another room of the residence.

At some point in time (whether at the time the host was purchased or subsequently), the cable customer may desire to subscribe to a high speed Internet access service provided by their cable provider. Thus, any of the aforementioned provisioning input systems could be used for receiving the customer's request. A provisioning message 1566 is thus delivered to the ESS 40. The ESS may create a pending provisioning transaction and await for the STB to activate itself using the aforementioned procedures. Alternatively, the STB may already be connected and recognized by the ESS as present. In either case, the ESS 40 requests the Cable Modem Terminal System (CMTS) 1567 provision the DOCSIS 1554 capability in the STB using existing legacy procedures. The ESS treats the CMTS as a legacy provisioning system, similar to the provisioning/conditional access system. Alternatively, the ESS could communicate host-specific messages to enable the capability as previously discussed. After this, the ESS 40 then communicates with the billing system 1*a* to update the customer's billing records to reflect the added service.

This embodiment relies on the ESS to communicate with the Cable Modem Termination System to provision the STB using existing capabilities and update the billing system. In other embodiments, the ESS may first indicate to the billing system 1*a* that high-speed data should be provisioned, and the billing system then communicates to the Cable Modem Termination System to effect the provisioning. This embodiment may be appropriate if the billing system is able to interact with the Cable Modem Termination System. Depending on the embodiment, the role of the provisioning/conditional access system 1*b* may be minimal.

Both of the above embodiments use the ESS to provision a high-speed data service and update the billing system in some manner. In other embodiments, the ESS may provision the DOCSIS data capability without updating the billing system. In such cases, the ESS may enable data access, such as a slower speed or restricted access data service in the STB, to facilitate data transfer for other enhanced services. For example, a temporary high-speed data transfer capability would facilitate large file transfer to the STB. In this case, the ESS provisions the capability of data transfer in the host, but does not provision a high-speed data service (e.g., Internet access). Thus, the cable subscriber may not always be billed for enabling high-speed data access in the STB.

Although not shown, a similar architecture can be used to enable a telephone interface in the host. Telephone service over the cable distribution network is well known, and involves the use of devices that interface a telephone to the cable network. These devices can be integrated into the host as well. Rather than a personal computer communicating with the host as illustrated in FIG. 22, a telephone is connected using a standard RJ-11 connected to the host, where the host includes a telephone interface. Similarly, messaging from the ESS to the host enables the telephone interface in the host. In some embodiments, the ESS may use a separate, existing telephony based provisioning system while in other embodiments, the ESS may provision the STB telephony capabilities directly.

In this manner, new capabilities can be added to control or invoke cable based services without requiring the corresponding messaging capability to be implemented in the legacy systems and cable network elements. The message flows in FIGS. 16 and 17 are subject to variations based on service definition and system architecture considerations. Thus, the architecture in the figures should not be construed to limit the principles of the present invention.

Music-On-Demand

The popularity of downloading music over the Internet demonstrates the desire for individuals to customize music play lists. Further, the popularity of MP3 players has made listening to music on a portable basis even more convenient. However, the means for downloading music has been rife with copyright issues, including methods for controlling the legitimate downloading of music.

Another embodiment of the above system demonstrates the application of the aforementioned capabilities for non-video applications. Specifically, a 'music-on-demand' service to facilitate programming MP3 devices is illustrated in FIG. 23. This service operates in conjunction with a STB 7 incorporating a host with the corresponding MP3 capabilities 164. For example, the MP3 capability may include the ability to accept a memory cartridge or provide an interface for writing an MP3 music file to an MP3 player. To facilitate the operation of downloading music, a graphical user interface on the user's personal computer 166 may be incorporated. In an alternative embodiment (not shown), the STB incorporates the same capability of the personal computer. This could be accomplished by the STB accepting a connection to a keyboard for user input and providing video output signals on the television (as a monitor or output device). This embodiment avoids having to use a separate PC for largely I/O purposes. In one embodiment, the user inserts or connects their MP3 player (not shown) to the MP3 interface on the STB 7. The user then employs their PC 166 to access a music server 160 over an Internet based connection. Internet access may use a cable modem or a telephone modem. The music server 160 is connected to the cable headend to provide selected music program files to the cable headend 5, which then conveys the file over a specified channel. In an alternative embodiment, the music server sends the music data to the ESS that caches the data and forwards the data to the host. The music program may be transmitted inband over the cable distribution network 6. Either a data file representing audio can be downloaded as illustrated, or the audio itself can be conveyed to the STB.

Once a user has selected a program from the music server and requested the download, the music server 160 communicates with the ESS 40 that has a corresponding music-on-demand application 161. The music service indicates to the ESS which subscriber has requested the selection and what channel (and sub-channel, if required) the program may be located. Alternatively, the Music Server 160 could download the audio data to the ESS that caches the data, and the ESS then communicates the file to the STB. The music server may further indicate decryption keys used to decode the digital music information. The ESS then determines the host associated with the subscriber and retrieves the appropriate message set for interacting with that host. The ESS then sends the appropriate control messages 168 on the out-of-band channel to the corresponding application 164 in the STB. The control message indicates how the file can be identified, how it can be accessed, any decryption keys for decoding the data, copy control information (e.g., various forms of digital rights management schemes), and other service related commands and/or configuration messages. In this embodiment, none of the steps for providing the service relies on legacy system capabilities, as recording MP3 audio files is not a capability of legacy systems.

This message flow is illustrated in FIG. 24. In step 1 of FIG. 24, the user employs their personal computer to access a website hosted by the music server. In an alternative embodiment, as illustrated in FIG. 15, the user may employ their television and STB as a surrogate personal computer for receiving and indicating information. Continuing with the embodiment involving a separate PC, the user in step 2, interacts with the website, viewing the various selections available for download. In step 3, the user connects their MP3 player or memory card to the set top box. Step 3 may be done at an earlier point, but is typically done prior to downloading. In step 4, the user indicates the selection that they wish to download. It is assumed that the user has made the appropriate and necessary financial payment to purchase the music prior to downloading (e.g., indicating a credit card to be charged). Alternatively, the cable system operator could bill the subscriber on behalf of the music server for the music downloaded.

In step 5, the music server sends a 'downloading request' to the Enhanced Services System, which in turn notifies the STB. The message indicates the specific channel/subchannel on which the digitized music will be downloaded and any necessary decryption keys or security related information. Once the STB has acknowledged the information in step 6, the STB indicates the music can be downloaded. Once the music server receives the acknowledgment, the server transfers the music file to the STB in step 7. The cable headend may multiplex the data into one of inband channels already being transferred over the cable plant in step 8 or over an out-of-band channel. Alternatively, the music could be delivered as an audio file that is played by the set top box, or delivered over an Internet connection. Once the selection is downloaded, the music server indicates to the ESS in step 8 that the transfer is complete. The ESS forwards the message to the STB in step 9. In this manner, music can be downloaded to a user over the cable distribution network in an efficient and secure manner.

Host File Database

The Host File Database (HFD) functions as a master repository for host-specific files. The HFD contains various types of files that are associated with a given type of host, the type of host determined by a manufacture and model identifier. The files can contain data used for a variety of purposes, including software patches, replacement operating systems, application code updates, configuration data, application level data, protocol handlers and device capability descriptions. The host files can be generally classified into four categories. First, there are host profile files that describe attributes of the host. These are used by the configuration message set creation system to drive a user-interface. Second, there are the host protocol files that are used to create the individual messages in the configuration message set. Third, there are host data files that may contain software patches, service data, application, or any other form of host-specific software. Finally, there may be configuration message set files. The first three file types are provided from the host manufacturer to the HFD, which are downloaded in turn to the ESS. The last type (configuration message set) is typically created by the cable system operator using the configuration message set creation system. However, other embodiments may have a third party create these and download them via the HFD or from another source. The configuration message set may be statically determined (e.g., similar to a compiled command), or it may be dynamically determined (e.g., similar to an interpreted command). In the latter case, a set of service related parameters are typically required to determine the appropriate configuration message. Such service related parameter files are typically cable operator specific and stored in the ESS as a host file. Typically, all type of host files are stored on the ESD, but a cable operator may elect to only store the configuration message set in the ESD, and store the others in another system. This presumes that the configuration message set contains the necessary syntax and encoding data to form the message. Variations of the above host-specific file formats are possible, and these are intended to be within the scope of the present invention. For example, it is possible to combine files into a larger file, though the structure of the single file may be more complicated. Thus, a single host file could contain both the profile file and protocol file. Further, the configuration message set (whether statically or dynamically determined) could be defined by a third part (e.g., the HFD or a third party service creator) and downloaded to the ESS. This would avoid having the ESS to receive the protocol and profile files. These and other variations readily perceived by those skilled in the art are within the principles of the present invention.

In order for the cable system operator to create the appropriate configuration message set, it must first typically have at least the host protocol file and host profile file. In alternative embodiments, the cable system operator may arrange for a third party to create the appropriate configuration message set and only download a 'static' configuration message set as the host file. If the third party creates a dynamic configuration message set, then other files (e.g., service data files) may also be required. In the following embodiment, it is generally assumed the cable system operator creates their own configuration messages based on host files obtained from the host manufacturer, but this is not always a requirement. The cable system operator can obtain the host files from the host manufacturers or a third party in a variety of ways. In one embodiment, each cable system operator arranges to obtain the necessary host files from the various host manufacturers and loads the modules in the ESS as appropriate.

The loading of host software files can be accomplished using a variety of techniques. The host files could be distributed on media (e.g., CD) and automatically mailed to each cable system operator for each release. The cable system operator then manually loads the files into the ESD. Alternatively, the cable system operators could manually arrange for the contents to be transferred electronically using well-known protocols such as File Transfer Protocol (FTP). This approach requires each cable operator to coordinate obtaining the appropriate and current host files from each host manufacturer. The host operator may track the availability of software releases for the various host models of various host manufacturers and initiate downloading of the appropriate host files.

An alternative embodiment relies on a central repository known as the Host File Database (HFD) for accepting, storing, and electronically distributing host files. The HFD typically 'pushes' updates to the various ESSs as appropriate. An alternative embodiment may involve the cable system operator "pulling" data as required. In addition, the HFD performs other functions, including maintaining a list of approved host manufacturers and approved host files, a list of Enhanced Services Systems, and a list of the host files previously downloaded to each of the Enhanced Services Servers. The central repository can also disseminate information to the host manufacturers as appropriate. For example, the HFD could function as a clearinghouse for reporting software problems and solutions. The HFD could even provide generic market based information as to which host types are popular and frequently downloaded.

One embodiment of the architecture is illustrated in FIG. 25. The HFD 910 maintains copies of the various host files in a master database. This database receives the various host files and associated identifiers from various host manufacturers. The identifiers identify at least the particular host manufacturer and model number that the host file is associated with. Further identifiers may indicate the specific version of the host file, as there may be multiple versions released for a given host.

The Host File Database 910 is connected to the Internet 905a, 905b. Although two Internets are illustrated, they may be considered one logical Internet. The Internet provides a communication network service, though other communication technologies may be used alternatively or in addition, including modem dial-up lines, ISDN communication, ATM, X.25, frame relay, LANs, PVN, and other technologies and services well known in the art of data communications. It is presumed that the communication network service is digital and that well known security and authentication techniques may be used to ensure that host files are only received from, or transferred to, an authorized and authentic source.

The Host File Database 910 receives updates from various host manufacturers 900a, 900b, 900c. The host manufacturers (or agents thereof) are responsible for generating compatible host files for the various hosts they manufacturer. Although the term 'host manufacturer' is used, it encompasses authorized software vendors for the host manufacturer. The host manufacturers may generate new host files on a periodic schedule, as needed to introduce new features, correct software bugs, or based on some other criteria. Typically, the host manufacturer tests the software modules prior to release and/or may submit the modules to a third-party certification entity 903 to perform independent quality assurance testing. Once certified, the host file is delivered to the database 910 as certified and ready for dissemination. There may be one or more entities certifying the program modules and the HFD may access the certifying entity for confirmation that software downloaded from a manufacture is certified, or the manufacturer may rely on the certifying entity to release the software to the HFD. While the Host File Database may only accept 'certified' host files, the Host File Database may also accept non-certified host files for beta testing with limited distribution to select cable system operators. The host manufacturers provide the data to the Host File Database when appropriate, and the HFD maintains a registry of all the various host files stored. Typically, the HFD contains many more host files than required for a given cable system operator.

Once the host files are stored in the database 910, the HFD accesses a distribution list it maintains of the various cable systems, specifically the ESSs 915a, 915b, 915c, that should receive the host file updates. The distribution list may not only indicate the specific ESS that is to receive the updates, but how and when the updates are provided. For example, some cable operators may prefer to receive updates as soon as they are available. Others may prefer a periodic download during off-peak hours (e.g., every weekend). Some cable systems may have specific forms of communications and authentication requirements (e.g., security/encryption keys and passwords, communication parameters, etc.). Some large cable systems may receive the file into a local repository and then distribute the files internally from their local repository to several internal ESSs. The distribution list contains all the information required for the HFD to download information to the ESSs and those skilled in the art can readily define variations in the methods and approaches for the dissemination of the files.

In various instances, the ESS may query the Host File Database for information concerning the most current host file for a given host, and request immediate transfer of the host file. The ESS may also request retransmission of a previously transferred host file, which may be required if the file was accidentally erased or corrupted. The ESS may also request various reports generated from the HFD, including total number of downloads to the ESS, a listing of all host files maintained, and other information pertaining to the HFD to ESS interactions. In another embodiment, these functions could be initiated from a terminal or computer operated by the cable system operator as opposed to the ESS.

The Host File Database may also be connected to one or more other computers 911 functioning as an interface for performing various administrative functions. The operations terminal may be located in a network operation center (NOC). The network operations functions typically include: creating, modifying, deleting a communication profile for a destination or source (ESS or Host Manufacturer); monitoring communication links; editing communication parameters, etc. These functions are necessary for managing a network interconnecting all the various entities. Further, the NOC functions may include detecting failures associated with an ESS in a cable system operator, ensuring that all updates in the ESS have occurred, and detecting and reporting any anomalies in distribution or operation of the host files. Other functions of the NOC can be extended to providing network and service provisioning services to a cable system provider. For example, the availability of a new host could trigger the NOC into obtaining the appropriate host files, 'pushing' these to be stored in the cable provider's ESS, updating the ESS to recognize the new host type, creating static configuration message sets, etc.

One embodiment for the procedure associated with a host manufacturer developing a new host and associated software host files is illustrated in FIG. 26. The process begins in step 1900 with the host manufacturer developing the hardware and software for a new host. Alternatively, the manufacturer could introduce new software for an existing host. The host manufacturer may determine the new capabilities based on a cable system operator's input, marketing studies, user feedback, or other means. The host submits the software and the hardware if required, in step 1902 to a third-party that tests and certifies the software as performing as indicated and that no software bugs are present. The certification process minimizes the likelihood of the cable system operator receiving complaints from various subscribers downloading malfunctioning software. If certification is not obtained in step 1904, the manufacturer in step 1906 corrects the problems and resubmits the software for testing in step 1902. If the software is certified, then in step 1908 either the manufacturer or the certification entity releases the software to the HFD database. Typically, once certified, the manufacturer in step 1910 markets the new capabilities to the cable system operator and educates the cable operators regarding the enhanced service capabilities. If the cable system operator does not 'build' the new enhanced service offering (e.g. perform the necessary network and service configuring, including defining the new billing codes in the billing system and potentially creating the appropriate configuration message set files), then there is no ability to provision that enhanced service for the specific host type. However, as new host types are expected to provide legacy capabilities, the host manufacturer can always market a new host for operation with legacy services without being dependent on the cable system operator to immediately accommodate the host for enhanced services. Consequently, the host manufacturer has an interest at step 1912 for the cable system operator to configure their network to support the specific host and market the new capabilities to the cable subscribers. It is further expected that host manufacturers or third parties may facilitate the cable system operators activities by providing pre-constructed configuration messages for pre-defined services. Some services may involve minimal host-specific services (if at all) to configure. Thus, the cable system operator may only be required to define the new billing codes and load the appropriate files in the ESS. Alternatively, the outsourcing of the provisioning of the new billing codes could be outsourced to third parties as well. In this manner, the newly developed enhanced service is available to cable subscribers. Regardless of how the cable system operator or a third party configures the cable system, once the operator can offer a new service the host manufacturer can then actively market their host hardware to consumers in the various markets in step 1914. As more cable subscribers subscribe to the service, demand is created in the marketplace for the host. Obviously, some of these steps may occur in different order. For example, a manufacturer may attempt to solicit interest in the product while certification is under way, and may beta test the product to cable subscribers in certain markets. However, until the network and service configuration has occurred by the cable system operator, a subscriber is unable to obtain the new service from the cable system operator.

As previously indicated, the host file is defined by the manufacturer and may be a data file containing various types of software. For example, the host file could contain updated application code or software patches to be downloaded to the host. In this instance, the application code would correspond to program instructions executed or interpreted in the host. From the perspective of the HFD and ESS, the application code is a large data file. The application code could be in the form of compiled native machine code that is designed to be directly executed on the processor in the host. Alternatively, the code could be in a higher-level language that is interpreted using software resident in host, such as middleware. This could be in the form of JAVA or other proprietary languages. Alternatively, the code could be replacement scripts, such as those written in Visual Basic, XML, or other formats.

In other instances, the host file may be a protocol file containing configuration commands allowing the ESS to interact with the host. This could be in a proprietary low-level messaging format or a high-level protocol syntax. For example, commands could be defined in a low-level bit oriented (e.g., bit mask) format, in a higher-level character oriented protocol, or in a higher-level message level protocol. The command structure could be based on XML formats or other Internet based languages. Again, the structure and syntax for such commands is defined by the host manufacturer and is not limited to a single common structure or syntax. Nor is the information required to be maintained only in one file. Each of the 'host file' types may comprise a series of related files.

Finally, the host file may be a host profile file. Typically, a host manufacturer will define new capabilities in a host, and distribute the host profile file describing the capabilities for interacting with the host. The profile host file allows a cable system operator to create the appropriate configuration messages based for configuring a feature of the host. The cable system operator can also use the profile file information for marketing purposes. The profile file can not only drive an system to facilitate configuration message sets, but can also drive marketing comparison systems. These marketing comparison systems would use the profile data to list and compare features of different hosts. The marketing systems may be provided with the profile files to create interactive kiosk type marketing systems or prepare other marketing information systems.

FIG. 27 illustrates some characteristics of message tags that could be defined by a host manufacturer in a protocol file. FIG. 27 illustrates a table illustrating various tags 2302 describing resources in a host that can be manipulated. Each resource defined 2304 may or may not be implemented in the host. Each resource may have a secondary tag 2306 and parameters 2308 associated with that resource. For example, using the column indicating a reference number 2300, the fourth reference number indicates a primary tag of "software code object" that describes a software resource. The software code object does not have a secondary tag, but examples include boot code, base platform application code, middleware code, or manufacture specific code. Other resources include characteristics of the display, video tuners, hard drives, etc. Some resources, such as the hard drive, could be a resource configured by a variety of messages, for different purposes. For example, in configuring the PVR service, the parameter defining the recording time may act upon the hard disk storage device as a resource. The table in FIG. 27 is not exhaustive, and many other resources and associated parameters can be defined, including second, third, or more levels of tags to describe the resources, which will vary from host to host.

In order to facilitate the user-interface on the application used to create configuration message sets, common tag values are expected to evolve for use by host manufacturers. Common tag values will likely be initially used to describe some resources (e.g., tuners) and their characteristics. Some tags may be descriptive and not have any configurable parameters (e.g., they simply indicate the existence of a resource with a fixed default value, e.g., a hard disk drive capacity). Other tags may be unique to a single host vendor.

In addition to conveying the resources to be acted upon, the action itself needs to be configured using a corresponding message in the protocol file. In FIG. 28, some exemplary protocol messages that a host file may contain are listed. Again, these are only illustrative and are defined by each manufacturer. Those skilled in the art of communication and computer message protocols will readily appreciate that a wide variety of procedures, syntax, and semantics can be defined as a message protocol for host configuration. It is expected that various host manufacturers will incorporate the different messaging protocols.

In FIG. 28, the message family 2400 indicates a family of messages. In this embodiment, the message family indicates a high level functional grouping of various messages. Variations of functions within the family are indicated in the message column 2402 and potential parameters are listed in the third column 2406. To illustrate in further detail, a host manufacturer may define the capability of 'resetting' or initializing various processes or resources in the host. This could be defined in a "RESET 2408 message type. There may be various types of reset messages 2410 that are possible. One potential reset is a "cold reset" 2412 that performs certain defined functions. Namely, the "cold reset" erases all user settable parameters in memory, erases all of FLASH memory and firmware, as well as DRAM memory. Finally, the "cold reset" restarts the processor. One optional parameter 2414 of the message is an indication of whether or not the hard disk should be erased as part of the "cold reset" processing. Further, other types of parameters for the various reset messages could be defined.

The other forms of reset may perform a different mix of mandatory and optional functions. Alternatively, a single reset message with a larger set of optional parameters could be defined. The manufacturer may define different message structures for extensibility and implementation design considerations. If both are present, the cable system operator can select which of either to send as appropriate. It is expected that over time, a de-facto message syntax and semantics would evolve and would be implemented by various hosts.

Typically, other command messages would be defined for configuration, administration and control of the host. These are defined based on the capabilities in the host, and are likely to vary for each host and the service requirements. For example, FIG. 28 embodies a "PVR" message family 2420 that is used to configure a PVR service in a host. There are four messages illustrated (though more may be defined) 2421a, 2422a, 2423a, and 2424a One message "Set Record Time" 2421a configures the recording time that is indicated as one of two values—120 or 240 hours 2421b. Other messages configure the control functions 2422a and control whether functions such as pause of fast forward can be invoked 2422b. Another message controls the auto-erase time delay 2423a with corresponding parameters indicated in hours 2423b. Finally, another message "Partition Disk" 2424a can be used to instruct the host to allocate disk space for various service related operations. This would typically be indicated by megabytes per partion 2424b. The partition could be used for storing or caching program data, program description data (e.g., program title), associated advertising data, recording user viewing statistics, recording copy control information, etc. Other embodiments may use a single PVR configuration message containing a plurality of parameters (similar to the message 134a indicated in FIG. 19). Those skilled in the art of communication and command protocols will recognize that a variety of message structure and formats can be used. For example, FIG. 28 illustrates only optional parameters as associated with the message, but additional information such as help or usage data could be linked or associated with each message type. It is even possible to link the host protocol file and host profile into one large host file.

Because the HFD is a central source for host files, and maintains information as to which cable system operators have downloaded which host files, the HFD can be extended to provide a serviceability database to determine whether a given cable system operator can support a given host. This would require each cable system operator indicating to the HFD which services it offers. This information could also be used as a criteria for which host files are selected for downloading to a cable system operator. By further accessing a geographical database, the HFD can map a street address to a cable system's serving area and provide a potential cable subscriber with a list of cable providers serving that location and the services and host types that are supported by the cable system provider. Thus, the HFD functionality may be integrated or augmented with other functionality to provide a serviceability database.

The HFD can also be augmented to provide other functionality, such as marketing information. The HFD can derive marketing statistics regarding which types of hosts are deployed, in what cable systems, etc. and provide generic information to various cable system operators.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for provisioning a cable television service comprising:
    an Internet Service Provisioning Gateway (ISPG) operatively connected to a communications network, capable of hosting a web site accessed by a user at a computer connected to the communications network wherein the ISPG is configured to provide cable television service options to the computer and receiving a first provisioning message comprising service related input data entered by the user comprising a user identifier and a host identifier, the ISPG capable of generating a second provisioning message including the service related input data, the user identifier, and the host identifier; and
    an enhanced services system (ESS) operatively connected to the ISPG receiving said second provisioning message, said ESS configured to use said host identifier to ascertain a host file associated with a host type, said host type determined in part by said host identifier, the host file used to identify one of a plurality of a host protocol files used for generating a message for provisioning a host identified by said host identifier wherein said message is transmitted to said host and wherein the second provisioning message further includes a host manufacturer identifier and a host model identifier.

2. The system of claim 1 wherein the second provisioning message further includes a conditional access module identifier.

3. The system of claim 1 wherein the host file contains a configuration message associated with the host type, the configuration message further associated with a service identified by the service related input data.

4. The system of claim 1 wherein the ESS is capable of generating a legacy based command to a cable headend.

5. The system of claim 4 wherein the legacy based command initializes a host.

6. The system of claim 1 wherein the ESS is capable of generating a third provisioning message that is received by a host on a cable network.

7. The system of claim 1 wherein the ISPG is operatively connected to a location serviceability database.

8. The system of claim 7 wherein the location serviceability database receives location data associated with the user and selects at least one cable system provider based on the location data.

9. The system of claim 1 wherein the ISPG is capable of selecting one of a plurality of ESSs operatively connected to the ISPG, the selection determined in part on data received from the computer.

* * * * *

UNITED STATES PATENT AND TRADEMARK OFFICE
CERTIFICATE OF CORRECTION

| | | |
|---|---|---|
| PATENT NO. | : 7,757,261 B2 | Page 1 of 1 |
| APPLICATION NO. | : 10/712832 | |
| DATED | : July 13, 2010 | |
| INVENTOR(S) | : Addington et al. | |

It is certified that error appears in the above-identified patent and that said Letters Patent is hereby corrected as shown below:

In Fig. 19, Sheet 20 of 31, delete " $1a^a$ " and insert -- $1a$ --, therefor.

In Fig. 19, Sheet 20 of 31, Tag "132" is not pointed to any block.

In Column 28, Line 47, delete "ESS" and insert -- ESD --, therefor.

In Column 29, Line 30, delete "on the a" and insert -- on the --, therefor.

In Column 45, Line 32, delete "NTCS" and insert -- NTSC --, therefor.

Signed and Sealed this
Twenty-fourth Day of May, 2011

David J. Kappos
*Director of the United States Patent and Trademark Office*